(12) United States Patent  
Haswell et al.

(10) Patent No.: US 9,310,955 B2  
(45) Date of Patent: Apr. 12, 2016

(54) SYSTEM AND METHOD FOR GENERATING A VIRTUAL TOUR WITHIN A VIRTUAL ENVIRONMENT

(75) Inventors: Thomas Clayton Haswell, Walnut Creek, CA (US); Glenn Robert Seidman, Woodside, CA (US)

(73) Assignee: Myriata, Inc., Walnut Creek, CA (US)

( * ) Notice: Subject to any disclaimer, the term of this patent is extended or adjusted under 35 U.S.C. 154(b) by 280 days.

(21) Appl. No.: 13/444,373

(22) Filed: Apr. 11, 2012

(65) Prior Publication Data

US 2013/0275869 A1 Oct. 17, 2013

(51) Int. Cl.  
*G06F 3/048* (2013.01)

(52) U.S. Cl.  
CPC ...................... *G06F 3/048* (2013.01)

(58) Field of Classification Search  
CPC ........................................ G06F 3/048  
USPC .......................................... 715/706  
See application file for complete search history.

(56) References Cited

U.S. PATENT DOCUMENTS

| | | | |
|---|---|---|---|
| 6,058,397 A | 5/2000 | Barrus et al. | |
| 6,175,842 B1 | 1/2001 | Kirk et al. | |
| 6,476,830 B1 | 11/2002 | Farmer et al. | |
| 6,731,314 B1 | 5/2004 | Cheng et al. | |
| 6,772,393 B1 | 8/2004 | Estrada et al. | |
| 7,036,082 B1 | 4/2006 | Dalrymple et al. | |
| 7,123,263 B2 | 10/2006 | Harvill | |
| 7,146,576 B2 | 12/2006 | Chang et al. | |
| 7,155,680 B2 | 12/2006 | Akazawa et al. | |
| 7,266,445 B1 | 9/2007 | Janky et al. | |
| 7,386,799 B1* | 6/2008 | Clanton et al. ................. 715/758 |
| 7,467,356 B2 | 12/2008 | Gettman et al. | |
| 7,478,047 B2* | 1/2009 | Loyall et al. ................... 704/258 |
| 7,792,801 B2 | 9/2010 | Hamilton, II et al. | |
| 7,950,026 B1 | 5/2011 | Urbach | |
| 8,127,235 B2 | 2/2012 | Haggar et al. | |
| 8,140,544 B2* | 3/2012 | Barton et al. .................. 707/749 |
| 8,150,941 B2* | 4/2012 | Edecker et al. ................ 709/217 |
| 8,161,397 B2 | 4/2012 | Kalasapur et al. | |
| 8,187,104 B2 | 5/2012 | Pearce | |
| 8,452,638 B2 | 5/2013 | Pickton et al. | |
| 8,572,177 B2 | 10/2013 | Goldman et al. | |
| 8,589,488 B2 | 11/2013 | Huston et al. | |
| 8,627,212 B2 | 1/2014 | Riley et al. | |
| 2002/0013738 A1 | 1/2002 | Vistisen | |

(Continued)

FOREIGN PATENT DOCUMENTS

JP 2005352941 A 12/2005

OTHER PUBLICATIONS

James Braman, et al., Death, Social Networks and Virtual Worlds: A Look into the Digital Afterlife; 2011 Ninth International Conference on Software Engineering Research, Management and Applications, pp. 186-192.

(Continued)

*Primary Examiner* — Jennifer To  
*Assistant Examiner* — Xuyang Xia  
(74) *Attorney, Agent, or Firm* — Miles & Stockbridge PC

(57) ABSTRACT

A virtual venue application for displaying information is provided, where the virtual venue application is implemented as part of an apparatus, or a system. The virtual venue application allows one or more users to generate a virtual tour of a virtual venue within a virtual environment. The virtual tour is then displayed within the virtual environment.

48 Claims, 38 Drawing Sheets

(56) References Cited

U.S. PATENT DOCUMENTS

| | | |
|---|---|---|
| 2002/0022962 A1 | 2/2002 | Richardson |
| 2003/0023489 A1 | 1/2003 | McGuire et al. |
| 2003/0117392 A1 | 6/2003 | Harvill |
| 2004/0107216 A1 | 6/2004 | Dokic et al. |
| 2006/0184641 A1 | 8/2006 | Moetteli |
| 2008/0092064 A1 | 4/2008 | Zilca |
| 2008/0243560 A1 | 10/2008 | Barendt |
| 2008/0281579 A1* | 11/2008 | Tsukiji et al. ............ 704/3 |
| 2009/0013263 A1 | 1/2009 | Fortnow et al. |
| 2009/0046102 A1 | 2/2009 | Hamilton, II et al. |
| 2009/0106670 A1 | 4/2009 | Berndt et al. |
| 2009/0106671 A1 | 4/2009 | Olson et al. |
| 2009/0138335 A1 | 5/2009 | Lieberman |
| 2009/0165140 A1 | 6/2009 | Robinson et al. |
| 2009/0177977 A1* | 7/2009 | Jones et al. ............ 715/753 |
| 2009/0235183 A1 | 9/2009 | Hamilton et al. |
| 2009/0251459 A1 | 10/2009 | Navarro |
| 2009/0254842 A1 | 10/2009 | Leacock et al. |
| 2009/0254843 A1 | 10/2009 | Van Wie et al. |
| 2009/0254866 A1 | 10/2009 | Kugle et al. |
| 2009/0262107 A1 | 10/2009 | Castelli et al. |
| 2009/0265642 A1 | 10/2009 | Carter et al. |
| 2009/0276718 A1 | 11/2009 | Dawson et al. |
| 2009/0318224 A1* | 12/2009 | Ealey ............ 463/31 |
| 2010/0057478 A1 | 3/2010 | Hamilton, II et al. |
| 2010/0060648 A1* | 3/2010 | Carter et al. ............ 345/474 |
| 2010/0064007 A1 | 3/2010 | Randall |
| 2010/0082487 A1 | 4/2010 | Nelsen |
| 2010/0131864 A1 | 5/2010 | Bokor et al. |
| 2010/0162639 A1 | 7/2010 | Adair et al. |
| 2010/0169184 A1 | 7/2010 | Hamilton et al. |
| 2010/0199192 A1 | 8/2010 | Sittig et al. |
| 2010/0199193 A1 | 8/2010 | Hamilton et al. |
| 2010/0205043 A1 | 8/2010 | Edwards |
| 2010/0220097 A1 | 9/2010 | Hamilton, II et al. |
| 2010/0250618 A1 | 9/2010 | Ourega |
| 2010/0306121 A1 | 12/2010 | Ciptawilangga |
| 2010/0306671 A1 | 12/2010 | Mattingly et al. |
| 2010/0307037 A1 | 12/2010 | Chi |
| 2010/0332998 A1* | 12/2010 | Sun et al. ............ 715/757 |
| 2011/0022970 A1 | 1/2011 | Sobol et al. |
| 2011/0054918 A1 | 3/2011 | Hamilton, II et al. |
| 2011/0055136 A1 | 3/2011 | Hamilton, II et al. |
| 2011/0055267 A1 | 3/2011 | Bolger et al. |
| 2011/0055727 A1 | 3/2011 | Dawson et al. |
| 2011/0093784 A1* | 4/2011 | Kiraz et al. ............ 715/719 |
| 2011/0137844 A1 | 6/2011 | Miranda et al. |
| 2011/0188780 A1 | 8/2011 | Wang et al. |
| 2011/0214050 A1 | 9/2011 | Stambaugh |
| 2011/0225518 A1 | 9/2011 | Goldman et al. |
| 2011/0225519 A1 | 9/2011 | Goldman et al. |
| 2011/0282942 A1 | 11/2011 | Berger et al. |
| 2011/0312416 A1 | 12/2011 | Gadd et al. |
| 2012/0198359 A1 | 8/2012 | Lossia |

OTHER PUBLICATIONS

Jed R. Brubaker and Janet Vertesi, Death and the Social Network, Department of Informatics, Donald Bren School of Information and Computer Sciences, 2010, pp. 1-4.

The Economist; Science and technology Babbage; Digital immortality, Difference Engine: Facebook for the dead, http://www.economist.com/blogs/babbage/2011/09/digital-immortality (Date viewed: Nov. 28, 2011), pp. 1-8.

Emily Getty, et al., I Said Your Name in an Empty Room: Grieving and Continuing Bonds on Facebook; CHI 2011 Session: Death & Bereavement; May 7-12, 2011, Vancouver, BC, Canada, pp. 997-1000.

Thomas Clayton Haswell, et al., U.S. Appl. No. 13/444,292, filed Apr. 11, 2012.

Thomas Clayton Haswell, et al., U.S. Appl. No. 13/444,313, filed Apr. 11, 2012.

Thomas Clayton Haswell, et al., U.S. Appl. No. 13/444,325, filed Apr. 11, 2012.

"I-Memorial", https://www.i-memorial.com (accessed Nov. 28, 2011).

Dean Takahashi, "DEMO: VenueGen Lets Businesses Stage Quick and Easy Virtual Meetings (video)", http://venturebeat.com/2010/03/21/venuegen/, retrieved Jun. 26, 2013, 4 pages.

International Search Report application No. PCT/US2013/034066 dated Jul. 10, 2013.

International Search Report application No. PCT/US13/34067 dated Jul. 2, 2013.

International Search Report application No. PCT/US2013/034064 dated Jul. 22, 2013.

International Search Report application No. PCT/US13/34071 dated Jul. 10, 2013.

* cited by examiner

Guest
- →Learn More Pushbutton to get additional information about the website services
- →Create Account Link
- →Sign in Link User
- →Sign in
    - →Home Page (Browse/Search Venues. Also, Browse Venues that User has contributing Role) or Sign out
        - →Click Venue Thumbnail or Name to Visit Venue
            - →Walk around Atrium or GOBACK to Venue Browsing
                - →Open Map Station to employ Venue Map Navigator or GOBACK to Atrium
                    - →Browse/Drill Down to Exhibits and Rooms
                      [GOTO "Enter Exhibit or "Enter Room"]
                    - →Teleport to specific Exhibit or Room
                    - →View Timeline
                - →Enter Exhibit (generic hallway of Rooms) or GOBACK to Atrium
                    - →Enter Room or GOBACK to Exhibit or Atrium
                        - →Walk Around
                        - →Look Around
                        - →Click ShowObject
                        - →Click Button
                            - →Animate ShowObject
                            - →Open Website Link
                            - →Add Photo or Video to Album or Notebook
                            - →Add Sculpture to Album or Notebook
                            - →Add Article to Notebook
                            - →Add Link to Notebook
                            - →Add Application to Notebook
                - →Enter Admission Area or GOBACK to Exhibit or Atrium
                    - →Walk Around
                    - →Present Ticket
                - →Enter Store or GOBACK to Exhibit or Atrium
                    - →Walk Around
                    - →Click on Price Button to put in Shopping Cart
                    - →Click on Cash Register or Store Clerk NRP to check-out

700

- →Click "Manage" Pushbutton to Manage Venue based on Role Assignments
    - →Operations Summary
        - →Access
        - →Membership
        - →Visitor History
        - →Advertising Management
        - →Finance Management
            - →Select/Change Subscription Package
            - →Manage Price List
    - →Designs Summary
        - →Details
            - →Enter Detailed Information in Form for Venue Type Selected
        - →Map
            - →Design Exhibit Layout of Rooms or GOBACK to Designs Summary
              (move and modify Room Dimensions)
                - →Design Room Layout
                    - →Drag-Drop Faces
                    - →Drag-Drop Containers
                    - →Drag-Drop ShowSpots
                    - →Click on Browse ShowObjects Libraries
                        - →Select one or more Libraries
                    - →Drag-Drop ShowObjects
                        - →Add Buttons
                - →Design Admission Area
                - →Design Store
                - →Tunnel Exhibits and Rooms as necessary

- →Home Page has Venue "Portal" that represents the entire Portal if the User is a Portal Administrator.
    - →Portal Management Page
        - →Site Statistics
        - →Billing
        - →Members
        - →Venues

Suzy Bits
suzybits@infinitebits.com
Member 09880651

Invitation sent 12 days ago, still pending

[ ] Resend invitation

[✓] enable

[ ] Operator    [ ] Curator    [ ] Designer

Summary
- Member since 9/11/2020
- Acquired from Facebook
- Visited 3 times for 37 minutes
- Last visit was 42 days ago

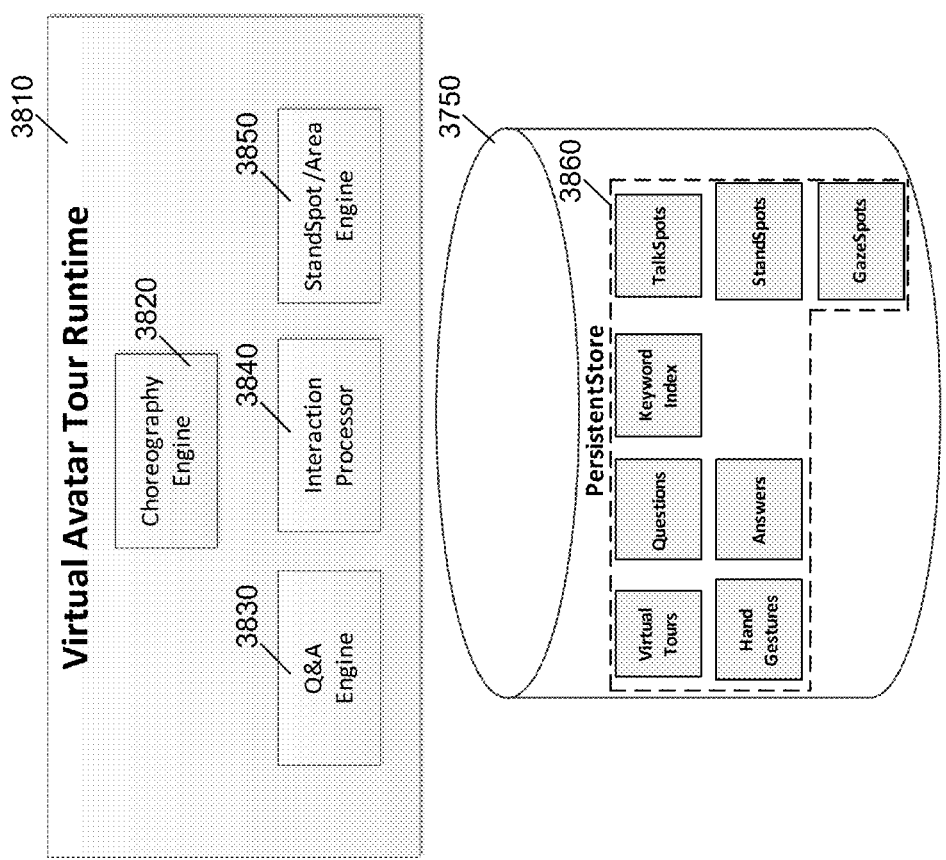

SYSTEM AND METHOD FOR GENERATING A VIRTUAL TOUR WITHIN A VIRTUAL ENVIRONMENT

BACKGROUND

1. Field

Certain embodiments of the invention relate generally to displaying information by utilizing computer-based environments, and, more particularly, to navigation and interaction in computer-based virtual environments that represent real-world events, life memories, meeting places, and other venues, enabling users to locate, contribute, and share personal information with other users while creating virtual representations of individuals, groups, or events in an animated two or three-dimensional world format.

2. Description of the Related Art

The existence of an environment where people can have and share experiences is acknowledged as a primary requirement for effective communication and collaboration. This is exceptionally valuable during traumatic and stressful periods of loss, instances of accomplishment or celebrations, and other benchmarks within human and animal life. Collaboration in the real world typically occurs at specific locations at which people can see and hear each other, and thereby communicate. The physical locations where people meet have boundaries (for example, walls) that separate the locations from one another. These boundaries serve to limit what people can see and hear, and therefore allows these locations to provide a structure for collaboration. Physical locations can also provide a structure of information. Information objects, such as music, photographs, videos, and graphic images, can be placed in a location, and arranged in various sub-locations, to enable people to find and organize specific information such as historic events, affinities, individual attributes and relationship between family and friends. Furthermore, physical locations can be designed for specific types of work or collaboration. For example, an individual's office is designed for individual work, while a conference room is designed for cooperative work among multiple participants.

The development of computer-mediated communication has created potential for people to collaborate and interact with others in new ways. For example, a collaborative virtual environment (CVE) is a computer-based, distributed, virtual space where people can meet and interact with each other, with agents, or with virtual objects provides an alternate venue for communication. CVEs are implemented to reflect real world interaction by providing a text-based system for interaction, or a two or three-dimensional graphical virtual world that is visualized for virtual interaction. Virtual worlds are built on coding protocols that use a metaphor of an imaginary place or the real world without its physical limitations to define what can and cannot be done. A virtual world can be represented using graphics, images, video, force feedback, and audio data to define a representation of a place that can be accessed by one or more users within a distributed computer system. Typically, the virtual world enables multiple users to simultaneously perceive and interact with the virtual world and with each other through different computers that are connected by a network. For example, virtual communities such as Linden Lab's "Second Life" provide a three-dimensional, persistent virtual world in which users interact with each other (socially and economically), the local environment, and with software agents using virtual characters in a cyber space. The degree of interaction between the users and the virtual world is implemented by one or more computer applications that govern such interactions as simulated physics, exchange of information between players, and the like.

User participation in a virtual world can be driven by, for example, social, educational, and business motivations. While virtual worlds have primarily been adopted to offer new spaces for promoting socialization, they have also exhibited potential to support collaboration by providing new ways to communicate, and increasing the awareness of the participants and available resources, without the physical space and time constraints of the real world. For example, while an individual, who is geographically distant from a location where an impromptu conference, wedding, funeral or other event is being held, would be physically unable to attend this event, this individual would be able to participate in such an event were it held in a virtual world via a network. Nevertheless, the limitations of existing virtual communications may still prevent this individual from sharing physical information objects such as notes, papers, and presentations with the other participants. Therefore, while virtual worlds provide a mechanism through which better and more effective collaboration can be enabled by providing new ways for people to interact and communicate, the nature of the interactions between users in a virtual world can be limited by the constraints of the system implementing the virtual world.

SUMMARY

According to an embodiment of the invention, a method for generating a virtual tour of a virtual venue within a virtual environment is provided. The method includes generating, by a virtual venue application implemented on a server, a virtual avatar that represents a user of the virtual venue application. The method further includes moving the virtual avatar through the virtual venue. The method further includes recording the movements of the virtual avatar through the virtual venue. The method further includes displaying the recorded movements within a graphical user interface as part of the virtual tour of the virtual venue.

According to another embodiment, an apparatus is provided where the apparatus includes a memory configured to store a virtual venue module. The apparatus further includes a processor configured to execute the virtual venue module stored on the memory. The processor is further configured, when executing the virtual venue module stored on the memory, to generate a virtual avatar that represents a user of a virtual venue application. The processor is further configured, when executing the virtual venue module stored on the memory, to, move the virtual avatar through the virtual venue. The processor is further configured, when executing the virtual venue module stored on the memory, to record the movements of the virtual avatar through the virtual venue. The processor is further configured, when executing the virtual venue module stored on the memory, to, display the recorded movements within a graphical user interface as part of the virtual tour of the virtual venue.

According to another embodiment, a non-transitory computer-readable medium is provided, where the non-transitory computer-readable medium includes a computer program stored thereon that, when executed by a processor, causes the processor to implement a method. The method includes generating a virtual avatar that represents a user of the virtual venue application. The method further includes moving the virtual avatar through the virtual venue. The method further includes recording the movements of the virtual avatar through the virtual venue. The method further includes displaying the recorded movements within a graphical user interface as part of the virtual tour of the virtual venue.

BRIEF DESCRIPTION OF THE DRAWINGS

Further embodiments, details, advantages, and modifications of the present invention will become apparent from the following detailed description of the preferred embodiments, which is to be taken in conjunction with the accompanying drawings, wherein:

FIG. 7 illustrates a diagram of a screen navigation model of a virtual venue application, according to an embodiment of the invention.

FIG. 12 illustrates an example user interface of a virtual venue application displaying a user screen, according to an embodiment of the invention.

FIG. 16 illustrates an example user interface of a virtual venue application displaying a user invitation status section, according to an embodiment of the invention.

FIG. 19 illustrates an example user interface of a virtual venue application displaying a detail screen, according to an embodiment of the invention.

FIG. 38 illustrates a virtual avatar tour runtime subsystem of a virtual venue application, according to an embodiment of the invention.

DETAILED DESCRIPTION

Figure 1:
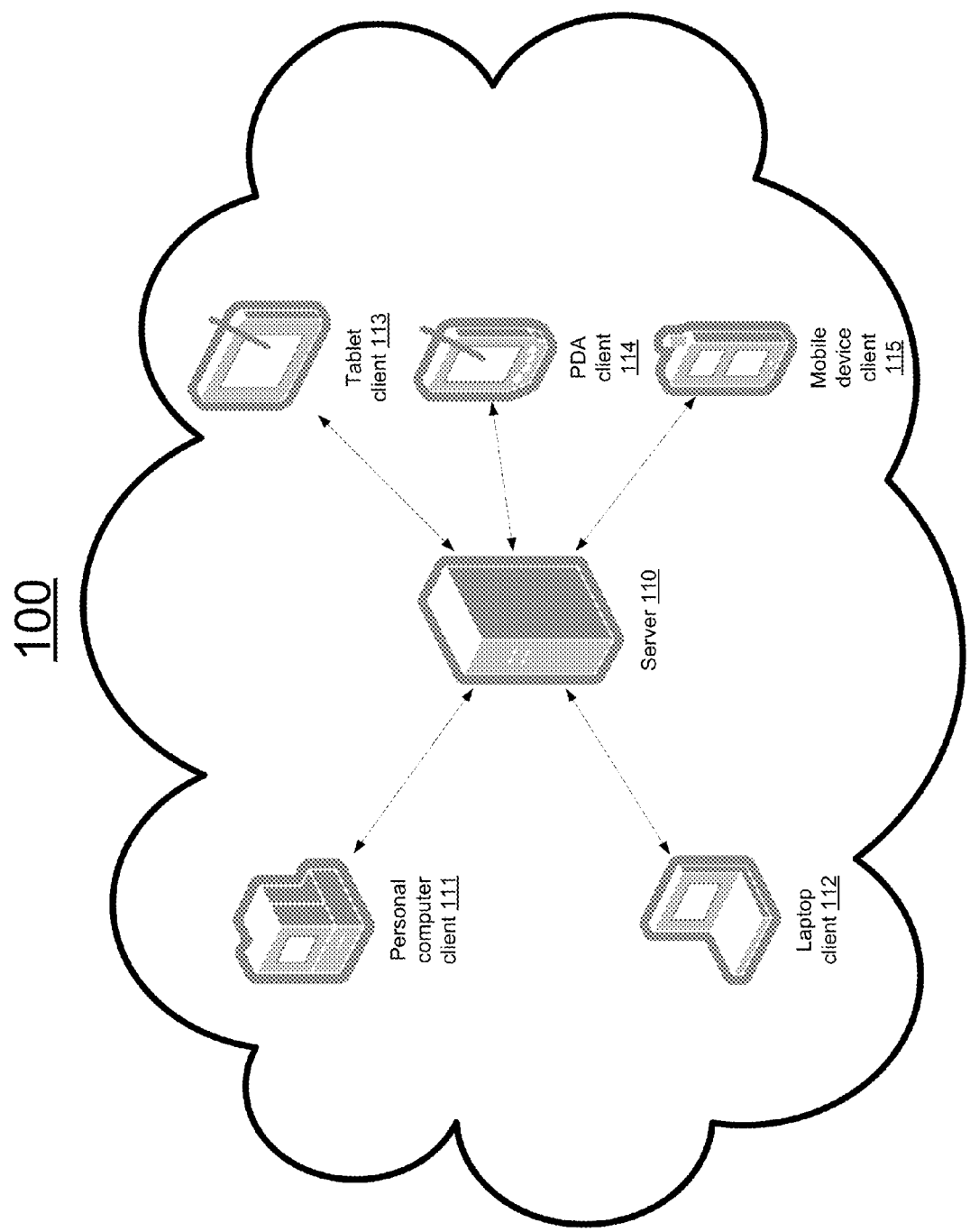
FIG. 1 illustrates a block diagram of a system, according to an embodiment of the invention.

It will be readily understood that the components of the present invention, as generally described and illustrated in the figures herein, may be arranged and designed in a wide variety of different configurations. Thus, the following detailed description of the embodiments of a method, apparatus, system, and computer-readable medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "an embodiment," "one embodiment," "another embodiment," "an alternative embodiment," "an alternate embodiment," "certain embodiments," "some embodiments," "different embodiments" or other similar language, throughout this specification refers to the fact that a particular feature, structure, or characteristic described in connection with the embodiment may be included in at least one embodiment of the present invention. Thus, appearances of the phrases "an embodiment," "one embodiment," "another embodiment," "an alternative embodiment," "an alternate embodiment," "in certain embodiments," "in some embodiments," "in other embodiments," "in different embodiments," or other similar language, throughout this specification do not necessarily all refer to the same group of embodiments, and the described features, structures, or characteristics may be combined in any suitable manner in one or more embodiments.

A "computer," as understood by one of ordinary skill in the art, is any programmable machine that receives input, automatically stores and manipulates data, and provides output. A "computer program" is any sequence of instructions written to perform a specific task on a computer, and has an executable form that a computer (typically through the use of a processor) can use to execute the instructions. A "computer module," "software module," or "module" is any computer program, or a portion thereof, that encapsulates related functions. A "computer application," "software application," or "application" is any collection of computer programs and/or modules. A "computer network" or "network" is any collection of computers interconnected by communication channels that facilitate communication among the computers.

In addition, a "service" or "web service," as understood by one of ordinary skill in the art, is a module or application designed to support interoperable computer-to-computer interaction over a network. A service can have an interface described in a computer-processable format. A computer can interact with a service by sending messages over a network protocol. Examples of services are Big Web services and RESTful services. Big Web services are services that follow a Simple Object Access Protocol (SOAP) standard and use Extensible Markup Language (XML) messages. RESTful services are services that utilize a Representational State Transfer (REST) style of software architecture, where clients are separate from servers by a uniform interface.

As an example of an application, a "web application" is an application that is accessed over a network, such as the Internet or an intranet. In general, a web application is displayed on a graphical user interface of a web browser. Examples of web browsers include an Internet Explorer® web browser, a Mozilla Firefox® web browser, a Google Chrome® web browser, an Apple Safari® web browser, and an Opera® web browser.

A user of a web application is able to interact with the web application using a cursor control. Examples of cursor controls include a computer mouse, an optical mouse, a touchpad, an optical touchpad, a trackball, a touchscreen, and a stylus. A cursor control can be moved by the user. Such movement can include a single pressing down (or "click") of a cursor control button, a double pressing down (or "double click") of a cursor control button, a displacement of the cursor control to a different location while a cursor control button is pressed down, and a release of a cursor control button. A cursor control can send one or more events to the web application in response to a movement of the cursor control by the user. An "event" is a message that can be sent to a web application to indicate that an action has occurred, such as a movement of a cursor control. The web application can receive the one or more events sent by the cursor control and perform specified functionality based on the one or more events.

An example of the specified functionality, based on one or more events, is a manipulation of a virtual object ("object") of a web application that is represented by a visual icon displayed on the graphical user interface of the web browser by the web application. An "object" is an entity that comprises a value, variable, function, data structure, or compilation of values, variables, and functions that are encapsulated. According to the example, a user can move a cursor control, such as clicking on a cursor control button, which causes the cursor control to send one or more events to the web application. The web application receives the one or more events and modifies the visual icon that represents the object accordingly.

As another example of an application, a "tablet application," is also an application that is accessed over a network, such as the Internet or an intranet. In general, a tablet application is displayed on a graphical user interface of a tablet computer, or tablet. Examples of tablets include an Apple iPad®, a Samsung Galaxy Tab®, a Blackberry Playbook®, and Hewlett Packard TouchPad®. A user of a tablet application is able to interact with the tablet application using any of the cursor controls described above (however, the most common kind of cursor control is the touchscreen, which allows for the sending of events to the tablet application based on simple finger strokes and touches).

One embodiment of the invention is a virtual venue application for displaying a virtual venue, where the virtual venue application can be implemented as part of an apparatus, such as a server, or a system, such as a computer system. The virtual venue application can allow one or more users to store digital information, where the virtual venue application can display the stored digital information within a virtual environment, where the virtual environment can be presented by one or more two- or three-dimensional screens displayed within a user interface. The virtual venue application can also allow users to locate other users, selectively establish a contact relationship, or connection, with other users, and share the stored digital information with other users. Thus, the virtual venue application can enable interaction between users in a virtual environment.

According to the embodiment, a user can utilize the virtual venue application to create a venue that includes one or more exhibits, and display the venue to other users within a virtual environment. Each exhibit of the venue can include one or more rooms, where a room is an organizational construct for organizing aspects of the theme of the exhibit. In certain embodiments, users can virtually move from one room to another room within the virtual environment. Furthermore, in certain embodiments, users can augment a room based on one or more privileges associated with the exhibit. In addition, the virtual venue application can support a larger organizational construct for associating one or more exhibits with a virtual venue.

Examples of virtual venues include a "museum" and a "memorial." A "museum" is a virtual venue type for collecting and displaying one or more virtual artifacts and other virtual objects in a virtual environment. A "memorial" is a virtual venue type for collecting and displaying digital information associated with a memory of something, such as a person (either living or dead), or an event, in a virtual environment. Thus, a museum and memorial are each examples of a virtual venue that differ with respect to the content (and the organization of the content) displayed within the virtual venue type.

However, examples of virtual venues can include other virtual venue types. For example, examples of virtual venues can also include an "advertiser," a "self-museum," a "corporate product display," a "trip museum," a "storefront," a "shopping mall," a "document cache," a "mixer room," a "street fair," an "art gallery," a "movie theater," an "observatory," an "encyclopedia," a "textbook," and a "future memorial." An "advertiser" is a virtual venue type for collecting and displaying digital information associated with a product, in a virtual environment. A "self-museum" is a virtual venue type for collecting and displaying one or more virtual artifacts and other virtual objects in a virtual environment, where the virtual artifacts and other virtual objects are associated with an individual who collected the virtual artifacts and other virtual objects. A "trip museum" is a virtual venue type that includes a virtual display of travel-related information created collaboratively by multiple individuals sharing travel experience. A "corporate product display" is a virtual venue type for collecting and displaying digital information associated with a product of a corporation, in a virtual environment. A "store front" is a virtual venue type for collecting and displaying digital information associated with a store that sells one or more products, in a virtual environment. A "shopping mall" is a virtual venue type for collecting and displaying digital information associated with a collection of stores, in a virtual environment. A "document cache" is a virtual venue type for collecting and displaying digital information associated with one or more physical documents in a virtual environment which can limit who can view information and the time period in which it can be viewed. A "mixer room" is a virtual venue type for providing a virtual environment that facilitates interaction between one or more users. A "street fair" is a virtual venue type for collecting and displaying digital information associated with an outdoor fair, in a virtual environment. An "art gallery" is a virtual venue type for collecting and displaying digital information associated with one or more artworks, in a virtual environment. A "movie theater" is a virtual venue type for collecting and displaying digital information associated with one or more movies, in a virtual environment. An "observatory" is a virtual venue type for collecting and displaying digital information associated with one or more physical telescopes, in a virtual environment. An "encyclopedia" is a virtual venue type for collecting and displaying digital information associated with one or more encyclopedias, in a virtual environment. A "textbook" is a virtual venue type for collecting and displaying digital information associated with one or more textbooks. A "future memorial" is a virtual venue type for collecting and displaying digital information associated with a person in preparation for the death of the person, in a virtual environment. Further details of the virtual venue application are described below.

FIG. 1 illustrates a block diagram of a system 100, according to an embodiment of the invention. The system include server 110. Server 110 can be any computer system or software application that provides a service. Server 110 can be any type of server configured to create, store, and transmit a virtual organizational construct that virtually represents a venue. Server 110 can transmit the virtual organizational construct to one or more clients, where examples of server 110 include any kind of application server, or any kind of web server. The system also include one or more clients, such as personal computer client 111, laptop client 112, tablet client 113, personal digital assistant (PDA) client 114, and mobile device client 115, where a client can be can be any computer system or software application that accesses a service on a remote computer system, such as a personal computer, a laptop computer, a tablet computer, a PDA, and a mobile device. A client, such as personal computer client 111, laptop client 112, tablet client 113, personal digital assistant (PDA) client 114, and mobile device client 115, can display the virtual organizational construct transmitted by server 110 within a user interface. One of ordinary skill in the art would readily understand that system 100 is an example configuration of a system according to an embodiment, and that, in other alternate embodiments, a system may have a different configuration. For example, a system may have any number of servers, and any number of clients, where each client may by any type of client, such as the types of client illustrated in FIG. 1. Furthermore, a system may also have additional types of devices not illustrated in FIG. 1.

Figure 2:
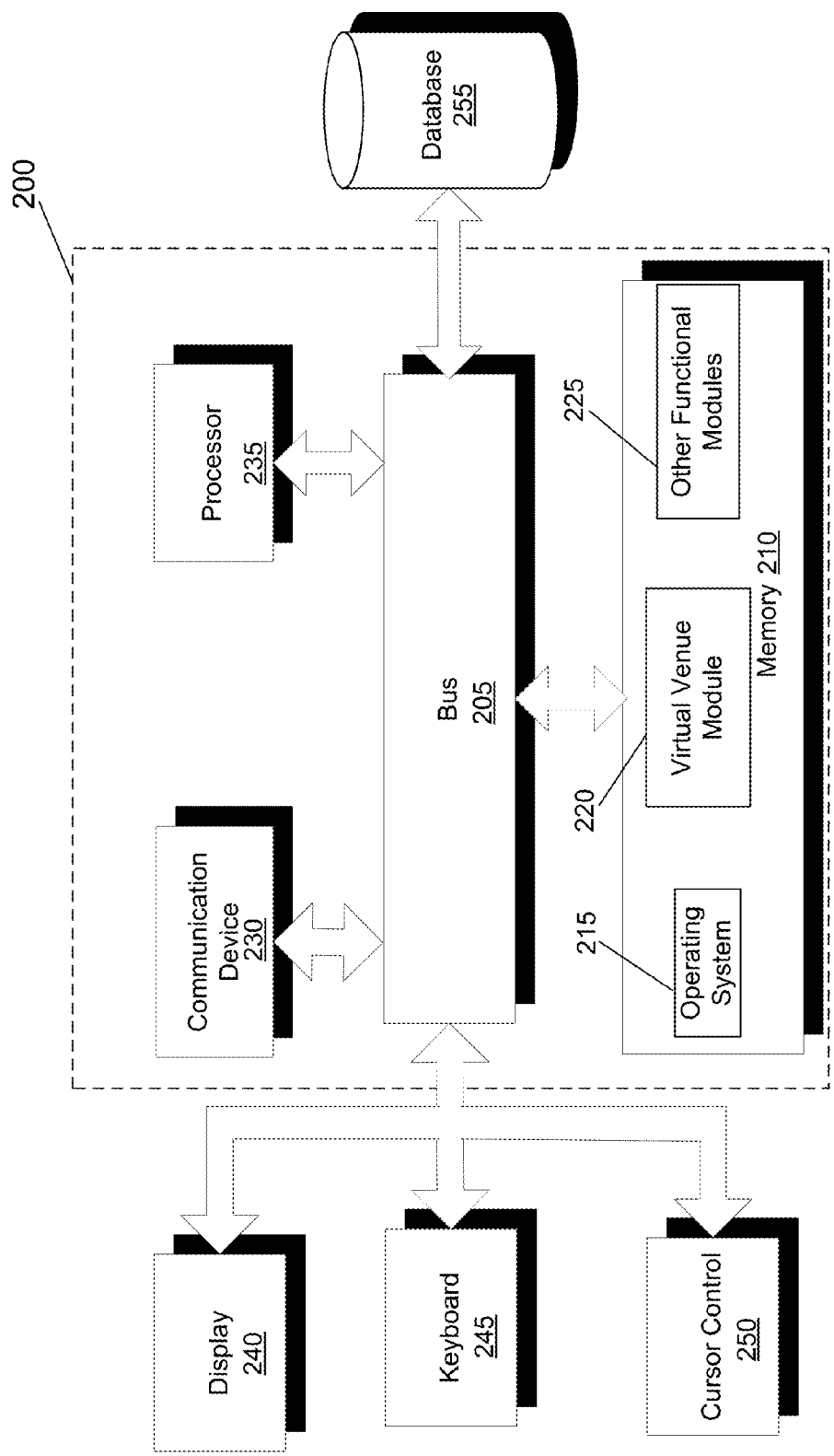
FIG. 2 illustrates a block diagram of an apparatus that implements a virtual venue module, according to an embodiment of the invention.

FIG. 2 illustrates a block diagram of an apparatus 200 that implements a virtual venue module 220, according to an embodiment of the invention. In one embodiment of the invention, apparatus 200 is a server similar to server 110 of FIG. 1. Apparatus 200 includes a bus 205 or other communication mechanism for communicating information between components of apparatus 200. Apparatus 200 also includes a processor 235, operatively coupled to bus 205, for processing information and executing instructions or operations. Processor 235 may be any type of general or specific purpose processor. Apparatus 200 further includes a memory 210 for storing information and instructions to be executed by processor 235. Memory 210 can be comprised of any combination of random access memory (RAM), read only memory (ROM), static storage such as a magnetic or optical disk, or any other type of machine or computer-readable medium. Apparatus 200 further includes a communication device 230, such as a network interface card or other communication interface, to provide access to a network. As a result, a user may interface with apparatus 200 directly, or remotely through a network or any other method. In addition, apparatus 200 may interface with any other computers or devices through a network.

A computer-readable medium may be any available medium that can be accessed by processor 235. A computer-readable medium may include both a volatile and nonvolatile medium, a removable and non-removable medium, and a storage medium. A storage medium may include RAM, flash memory, ROM, erasable programmable read-only memory (EPROM), electrically erasable programmable read-only memory (EEPROM), registers, hard disk, a removable disk, a compact disc read-only memory (CD-ROM), or any other form of storage medium known in the art.

Processor 235 can also be operatively coupled via bus 205 to a display 240, such as a Liquid Crystal Display (LCD). Display 240 can display information to the user. A keyboard 245 and a cursor control device 250, such as a computer mouse, can also be operatively coupled to bus 205 to enable the user to interface with apparatus 200.

According to one embodiment, memory 210 can store software modules that may provide functionality when executed by processor 235. The modules can include virtual venue module 220. Virtual venue module 220 can create and display a virtual representation of a venue, as is described below in greater detail. In certain embodiments, virtual venue module 220 can comprise a plurality of modules that each provide specific individual functionality for creating and displaying a virtual representation of a venue.

According to the embodiment, the modules can also include an operating system 215, as well as other functional modules 225. Operating system 215 can provide an operating system functionality for apparatus 200. Apparatus 200 can also be part of a larger system. Thus, apparatus 200 can include one or more additional functional modules 225 to include additional functionality for the system.

Processor 235 can also be operatively coupled via bus 205 to a database 255. Database 255 can store data in an integrated collection of logically-related records or files. Database 255 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 3:
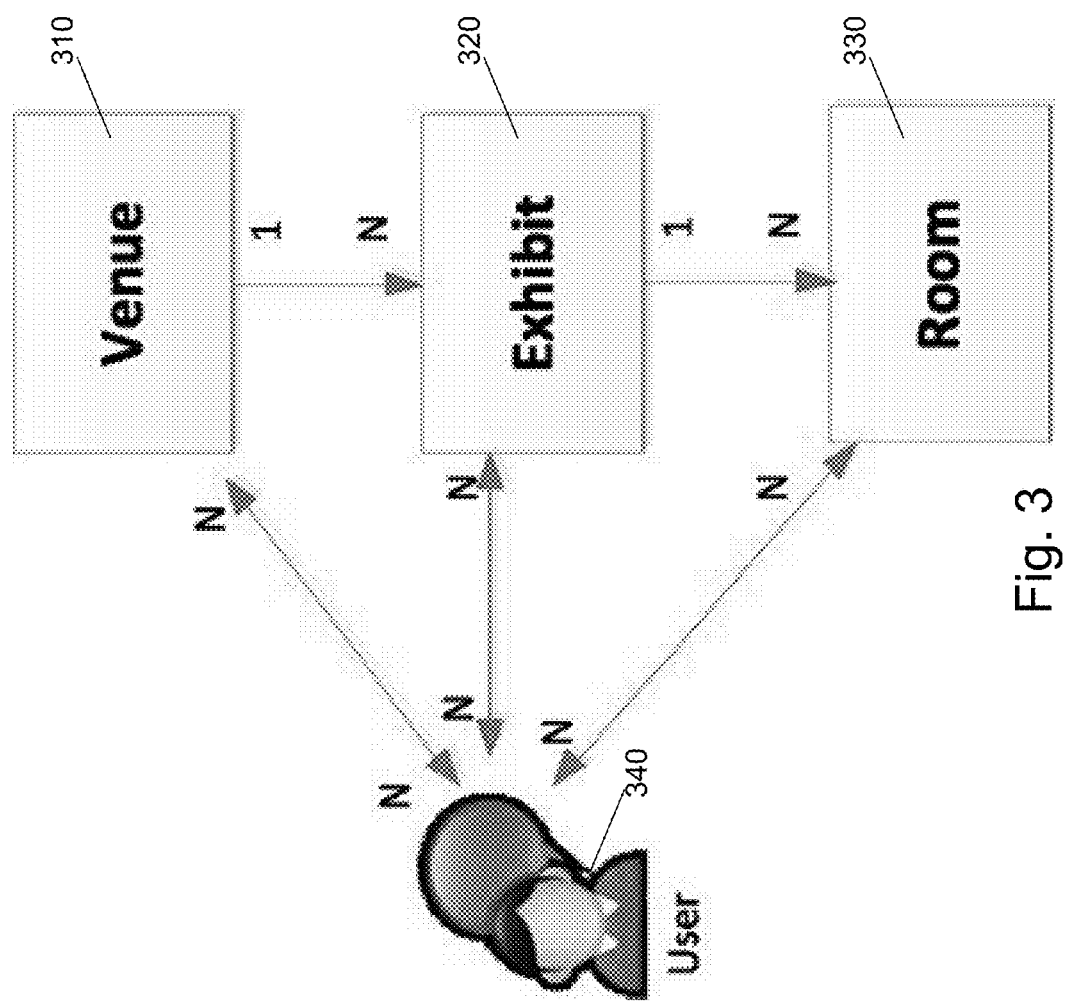
FIG. 3 illustrates a diagram of an object model utilized by a virtual venue application, according to an embodiment of the invention.

FIG. 3 illustrates a diagram of an object model utilized by a virtual venue application, according to an embodiment of the invention. As previously described, a virtual venue application can create and display a virtual venue, such as a memorial or museum, where a memorial is a virtual representation of the physical counterparts of a real memorial, and a museum is a virtual representation of the physical counterparts of a real museum. As also previously described, a virtual venue application can create and display other types of virtual venues, such as the virtual venues previously indicated. Thus, the object model illustrated in FIG. 3 is utilized by the virtual venue application to create and display the virtual representations of the physical counterparts of a real venue.

The object model illustrated in FIG. 3 includes venue 310, exhibit 320, room 330, and user 340. Venue 310 represents a virtual venue with all of its ordinality relationships depicted. As previously described, a virtual venue is a virtual organizational construct, where a type of virtual venue can be one of many different types of virtual venues, including types of virtual venues previously indicated. Exhibit 320 represents a component of a venue with all of its ordinality relationships depicted, where a venue can include one or more exhibits. Exhibits (such as exhibit 320) can be associated with a specific theme, and that can be utilized to organize the content displayed within the venue. Room 330 represents a virtual two- or three-dimensional representation of digital information displayed by the virtual venue application with all its ordinality relationships depicted. Thus, a room is a component of an exhibit, where an exhibit can have one or more rooms. Rooms are described below in greater detail with respect to FIG. 4.

User 340 represents a user of the virtual venue application. According to the embodiments, user 340 can be associated with one or more roles. Examples of roles include: guest, user, member, operator, finance manager, curator, designer, portal administrator, developer, and advertiser. A user associated with a guest role can access the virtual venue application and cause the virtual venue application to display information associated with a venue. A user associated with the guest role is not required to register to create an account, but the user does not have the rights to edit information associated with the venue. A user associated with the guest role can participate with other users of the venue, but participation can be limited. A user who acquires an account in the virtual venue application gains a user role and an ability to be a member of one or more venues. A user who is a member of a specific venue has the rights to "visit" the venue's non-public exhibits and rooms, where the virtual venue application can display the venue to the user. A user who is a member of a specific venue also has the rights to place objects to be displayed within the virtual venue application (identified as ShowObjects). A user associated with an operator role for a specific venue can manage which users have access to the venue, and what rights the users have within the venue. Thus, a user associated with the operator role for a specific venue controls which users have specific privileges. This means that a user associated with an operator role for a specific venue can also control which users have access to the venue's exhibits. A user associated with a finance manager role for a specific venue can access current payments due that are associated with the specific venue, can change a payment method associated with the specific venue, can browse payment history associated with a value, and can access revenues generated that are associated with the specific venue. A user associated with a curator role for a specific venue controls a room layout of one or more exhibits within the specific venue. Thus, a user associated with the curator role for a specific venue can create, delete, and modify a room layout associated with an exhibit, and may also suggest objects to be placed in a specific room. A user associated with a designer role for a specific venue can modify a layout and presentation of a single room or multiple rooms. A user associated with a portal administrator role for the entire virtual venue application can access one or more portal administrator screens that administer areas of the virtual venue application, such as statistics, billing, members, and venues. A user associated with a developer role can construct new items that can be utilized by the virtual venue application. A user associated with the developer role can provide new modules and new XML definitions that can be utilized by the virtual venue application. A user associated with the developer role can also import new objects to be displayed within the virtual venue application (identified as ShowObjects), ShowObject collections, as well as avatar accessories. A user associated with the advertiser role can create, modify, or delete advertisements within a venue of an advertiser venue type. In some embodiments, a guest can only browse virtual venues but not enter them, while, in other embodiments, a guest can enter any public virtual venues. In some embodiments, a guest is required to become a user to enter any virtual venue, even public virtual venues. This means that the user needs to become a member of a site that hosts the virtual venue application. One a user is a member of the site, a user may become a member of specific private, membership-only virtual venues. This can only happen via a request to the virtual venue or an invitation from the virtual venue's operator. Once a member, depending on the access settings of a specific room, a member may or may not be able to place their own virtual objects in a room.

For example, a statistics screen can present an overview of the following: virtual venue statistics (such as museum statistics and memorial statistics), member statistics, and visitor statics. These statistics can be further studied for quantity, pareto/histograms showing distribution of various characteristics, member and user activity (such as concurrent user activity on the virtual venue application), and recent visitation numbers. A billing screen can display revenue studies of paying members and virtual venues, list of members that are past due, and billing models that govern how a virtual venue is to be paid for. A members screen can provide a user the ability to manage member accounts. A user associated with a portal administrator role can view site member account statistics, such as site membership start date, number of virtual venues, billing model plans, total revenue, and account current status, and can enable or disable accounts. A virtual venues screen can provide a user associated with a portal administrator role the ability to manage virtual venues. A user associated with a portal administrator role can view virtual venue statistics, such as founded date, founder(s), theme, number of exhibits, number of rooms, number of public exhibits and rooms, link to virtual venue, billing model plan, and total revenue. According to the embodiment, each user can access one or more virtual venues, and each virtual venue can have one or more users assigned to it. In certain embodiments, an advertisement can be displayed based on an amount of traffic associated with the virtual venue. In some of these embodiments that require a finer grain of control, advertisements can be displayed based on an amount of traffic associated with a specific exhibit or room of the virtual venue.

According to certain embodiments, the object model illustrated in FIG. 3 can also include a venue group (not shown). A venue group is a representation of one or more associated venues, and thus, a venue group can include one or more venues.

Figure 4:
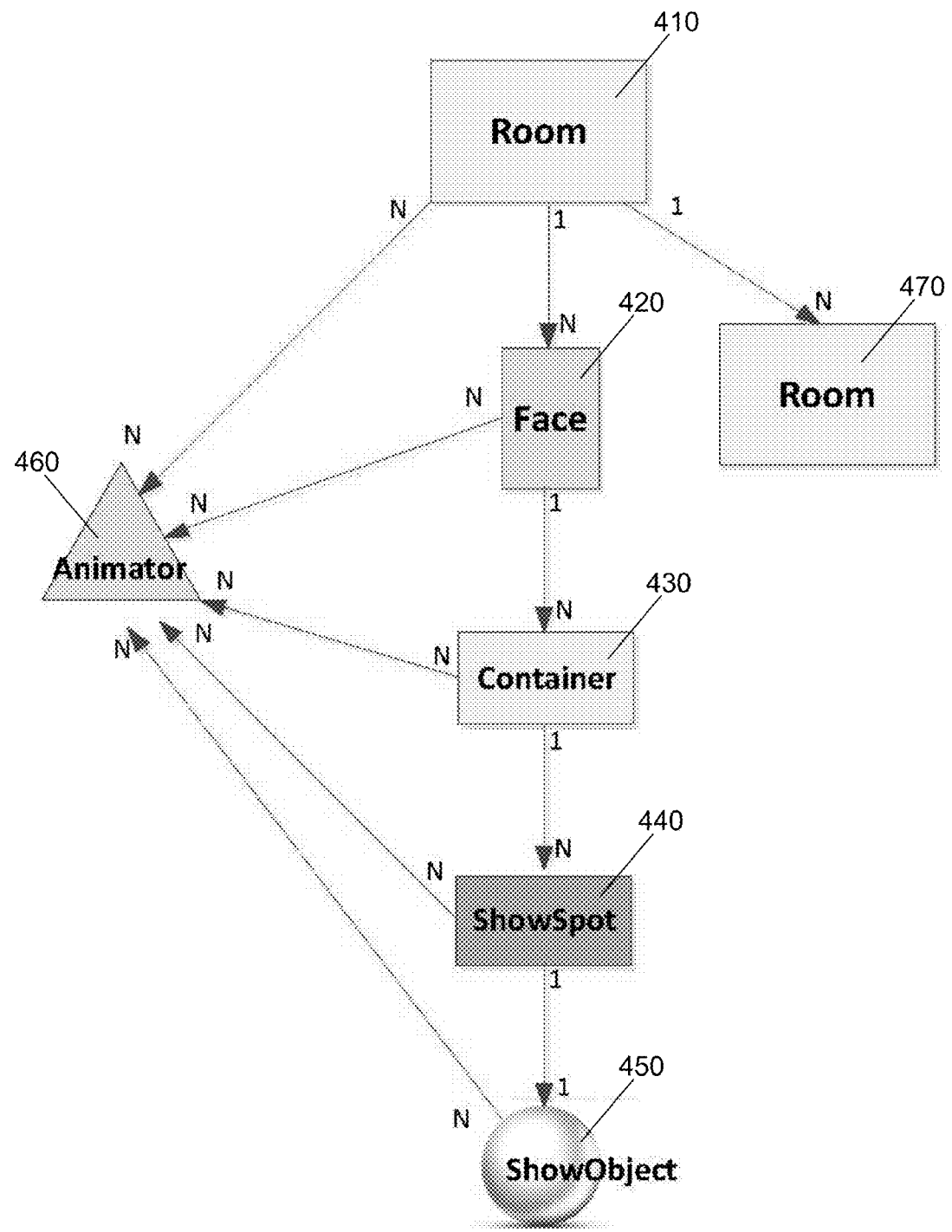
FIG. 4 illustrates a diagram of an object model of a room, according to an embodiment of the invention.

FIG. 4 illustrates a diagram of an object model of a room, such as room 410, according to an embodiment of the invention. As previously described, a room (such as room 410) is a virtual two- or three-dimensional representation of digital information displayed by the virtual venue application. According to the embodiment, a room has one or more faces, such as face 420. A face is a virtual surface displayed by the virtual venue application. The virtual venue application can display a room (such as room 410) with any configuration of faces (such as face 420), and is not limited to a standard rectangle room, or even a floor with vertical walls. A configuration of one or more faces can generate very sophisticated and elaborate rooms in order to provide a sophisticated two- or three-dimensional virtual environment that is displayed by the virtual venue application to the user. For example, a room can be a spherical shape with a single face. Faces are described below in greater detail in relation to FIG. 5.

A face has one or more containers, such as container 430, where a container is a holder for objects to be displayed within the virtual venue application (identified as ShowObjects). Thus, a container is a displayer container that can be attached to a face. Containers are described below in greater detail in relation to FIG. 6.

According to the embodiment, a container has one or more ShowSpots, such as ShowSpot 440, where a ShowSpot is an object mount that can host a display object to be displayed within the virtual venue application (i.e., a ShowObject). Thus, a ShowSpot is an example of an object mount, and a ShowObject is an example of a display object. In the illustrated embodiment, a ShowSpot, such as ShowSpot 440 can only host one ShowObject. However, in alternate embodiments, a ShowSpot can host one or more ShowObjects. A notable attribute of a ShowSpot is its position declaration. The position declaration may take on one of the following forms: (1) an absolute (x,y,z) coordinate position on the container; (2) a rule-based (x,y,z) coordinate position on the container that allows a degree of freedom in where the ShowObject is placed (for example, along a line or cover, or within a region); and (3) a dynamic coordinate position, which is a position declaration for a region stating that there may be any number of ShowObjects placed as desired up to a limit and based on specific rules. For example, the rules can restrict ShowObject dimensions, and can enforce avoidance of ShowObject collision, if desired.

According to the embodiment, as previously described, a ShowSpot has a ShowObject, such as ShowObject 450, where a ShowObject is a display object that is displayed within the virtual venue application. ShowObjects are the main reason that the other constructs exist, as the ShowObjects represent the digital information that comprises the virtual venue displayed by the virtual venue application. Thus, the other constructs "organize," "hold up" and present the ShowObjects. ShowObjects can be two- or three-dimensional objects that represent real or imagined objects. In certain embodiments, ShowObjects can also publish one or more properties that can be manipulated to modify a display of the ShowObjects.

Any of the objects of the object model illustrated in FIG. 4 can have one or more animators, such as animator 460, associated with it. An animator manipulates one or more properties of its associated object(s). Thus, an animator is what gives dynamic characteristics to an exhibit of a virtual venue displayed within the virtual venue application. The dynamics may be very simple or very sophisticated. Properties that can be manipulated by an animator can include positions, colors, transparencies, dimensions, textures, adding/deleting faces, containers, or other objects, or any other visual properties. According to the embodiment, a relationship of animators to each other object is N to N. This is because any object can have multiple animators assigned to it, and each animator can be reused by multiple objects.

The room object model illustrated in FIG. 4 can be used to provide room geometry for a room displayed within the virtual venue application. The room geometry can range from simple geometry to more sophisticated geometry, so that very sophisticated and elaborate rooms can be built by a user. In certain embodiments, a room may contain other "child" rooms, such as room 470. One use of such child rooms is to construct an outer environment (such as an ocean, a field, space diorama, planetarium, greenhouse, garden, or other environment). According to these embodiments, one or more faces of the room may be transparent, to allow the outer environment to be displayed to a user, in order to provide a pleasing presentation. Additionally, a room can have entirely all transparent faces. In this way, the displayed objects can be mounted, but can look like they are outside, especially if a room is completely transparent, and an outer room includes stunning visuals. Furthermore, faces of a room do not have to be restricted to an enclosed space, or even a continuous collection of faces. Faces may be placed anywhere, even in the middle of a room, and can be opaque, partially transparent, or fully transparent.

In certain embodiments, the virtual venue application can provide one or more venue templates for creating a virtual venue. A venue template is a virtual venue that is partially created, and that can have one or more variables, where each variable can control a specific attribute of the virtual venue. A user of the virtual venue application can utilize a venue template to create a virtual venue, rather than creating the virtual venue from scratch. According to the embodiments, when utilizing a venue template to assemble a virtual venue, the venue template can include one or more created exhibits, where each completed exhibit can include one or more completed rooms. In certain embodiments, each completed room can include one or more completed containers, where each completed container can include one or more completed ShowObjects. In certain embodiments, the venue template can include one or more ShowObject libraries that can make it easier to add customer items within specific themes. In certain embodiments, a form can be assembled which is based on any variables of the one or more variables of the venue template.

According to the embodiments, the one or more variables can be used to control dimensions of one or more components of the venue that can be created based on the venue template. For example, one or more equations can be used to govern a size of a room's length. The length can be described, for example, as "RoomLengthPercent *30," so that a length of the room can be lengthened or shortened based on the variable being greater or smaller than 100%. As another example, a variable can be a name that can be inserted into a title of one or more exhibits, one or more rooms, and/or one or more ShowObjects.

Figure 5:
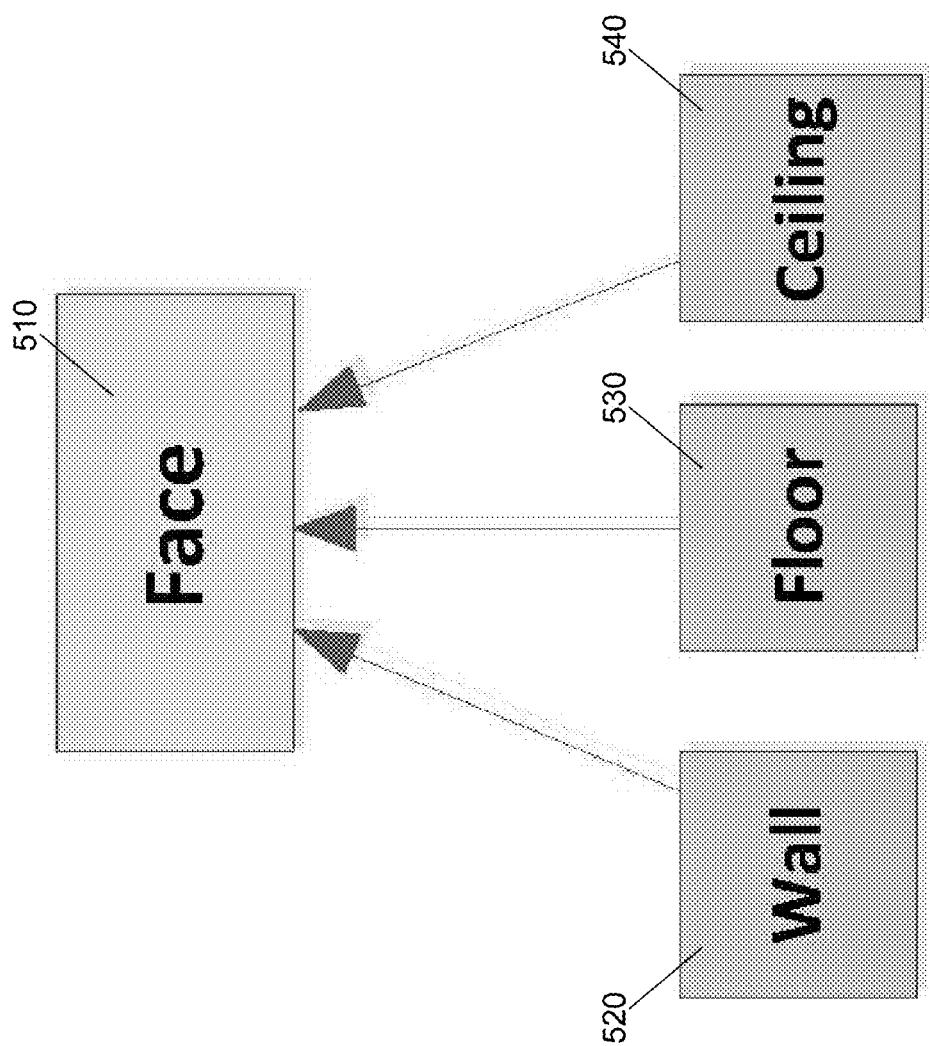
FIG. 5 illustrates a diagram of an object model of a face, according to an embodiment of the invention.

FIG. 5 illustrates a diagram of an object model of a face, according to an embodiment of the invention. A face, such as face 510, can be one of three types of faces: a wall (such as wall 520), a floor (such as floor 530), and a ceiling (such as ceiling 540). The determination of which type a face is, is primarily determined by whether it is intended that containers rest on the face (where the face is a floor), hang on the face (where the face is a wall), or hang from the face (where the face is a ceiling. The following rules are adhered to for each face. First, faces are declared as being one of the three face types. Second, faces are surfaces which are sheet-like whether or not they have a regular or irregular shape. Thus, a face has two sides, and one side is declared as being a "display" side. Third, faces have texture, color, transparency, and other graphic properties. In certain situations, a face can be displayed with 100% transparency.

Figure 6:
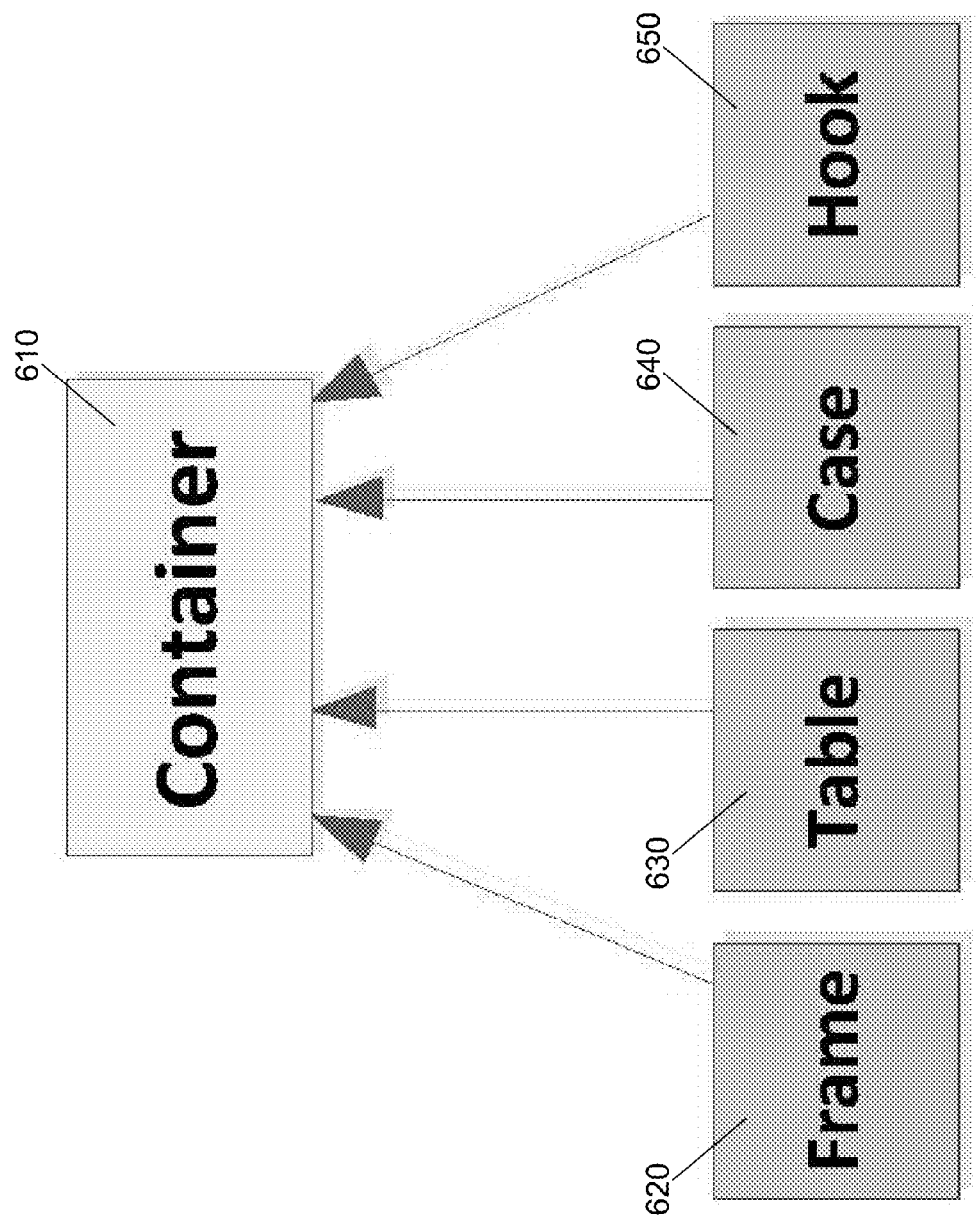
FIG. 6 illustrates a diagram of an object model of a container, according to an embodiment of the invention.

FIG. 6 illustrates a diagram of an object model of a container, according to an embodiment of the invention. According to the embodiment, a container, such as container 610, is one of four default types. The four default types are frame (such as frame 620), table (such as table 630), case (such as case 640), and hook (such as hook 650). Where a container is a frame container type, the container is configured to be attached to a face that is a wall, and the container is configured to be displayed as a virtual frame that surrounds one or more ShowObjects positioned within the virtual frame. When a container is a table container type, the container is configured to be attached to a face that is a floor, and the container is configured to be displayed as a virtual table that supports one or more ShowObjects positioned on top of the virtual table. When a container is a case, the container is configured to be attached to a face that is a floor, and the container is configured to be displayed as a virtual case that contains one or more ShowObjects positioned within the virtual case. When a container is a hook, the container is configured to be attached to a face that is a ceiling, and the container is configured to be displayed as a virtual hook that supports one or more ShowObjects positioned so that they hang from the virtual hook. In certain embodiments, other container types can be designed for the container object model.

FIG. 7 illustrates a diagram of a screen navigation model 700 of a virtual venue application, according to an embodiment of the invention. Screen navigation model 700 includes a navigation model for a user associated with a guest role, and a user associated with a user role. As can be seen in FIG. 7, a user associated with a user role has more options that a user associated with a guest role but the additional options are only available when the user has specific additional roles and only within the venues that they have such roles. As one of ordinary skill in the art would readily appreciate, screen navigation model 700 is merely an example navigation model of a virtual venue application, and a virtual venue application can have other navigation models that are different from screen navigation model 700, and still be within a scope of the invention.

FIGS. 8-27 each illustrate a user interface that can be created by a virtual venue module, executed on server, where the user interface is displayed to a user at a screen of a client. However, as one of ordinary skill in the art would readily appreciate, each user interface illustrated in FIGS. 8-27 is merely an example user interface according to an embodiment of the invention. In alternate embodiments, the virtual venue module may display a user interface that has a different appearance from the user interfaces illustrated in FIGS. 8-27.

Figure 8:
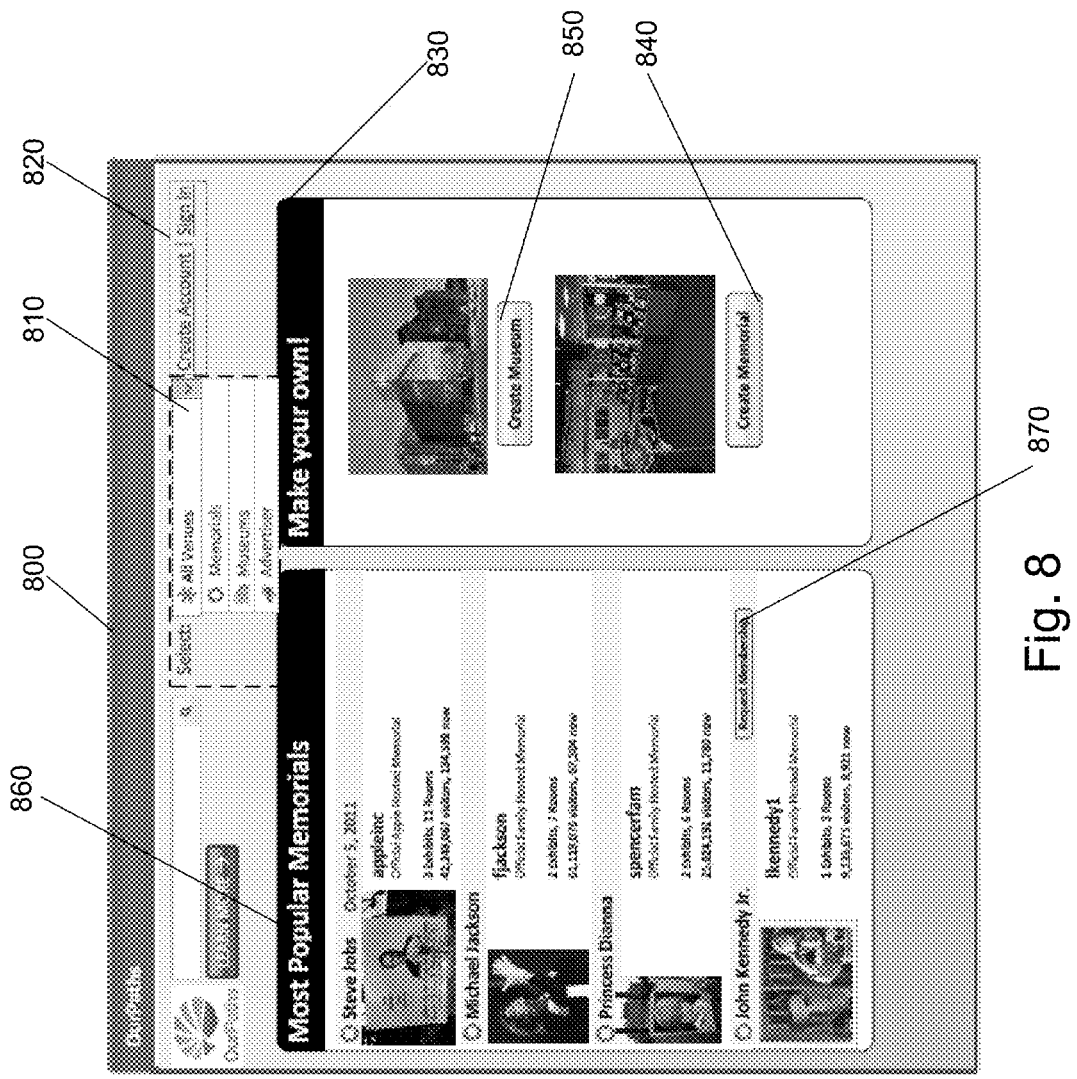
FIG. 8 illustrates an example user interface of a virtual venue application displaying a guest screen, according to an embodiment of the invention.

FIG. 8 illustrates an example user interface 800 of a virtual venue application displaying a guest screen, according to an embodiment of the invention. As previously described, a user associated with a guest role can access the virtual venue application and cause the virtual venue application to display information associated with a virtual venue, but the user is not required to register to create an account, and the user does not have the rights to edit information associated with the virtual venue. Thus, according to the embodiment, a user associated with the guest role can use the guest screen displayed in user interface 800 to browse and enter virtual venues, such as museums or memorials, without logging in to the virtual venue application, if the virtual venues are public. The user can click on virtual venue select filter 810 to filter results that are displayed in user interface 800, such as displaying only museums, or displaying only memorials. Alternatively, a user can select an "all venues" option which does not filter the results, so that all results are displayed in user interface 800. While in the illustrated embodiment, virtual venue select filter 810 displays three virtual venue types, virtual venue select filter can display any number of virtual venue types. Thus, in alternate embodiments, whenever additional virtual venue types are added by a user associated with a portal administrator role, the additional virtual venue types are also listed. A user that does have an account can click on sign-in link 820 to sign into the account.

User interface 800 also displays a "create virtual venue screen" 830, which displays the option to create a virtual venue, such as a memorial or a museum, using the virtual venue application. More specifically, in the illustrated embodiment of FIG. 8, the user can click on either create memorial 840 or create museum 850. In certain embodiments, when a user clicks on either create memorial 840 or create museum 850, and the user has not already created an account with the virtual venue application, the virtual venue application can require the user to create an account before proceeding with the creation of the museum or memorial. In other alternate embodiments, create virtual venue screen can display options for creating other types of virtual venues.

User interface 800 also displays a display virtual venue screen 860, which displays one or more virtual venues that have already been created. A user can select one of the virtual venues displayed within virtual venue screen 860, which can cause the virtual venue application to display the selected virtual venue. In certain embodiments, some virtual venues can have a request membership button 870 displayed along with the virtual venue. This is only available if there are some parts of the virtual venue that do not have public access, and a specific venue's operator has made these areas available to members, and the operator has allowed users to request membership.

In certain embodiments, every virtual venue has a unique uniform resource locator (URL). Each URL can be utilized by a user to immediately advance to an initial room of the virtual venue, where an initial room can be a two- or three-dimensional rendition of a virtual venue common area, and can include one or more exhibit entry points (also identified as a virtual venue atrium). A virtual venue atrium is further described in greater detail in relation to FIG. 25. An example URL for a venue is as follows:

http://www.ourpaths.com/<plural of VenueType>/<venueName> for example http://www.ourpaths.com/memorials/<memorialName>

According to these embodiments, each exhibit and room also have a unique URL. An example URL for an exhibit is as follows:

http://www.ourpaths.com/<plural of VenueType>/<venueName>/<exhibitName>

An example URL for a room is as follows:

http://www.ourpaths.com/<plural of VenueType>/<venueName>/<exhibitName>/<roomName>

When a virtual venue URL is submitted to the virtual venue application by a user, the user's credentials can be checked before a web page (or screen) associated with the URL is displayed to the user. In certain embodiments, if the virtual venue has at least one public area, then the web page can be displayed to the user without a credentials check. If the virtual venue does not have any public areas, then the user's credentials will be checked. If the user is already logged in to the virtual venue application, the credentials are checked automatically. If the user is not logged in to the virtual venue application, then a logic screen is presented, intercepting the intended web page. Once the user is logged in successfully, the destination web page can be displayed. In situations where a user attempts to access a virtual venue that the user does not have a membership for, an error message can be displayed to the user indicating to the user that the user is not a member of the virtual venue. The error message can include a request membership button that allows a user to request membership to the virtual venue when clicked. The credentials check can also be performed when a user submits a exhibit URL or room URL as well.

According to an embodiment, when a user enters a virtual venue of the virtual venue application, such as a museum or memorial, the virtual venue application displays a two- or three-dimensional virtual environment where the user is represented by a virtual avatar that can move around the virtual environment. For any initial virtual venue entry, the virtual venue application can display a virtual venue map station. By clicking on a virtual venue map station, the virtual venue application can display a virtual venue navigator which not only depicts the layout of the entire virtual venue, but also displays each exhibit or room of the virtual venue, and allows a user to immediately navigate to that exhibit or room. A virtual venue map station is further described in greater detail in relation to FIG. 9. In certain embodiments, the virtual venue application can restrict access to one or more rooms of the virtual venue based on one or more permissions. Such permissions can include one or more roles associated with a user, and a date and/or time. In certain embodiments, each room can include a distinct set of access restrictions.

According to the embodiment, a virtual avatar that represents a user of the virtual venue application includes a suite of functionality. Such functionality includes the appearance of the virtual avatar, which is customizable by the user. The avatar may be invisible to other users, or appear with multiple possible attributes. For example, a user can customize a face, body size, legs, hair, hands, and race of the virtual avatar. The user can also customize clothing of the virtual avatar. For example, if a virtual venue has a Renaissance Era theme, the user can customize the clothing of the virtual avatar with clothing that is appropriate for the Renaissance Era. A virtual avatar can include one or more badges on their clothes to denote their contributor roles to the virtual venue. Badges may also be awarded for various activities (such as visit count, visit of specific virtual venue type count, sharing content, and sharing comments). Virtual avatars can also present badges on their closes to denote contributor roles. Examples of badges are further described below in greater detail. The virtual avatar functionality also includes interaction with another virtual avatar that represents another user of the virtual venue application. By clicking on another virtual avatar, a user can communicate with the virtual avatar, or follow the virtual avatar as it moves around the virtual venue. Such communications can include a virtual venue public communication, an exhibit-only public communication, a room-only public communication, and a private communication. A virtual avatar can be a non-person avatar which can act as a "how to" guide, an information/search guide, a full virtual venue tour guide, an exhibit tour guide, a specialized tour guide, and a virtual venue store clerk. A "how to" guide is a non-person avatar that can have the ability to answer questions of one or more users. An information/search guide is a non-person avatar that can have the ability to answer questions of one or more users, or perform a search of the virtual venue based on a user's inquiry. A full venue tour guide is a non-person avatar that can have the ability to provide a tour through the entire virtual venue (i.e., all exhibits). An exhibit tour guide is a non-person avatar that can have the ability to provide a tour through one or more exhibits of the virtual venue. A specialized tour guide is a non-person avatar that can have the ability to provide a tour through one or more exhibits associated with one or more themes. A venue store clerk is a non-person avatar that can have the ability to answer questions of one or more users, or facilitate one or more sales transactions. Virtual avatar functionality also includes ability to capture a picture within the virtual venue and create a virtual picture album. Virtual avatar functionality also includes ability to capture video within the virtual venue and create a virtual video album. Virtual albums are described below in greater detail. Virtual avatar functionality also includes ability to share captured pictures and videos with other virtual avatars. Other virtual avatar functionality includes downloading content, performing transactions including sales transactions, and posting content on social media, such as Facebook®. Furthermore, the virtual venue application can maintain a record of all activities performed by one or more virtual avatars. Such activities can include visiting virtual venues, visiting exhibits of virtual venues, visiting rooms of exhibits of virtual venues, interacting with ShowObjects, interacting with other virtual avatars, downloading content, and conducting financial transactions.

In certain embodiments, awards, such as badges and titles, can be awarded to one or more users of the virtual venue application. Awards can be divided into two categories: user awards and venue awards. In the user awards category, badges can include a revolving door badge, a sharer badge, an object sharer badge, a <Venue Type> buff badge, a dedication badge, a senior version of the aforementioned badges, and a master version of the aforementioned badges. A revolving door badge is a badge that can be awarded to a user for visiting a virtual venue a specific number of times in a specific time period. A sharer badge is a badge that can be awarded to a user for contributing a specific number of text items to a virtual venue. An object sharer badge is a badge that can be awarded to a user for contributing a specific number of ShowObjects to a virtual venue. A <Venue Type> buff badge is a badge that can be awarded to a user that is a member of a specific number (or more than a specific number) of a specific virtual venue type. A dedication badge is a badge that can be awarded to a user for spending a specific duration (or more than a specific duration) within a virtual venue. A senior version of the aforementioned badge is any aforementioned badge that can be awarded to a user for achieving double the requirement of the aforementioned badge. A master version of the aforementioned badge is any aforementioned badge that can be awarded to a user for achieving quadruple the requirement of the aforementioned badge.

Also in the user awards category, titles can be obtained per venue theme, per venue, or overall, and can include a "most venues" title, a "most dedicated" title, and a "most visits" title. A "most venues" title is a title that can be awarded to a user that is a member of a largest number of virtual venues. A "most dedicated" title is a title that can be awarded to a user that has spent the most time in a virtual venue. A "most visits"

title is a title that can be awarded to a user that has visited a virtual venue a highest number of times. Titles can be gained but then lost if another user achieves a better score associated with what the title represents.

In the venue awards category, badges can include a "100 visitors" badge, a "100 returning visitors" badge, a senior badge for the aforementioned badges, a master badge for the aforementioned badges, and an elite badge for the aforementioned badges. A "100 visitors" badge is a badge that can be awarded to a virtual venue for having a hundred or more visitors. A "100 returning visitors" badge is a badge that can be awarded to a virtual venue for having a hundred or more returning visitors. A senior badge is any aforementioned badge that can be awarded to a user for achieving double the requirement of the aforementioned badge. A master badge is any aforementioned badge that can be awarded to a user for achieving quadruple the requirement of the aforementioned badge. An elite badge is any aforementioned badge that can be awarded to a user for achieving eight times the requirement of the aforementioned badge.

Also in the virtual awards category, titles can be obtained per venue theme, per venue, or overall, and can include a "most visits" title, and a "most liked" title. A "most visits" title is a title that can be awarded to a virtual venue that has received a highest number of visits. A "most likes" title is a title that can be awarded to a virtual venue that received a highest number of "likes," where a "like" can be received via a social network website or application, such as FaceBook®.

According to an embodiment, a virtual album can be associated with each virtual avatar, where the virtual album collects one or more pictures and videos collected from a virtual still camera and virtual video camera, respectively, where the virtual still camera and the virtual video camera are each associated with the virtual avatar. As part of collecting the one or more pictures and videos, the following attributes can be added to each picture or video: an automatic date and/or time stamp; an automatic link for a venue/exhibit/room coordinate in a room and spherical coordinate for direction of camera, a size, a time length (if video), and a request for title. Each virtual album can also be identified as a scrap album. Also, a user can employ an album manager to copy and paste album pictures and videos into specific virtual albums that can be separately created and edited.

According to an embodiment, a virtual environment displayed by a virtual venue application can include one or more buttons. A button can be a ShowObject, or can be a separate object that is attached to a ShowObject. A button can perform a specified functionality defined by the virtual venue application. A button can be selected by a user associated with a room designer role and assigned to a ShowObject. Examples of buttons include: a link, an "Add Photo or Video" button, an "Add Sculpture" button, an "Add Article" button, an "Add Application" button, an "Add Link" button, and an animator. A link can be used to download documents or files. A link can also be used to open a second window, or to replace the current window. A special type of link is a transport link, which is associated with transporter functionality provided by the virtual venue application for transporting a virtual avatar to a different location within the virtual venue, or to a location within another virtual venue. The transport link can be displayed within the virtual environment as an icon of a transporter, and can be clicked on by a user to transport the virtual avatar associated with the user. Virtual avatar transport functionality is described below in greater detail. An "Add Photo or Video" button can be used to add a picture or a video, which is contained within a frame or other container displayed within the virtual environment, to a virtual album. An "Add Sculpture" button can be used to add a three-dimensional model to a virtual album. An "Add Article" button can be used to download a document, such as a Portable Document Format (PDF), into a virtual notebook, where virtual notebooks are described in greater detail below. An "Add Application" button can be used to download a scripted interactive application, such as a Flash® application, into a virtual notebook, where virtual notebooks are described below in greater detail. An "Add Link" button can be used to download a web link into a virtual notebook, where virtual notebooks are described in greater detail below. An animator can be used to cause an associated ShowObject to animate and/or change its appearance and/or play audio.

According to an embodiment, a virtual notebook can be associated with a virtual avatar, where a virtual notebook can collect one or more objects. Thus, a virtual notebook can be a more sophisticated collection tool as compared to a virtual album. A virtual notebook can collect and store any type of object (including pictures, videos, and three-dimensional models). A virtual notebook can be fully index-able and searchable by a keyword or theme. A virtual notebook can act as a research tool for education, study, or investigation. A user can employ a notebook manager to create, cut, past, and edit one or more virtual notebooks.

According to an embodiment, as previously described, a virtual avatar can be transported from a first location of a first virtual venue of a first virtual venue application to a second location of a second virtual venue of a second virtual venue application. In this embodiment, information representing the virtual avatar (such as an appearance of the virtual avatar, the first location (i.e., a position of the virtual avatar relative to the first virtual venue), and a user associated with the virtual avatar) is stored by the first virtual venue application and transmitted to the second virtual venue application. The second virtual venue application can then assign a position to the virtual avatar relative to the second virtual venue (i.e., the second location). From a perspective of the user associated with the virtual venue, the first location of the first virtual venue of the first virtual venue application is first displayed within a user interface before the transportation. After the second transportation, the second location of the second virtual venue of the second virtual venue application is displayed within the user interface. In an alternate embodiment, a virtual avatar can be transported from the first location of the first virtual venue of the first virtual application to a second location of a second virtual venue of the first virtual venue application (where the first and second locations are within the same virtual venue application). In this embodiment, the first venue application stores the information representing the virtual avatar, and also assigns a position to the virtual avatar relative to the second virtual venue.

In certain embodiments, one or more objects that are associated with the virtual avatar can be transported along with the virtual avatar. Such objects can include virtual pictures, virtual videos, two-dimensional or three-dimensional virtual sculptures, virtual documents, virtual albums, virtual notebooks, and virtual carriers. Pictures, videos, sculptures, documents, albums, and notebooks have been described. A virtual carrier is a virtual container that can be associated with a virtual avatar, and that can contain one or more ShowObjects. In certain embodiments, the virtual carrier can be a virtual purse, a virtual knapsack, a virtual bag, or some other kind of virtual container. In some embodiments, the virtual carrier has a virtual appearance of a virtual purse, a virtual knapsack, a virtual bag, or some other kind of virtual container. In certain embodiments a developer can develop ShowObjects that include executable code for custom applications that can be stored within a virtual carrier. In certain embodiments, a virtual carrier can contain a virtual chatphone, where a virtual chatphone can provide functionality for initiating a chat session with a user of a chat protocol, such as Yahoo Messenger®, Microsoft Network (MSN) Messenger®, America Online®. In certain embodiments, a virtual carrier can contain a virtual ticket book, where the virtual ticket book can provide functionality for displaying within a user interface one or more tickets associated with the virtual avatar. In some of these embodiments, email message can be sent to a user of the virtual venue application, where the email message includes a virtual ticket associated with the virtual venue. The virtual ticket can be electronically signed, and authenticated to provide access to the virtual venue to the user, where the virtual ticket can include an expiration date. In certain embodiments, a virtual carrier can contain a virtual album, where a virtual album can include one or more pictures, videos, or sculptures. In certain embodiments, a virtual carrier can contain a virtual notebook, where a virtual notebook can includes one or more pictures, videos, sculptures, documents, applications, or other files. In certain embodiments, a virtual carrier can contain a virtual address book, where the virtual address book can include one or more contacts within the virtual venue application. In some embodiments, the virtual address book can provide functionality for sending email messages to one or more contacts using an email program, such as Google's Gmail®, or Yahoo Mail®. In certain embodiments, at least one object of the one or more includes executable code or an executable script. In these embodiments, one or more object events associated with the at least one object can be transported. Furthermore, in these embodiments, one or more buttons associated with the at least one object can also be transported. Finally, the executable code, or the executable script, can be executed within the virtual venue application that the virtual avatar is transporting to. In certain embodiments, virtual avatar history that is associated with the virtual avatar can be transported along with the virtual avatar. As previously described, virtual avatar history can include all activities performed by the virtual avatar. Such activities can include visiting virtual venues, visiting exhibits of virtual venues, visiting rooms of exhibits of virtual venues, interacting with ShowObjects, interacting with other virtual avatars, downloading content, and conducting financial transactions.

In certain embodiments, one or more design choices, such as one or more palettes used in designing one or more rooms of a first virtual venue, can be transported along with the virtual avatar. This can facilitate the creation of rooms within a second virtual venue, where the rooms of the second virtual venue have a similar look and feel to the rooms of the first virtual venue. Also, in certain embodiments, one or more preferences can be transported along with the virtual avatar. For example, these preferences can include browsing preferences of a user associated with the virtual avatar, and the browsing preferences can be stored within a first virtual venue application that provides the first virtual venue. As another example, these preferences can include, display preferences, virtual avatar appearance preferences, or text preferences. These preferences can also include other preferences that can be associated with the virtual avatar and transported along with the virtual avatar. In certain embodiments, a destination virtual venue can interpret the one or more preferences, and present aspects of the virtual venue based on the one or more preferences.

In certain embodiments, before a virtual avatar is transported from a first location of a first virtual venue of a first virtual venue application to a second location of a second virtual venue of a second virtual venue application, one or more rules associated with transportation of a virtual avatar can be checked. A rule associated with transportation of a virtual avatar can include one or more conditions based on one or more attributes of a virtual venue application, where the conditions can be applied to the attributes at the time of the attempted transportation. Attributes of a virtual venue application can include, for example, a user associated with the virtual avatar, one or more roles associated with the user, a position of the virtual avatar, a date/or time or any other attribute of a virtual venue application. A rule associated with transportation of a virtual avatar can be stored within a virtual venue application, and can be automatically applied when a virtual avatar is about to transport from a first location to a second location. In certain embodiments, each rule is associated with a specific virtual venue of a virtual venue application. In other embodiments, each rule is a global rule associated with the entire virtual venue application. In yet other embodiments, some rules can be associated with a specific virtual venue, and other rules are global rules associated with the entire venue application. In some embodiments, each rule is applied by a virtual venue or virtual venue application that the virtual avatar is transporting from. In other embodiments, each rule is applied by a virtual venue or virtual venue application that the virtual avatar is transporting to. In certain embodiments, the transportation of the virtual avatar from the first location to the second location can be prevented, where the transportation does not satisfy any of the stored rules. In certain embodiments, rules that are unsatisfied and that prevent transportation of the virtual avatar can cause the destination virtual venue application, or specific virtual venue, to display a screen within a user interface, where the screen can require a user to perform an action to allow the transportation of the virtual avatar. For example, a user can enter payment information within the displayed screen, where, upon receiving the payment information, the destination virtual venue application, or specific virtual venue, allows the transportation of the virtual avatar to be achieved.

In certain embodiments, before a virtual avatar is transported from a first location of a first virtual venue of a first virtual venue application to a second location of a second virtual venue of a second virtual venue application, one or more preferences associated with the virtual avatar can be checked. If one or more aspects of the second virtual venue do not comply with one or more preferences associated with the virtual avatar, the transportation of the virtual avatar from the first location to the second location can be prevented. In other embodiments, preferences that conflict with aspects of the second virtual venue, and that prevent transportation of the virtual avatar, can cause the destination virtual venue application, or specific virtual venue, to display a screen within a user interface, where the screen can require a user to perform an action to allow the transportation of the virtual avatar. For example, a user can indicate an override by clicking "Yes" on a dialog box, and, upon receiving the indicated override, the destination virtual venue application, or specific virtual venue, allows the transportation of the virtual avatar to be achieved.

According to an embodiment, a virtual venue application can provide a virtual tour of one or more virtual venues, where the virtual tour includes one or more virtual avatars that can act as tour guides. The virtual tour is an organized pre-defined presentation of one or more exhibits of a virtual venue, where the virtual tour can include a presentation of one or more rooms of each exhibit, and one or more ShowObjects of each room. A virtual tour can be a very important feature of a virtual venue that can be created by virtual venue application, as the organized presentation can hold a user's attention, as the virtual tour maintains a consistent theme throughout the virtual tour, as opposed to users moving around the virtual venue in a disorganized manner. In certain embodiments, one or more badges can be awarded to users for creating virtual tours and attending virtual tours. The virtual tour can also provide a summary of the virtual venue in order to assist users in determining which exhibits and rooms they are interested in perusing while visiting.

According to the embodiment, the virtual venue application provides a tour manager, where a user associated with a curator role (i.e., curator user) can utilize the tour manager within the virtual venue that they have this role for. As previously discussed, the roles of operator, finance manager, curator, and room designer are per virtual venue, and a user can be in each role multiple times, once for each venue that a user associated with an operator role assigns them. The curator user can use the tour manager to create a guide avatar (also identified as a virtual avatar tour guide, or avatar tour guide), where a guide avatar is a virtual avatar that serves as a tour guide for the virtual tour. After the curator user has created the guide avatar, the curator user can walk through the virtual venue as the guide avatar, clicking on one or more ShowObjects in sequence. The virtual venue application can record the curator user's movements throughout the virtual venue. The virtual venue application can then use the recorded movements as the basis for the guide avatar's movements for the virtual tour. The curator user can also record one or more audio clips at any time, and title the audio clips. The virtual venue application can play the audio clips during the virtual tour at one or more pre-defined times. The curator user can also associate text along with the one or more audio clips if desired to assist visitors of the virtual venue who cannot hear, or who are watching the virtual tour in a noisy environment. The curator user can also set up a question list per exhibit as well as per room. These questions can be perused via text or via audio if provided. The virtual venue application can then generate a virtual tour associated with the guide avatar. In certain embodiments, during tour execution, a guide avatar's movements can be automatically adjusted to appear more natural and smooth as it walks around and points to objects. For example, the guide avatar can automatically make movements with at least one of its body, its face, its hands, or its fingers. These movements can appear natural and smooth to visitors. In certain embodiments, a guide avatar can look at visitors in a natural way in real-time, for example, by making eye contact, as the guide avatar knows the geometric position of all avatars and their eye positions in real time, when giving the tour. According to certain embodiments, the virtual venue application can include one or more libraries, where the one or more libraries can each include one or more motions that can be inserted into the virtual tour, where the guide avatar can perform the one or more motions. For example, the virtual venue application can include a hand motion library that includes one or more hand motions. The one or more hand motions can be inserted into the virtual tour, where the guide avatar can perform one or more of the one or more hand motions. In another example, the virtual venue application can include a leg and foot motion library that includes one or more leg and foot motions. The one or more leg and foot motions can be inserted into the virtual tour, where the guide avatar can perform one or more of the one or more leg and foot motions. In yet another example, the virtual venue application can include a facial expression library that includes one or more facial expressions. The one or more facial expressions can be inserted into the virtual tour, where the guide avatar can perform one or more of the one or more facial expressions. In certain embodiments, a virtual tour can include one or more StandSpots that are denoted by the curator user when the curator user creates the tour. A StandSpot is a location in a room along a virtual tour that includes a position and a gaze direction unit vector. Thus, a visitor can cause his/her avatar to stand at the StandSpot, and the visitor can be provided a view of a significant object or display. According to certain embodiments, the virtual tour can also include one or more locations where the guide avatar stops to either talk or point out an object. Once the guide avatar has finished talking or pointing out the object, the virtual tour resumes. In certain embodiments, a visitor can search for one of these locations, and can skip a portion of the virtual tour, causing the virtual tour to either start or resume at the searched location.

According to the embodiment, a virtual tour can start at a tour booth area of a virtual venue atrium. A user that initiates a virtual tour is known as a tour organizer. The tour organizer can invite one or more visitors (via their avatars) to a virtual tour, but can also dismiss them before and during the virtual tour. A virtual tour does not start until one or more visitors join the virtual tour. During the virtual tour, the virtual venue application can display a real-time chat window where people can communicate using text chat. Any visitor on the virtual tour can pause the virtual tour. When this occurs, the guide avatar can indicate that the virtual tour is paused, such as generating a verbal indication. When the virtual tour paused, the guide avatar is available to answer one or more of the pre-defined questions. Questions that are not prepared may still be asked, but can be submitted to the virtual venue application, where the virtual venue application causes one or more email messages to be generated, where the one or more email messages include the questions. The one or more email messages can be sent to one or more managers of the virtual venue (i.e., members of the virtual venue that are associated with the operator, finance manager, curator, or room design roles). The answer(s) can be available in a per virtual venue question-and-answer repository that can grow as such questions and answers occur. In one embodiment, a question-and-answer repository can include a set of one or more questions that is created and a set of one or more answers that is created, where each question is associated with an answer. The set of questions can be displayed to a user, where the user can select a question from the set of questions and ask the question. According to the embodiment, if a user asks a question that is not within the set of one or more questions, an indication can be displayed to the user that an answer to the received question will be emailed to the user. That question can then be added to the set of questions within the question-and-answer repository, and an associated answer can also be added to the set of answers within the question-and-answer repository. In one embodiment, the virtual venue application can store a number of times that each question of the set of questions is asked by a user. The virtual venue application can also store a number of times that each question of the set of questions is asked by a user per room of the virtual venue. The virtual venue application can also rank each question of the set of questions based on the number of times that each question of the set of questions is asked. In one embodiment, each question of the set of questions can be associated with a room of the virtual venue. In this embodiment, when a question is received from a user, an indication can be displayed that the question will be answered later within the tour (e.g., when the guide avatar moves into the room that is associated with the question). According to the embodiment, one or more visitors can follow the guide avatar to each room of the virtual tour. If one or more visitors do not follow the guide avatar to a room, they can be forced into the room within a time threshold. A virtual tour can be fast-forwarded and reversed. The guide avatar can verbally indicate where StandSpots are, and one or more visitors can ask for the location of the StandSpots.

Figure 9:
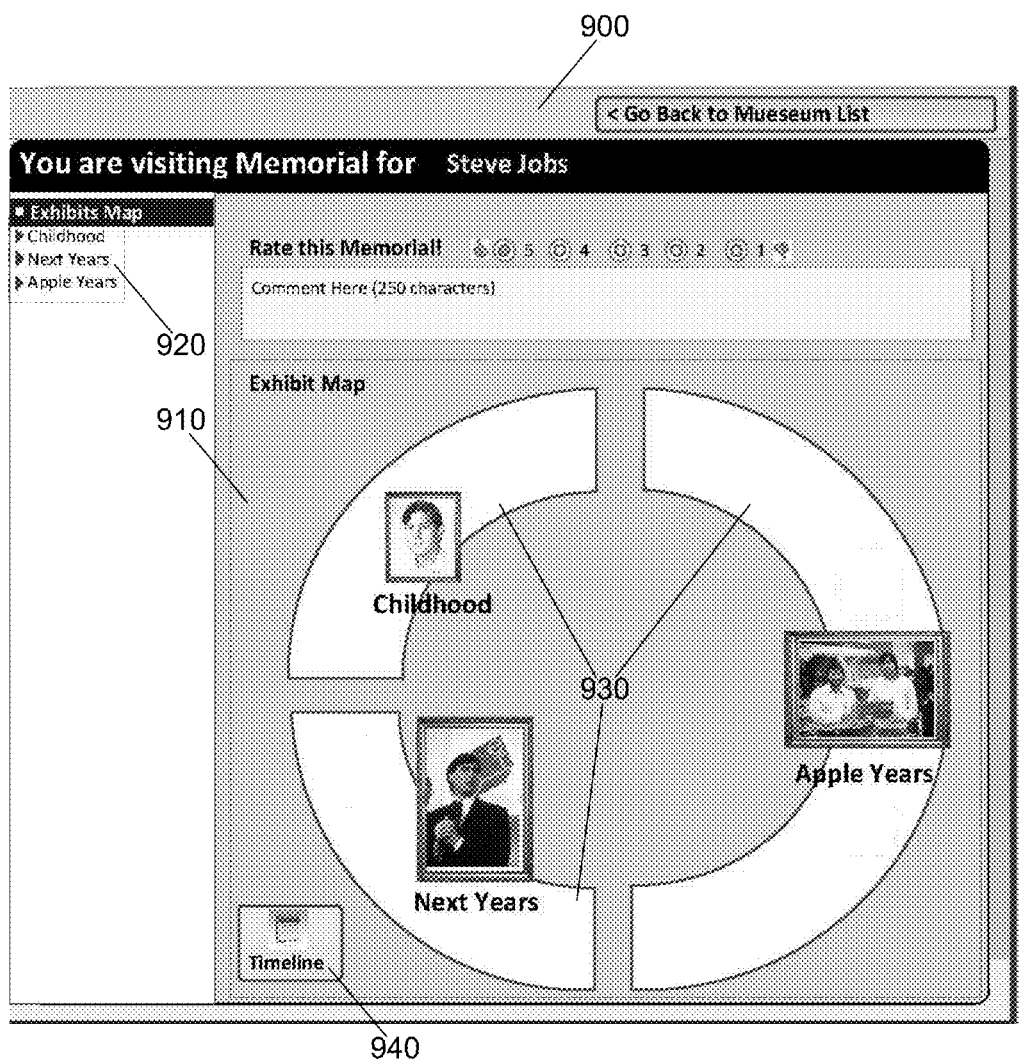
FIG. 9 illustrates an example user interface of a virtual venue application displaying a virtual venue navigator screen, according to an embodiment of the invention.

FIG. 9 illustrates an example user interface 900 of a virtual venue application displaying a virtual venue navigator screen accessible from a map station ShowObject, according to an embodiment of the invention. The virtual venue navigator screen includes an exhibit map 910, which is a map of exhibits, integrated with a hierarchical selector 920. In the illustrated embodiment, the virtual venue includes three exhibits, exhibits 930. According to the embodiment, a user can click on an exhibit of exhibits 930 displayed within exhibit map 910, or can click on an exhibit displayed within hierarchical selector 920. The virtual venue navigator screen can display any number of exhibits within a corresponding number of exhibit frames. In each exhibit frame, an exhibit title text, image, slideshow (i.e. series of images) or video can be displayed. The exhibit title text is always displayed within an exhibit frame, but the image, slideshow, or video is optional. In certain embodiments, the virtual venue navigator screen includes a timeline 940. A user can click on timeline 940, and the virtual venue application can display an overall timeline. The timeline can be, for example, a timeline of a person's life or a timeline of a complete history of events for a theme of the virtual venue.

Figure 10:
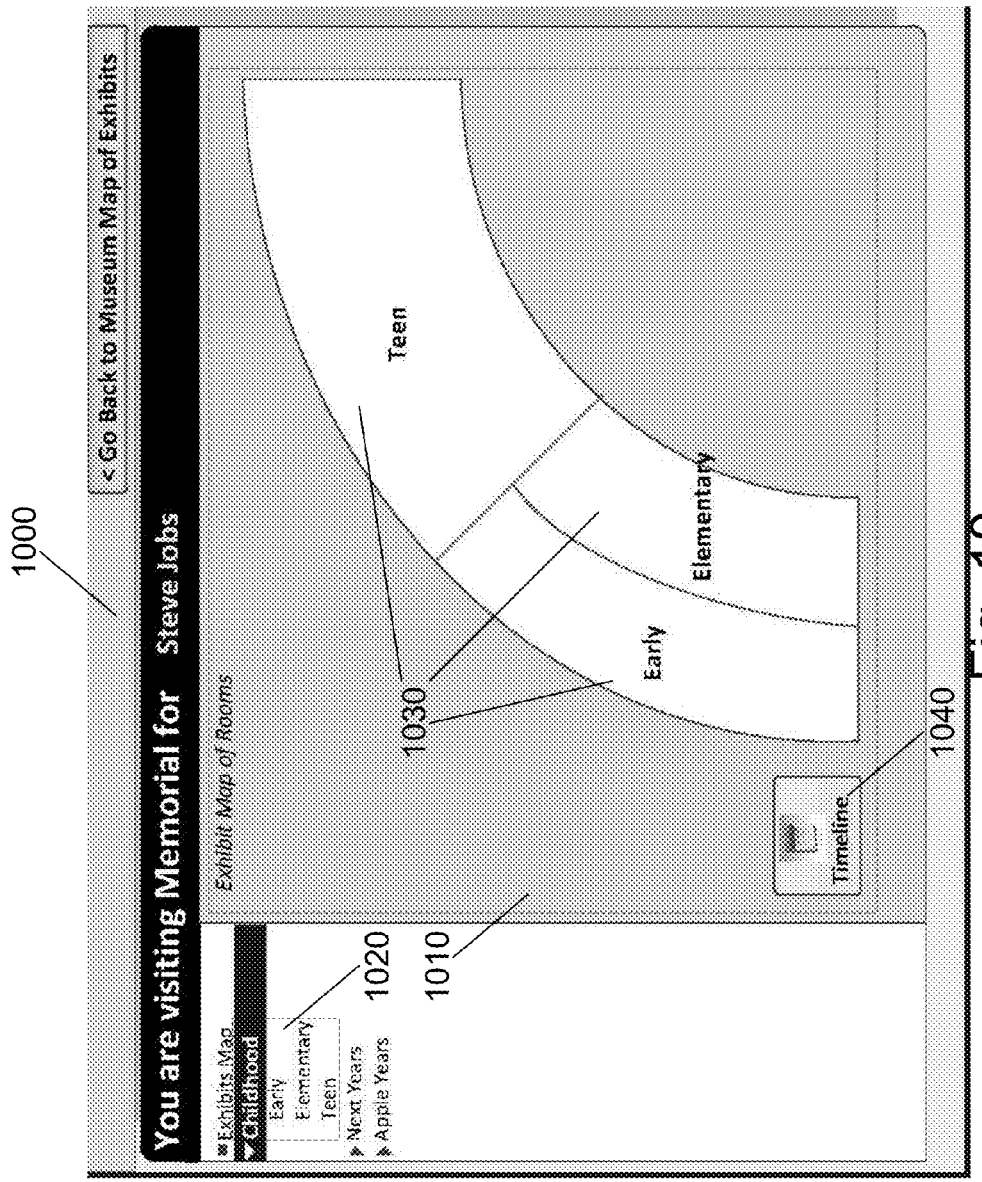
FIG. 10 illustrates an example user interface of a virtual venue application displaying a virtual venue navigator screen with an exhibit selected by a user, according to an embodiment of the invention.

FIG. 10 illustrates an example user interface 1000 of a virtual venue application displaying a virtual venue navigator screen with an exhibit selected by a user, according to an embodiment of the invention. According to the embodiment, the virtual venue navigator screen is displayed in response to a user selecting one of three exhibits 930 illustrated in FIG. 9. The virtual venue navigator screen includes an exhibit room map 1010, which is a map of rooms within the selected exhibit, integrated with a hierarchical selector 1020. In the illustrated embodiment, the exhibit includes three rooms, rooms 1030. According to the embodiment, a user can click on a room of rooms 1030 displayed within exhibit room map 1010, or can click on a room displayed within hierarchical selector 1020. The virtual venue navigator screen can display any number of rooms within a corresponding number of room frames. Similar to exhibit frames illustrated in FIG. 9, in each room frame, a room title text, image, slideshow (i.e. series of images) or video can be displayed. The room title text is always displayed within a room frame, but the image, slideshow, or video is optional. In certain embodiments, the virtual venue navigator screen includes a timeline 1040. A user can click on timeline 1040, and the virtual venue application can display a portion of an overall timeframe associated with the selected exhibit. As previously described, the timeline can be, for example, a timeline of a person's life or a timeline of a complete history of events for a theme of a virtual venue. In certain embodiments, by clicking on timeline 1040, a user can cause the virtual venue application to display animation. In certain embodiments, a timeline can automatically be assembled when ShowObjects are placed in exhibit rooms and dates are assigned. In certain embodiments, members can directly add content and share information with others directly on the timeline. Furthermore, in certain embodiments, the timeline displayed by virtual venue application is searchable.

Figure 11:
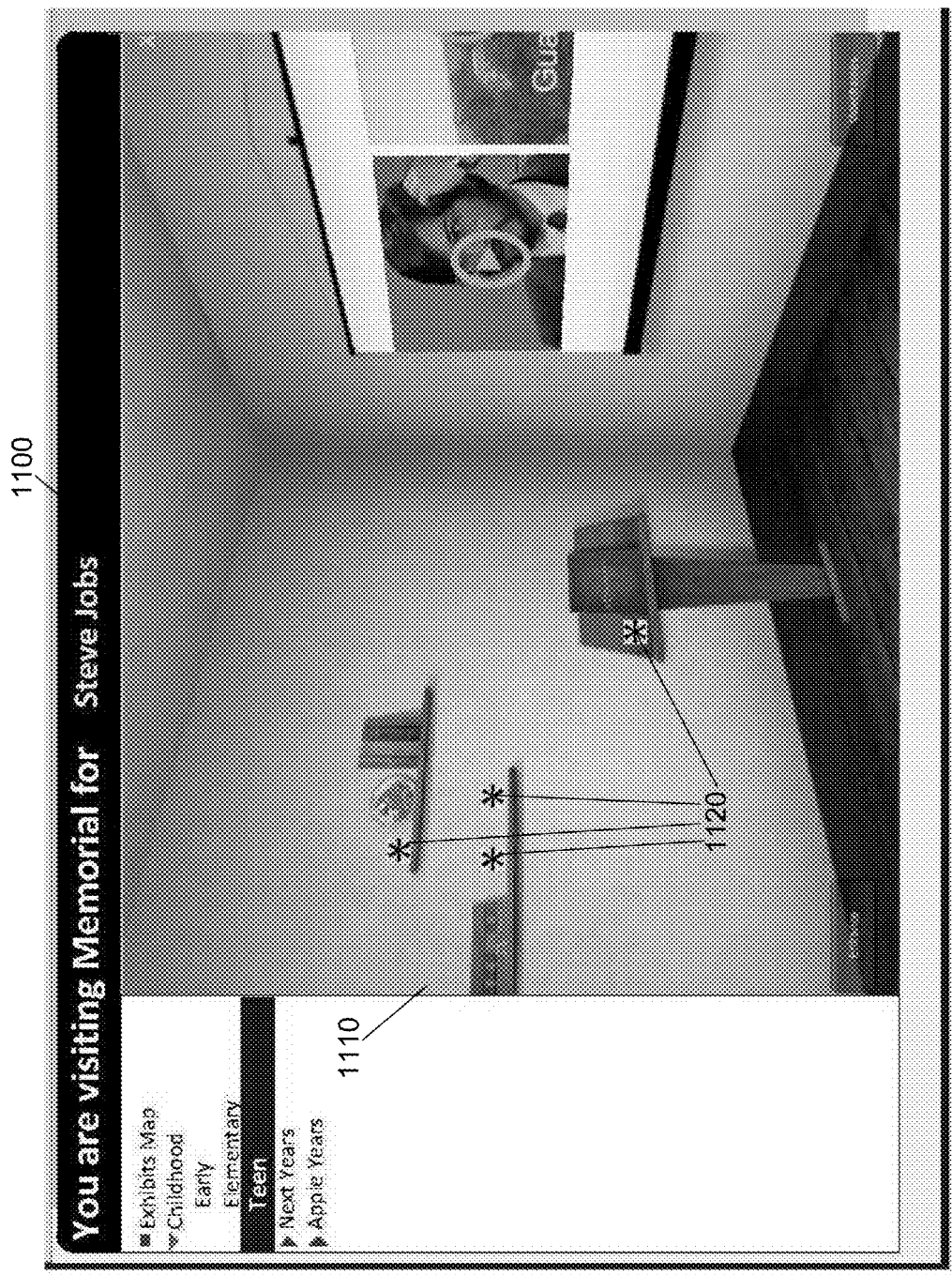
FIG. 11 illustrates an example user interface of a virtual venue application displaying a room, according to an embodiment of the invention.

FIG. 11 illustrates an example user interface 1100 of a virtual venue application displaying a room, such as room 1110, according to an embodiment of the invention. According to the embodiment, room 1110 is displayed in response to a user selecting one of three rooms 1030 illustrated in FIG. 10. According to the embodiment, a room, such as room 1110 displayed within user interface 1100, is fully two- or three-dimensional, and a user can move around the room and view the different walls displayed within the room. Movement within a room, such as room 1110, can be accomplished in several ways: by touching or "swiping" a touch screen that user interface 1100 is displayed on, or through the use of a virtual avatar controlled by a user, which may or may not be visible. If visible, a user can design the virtual avatar's physical appearance, use the virtual avatar to navigate within or between rooms, and take actions including downloading content, taking pictures or vides, and making transactions. The floor, ceiling, and walls each present one or more images as well as ShowObjects that have been mounted on ShowSpots, such as ShowSpots 1120. In certain embodiments, a user can interact with certain ShowObjects by clicking on the ShowObject. Also in certain embodiments, a user can click a show ShowSpots button (not shown) within user interface 1100 to display ShowSpots, such as ShowSpots 1120, in their positions in the room. Once a user clicks the show ShowSpots button, the show ShowSpots button can change into a hide ShowSpots button. Once a user clicks on the hide ShowSpots button, the ShowSpots disappear. Users with the proper privileges can "drag-and-drop" ShowObjects onto the ShowSpots. In certain embodiments, content can automatically be obtained from an external content source, such as a user's external web account. Examples of a user's external web account can include a user's Facebook® account, a user's Google Picassa® account, a user's Google Docs® account, a user's Google YouTube® account. In other embodiments, content can automatically be obtained from an external source, even if a user does not have an account with the external source. An example includes content from Google YouTube® that is provided by a user, even though the user does not have an account with Google YouTube®. According to certain embodiments, a user interface (not shown) can display one or more external content sources, and a user can select one or more external content sources. The virtual venue application can subsequently copy content from the one or more selected external content sources. Such content can be automatically organized based on one or more selected organizational choices, such as time period, theme, object type, or any other organizational concept. Organizing such objects can use any organizational technique known to one of ordinary skill in the relevant art. Such organizational techniques can include indexing text associated with an object, and then using the index to create one or more keyword topics.

Figure 12:
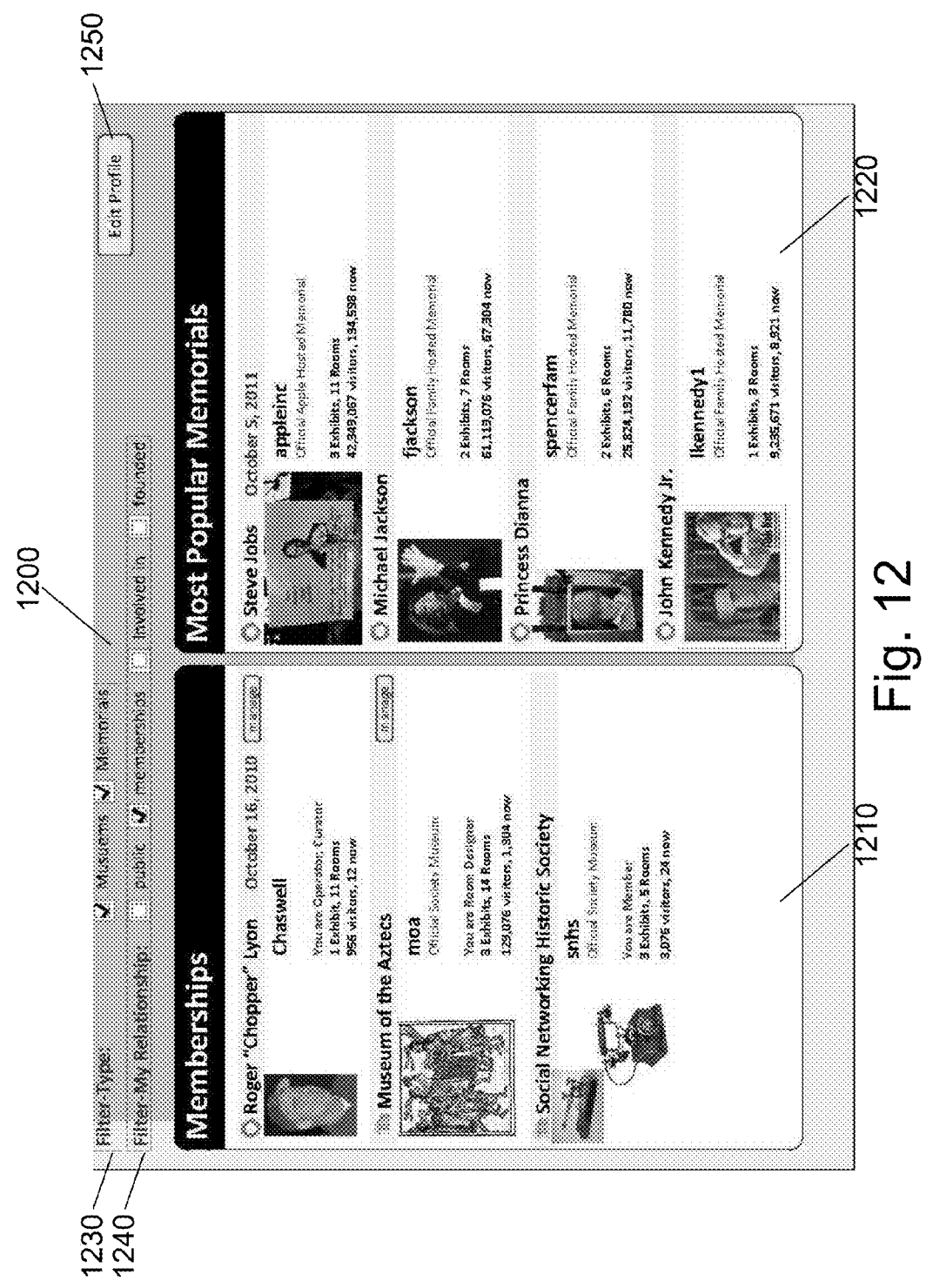

FIG. 12 illustrates an example user interface 1200 of a virtual venue application displaying a user screen, according to an embodiment of the invention. The user screen displayed within user interface 1200 is an account screen that can be presented upon login of a user, and can also serve as the user's home screen. The user screen can display memberships frame 1210 which displays the one or more virtual venues that the user is a member of. The user screen can also displays most popular virtual venues frame 1220 which displays one or more virtual venues either randomly or based on a ranking system. A user can filter the virtual venues that are displayed using type filter 1230 and/or relationship filter 1240. Type filter 1230 can filter the user screen to only display certain types of virtual venues. For example, type filter 1230 can filter the user screen to only display museums, only display memorials, or display both museums and memorials. In alternate embodiments, type filter 1230 can filter the user screen to only display virtual venues of any virtual venue type. Relationship filter 1240 can filter the user screen to only display virtual venues based on a relationship between the user and the virtual venue. For example, relationship filter 1240 can cause the user screen to only display public virtual venues, virtual venues that the user is a member of, virtual venues that the user is involved with, virtual venues that the user founded, or any combination therein. In certain embodiments, the user screen includes edit profile button 1250, which allows a user to edit the user screen to configure a name, picture, preferred email address, internationalization and localization, such as language, date and time format, time zone, and currency. Furthermore, in some embodiments, the user screen includes a keyword filter, which can filter the user screen based on the text entered within the keyword filter.

Figure 13:
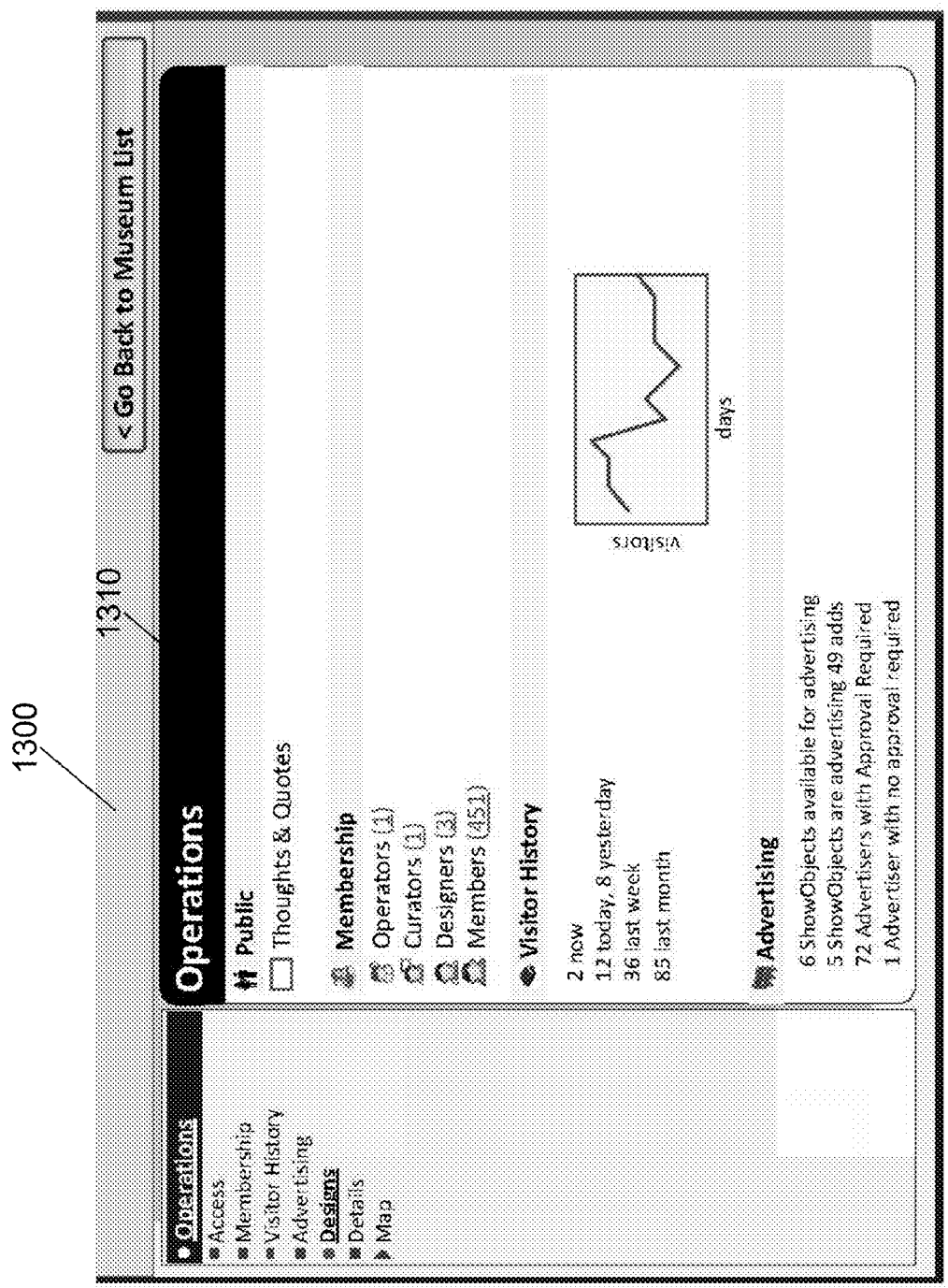
FIG. 13 illustrates an example user interface of a virtual venue application displaying a virtual venue manager screen, according to an embodiment of the invention.

FIG. 13 illustrates an example user interface 1300 of a virtual venue application displaying a virtual venue manager screen, according to an embodiment of the invention. Virtual venue manager screen can include operations screen 1310 which displays operation information about the virtual venue, such as exhibits and rooms which are designated as publicly accessible, members, visitor history, and advertising. The virtual venue manager screen illustrated in FIG. 13 is only available to a user who has management roles associated with the virtual venue. There can be two kinds of management roles: operation and design. Operation roles can include an operator role. Furthermore, design roles can include two roles, a curator role and a designer role. A user with the operator role can manage four sections: access, membership, visitor history, and advertising, where operations screen 1310 is a summary of all four sections. The membership section of operations screen 1310 can display one or more roles, and a number of users with the displayed role. By clicking the number of users displayed within operations screen 1310, a user can cause user interface 1300 to display a membership management screen with a filter based on the displayed role. A membership management screen is further described in greater detail in relation to FIG. 15.

Figure 14:
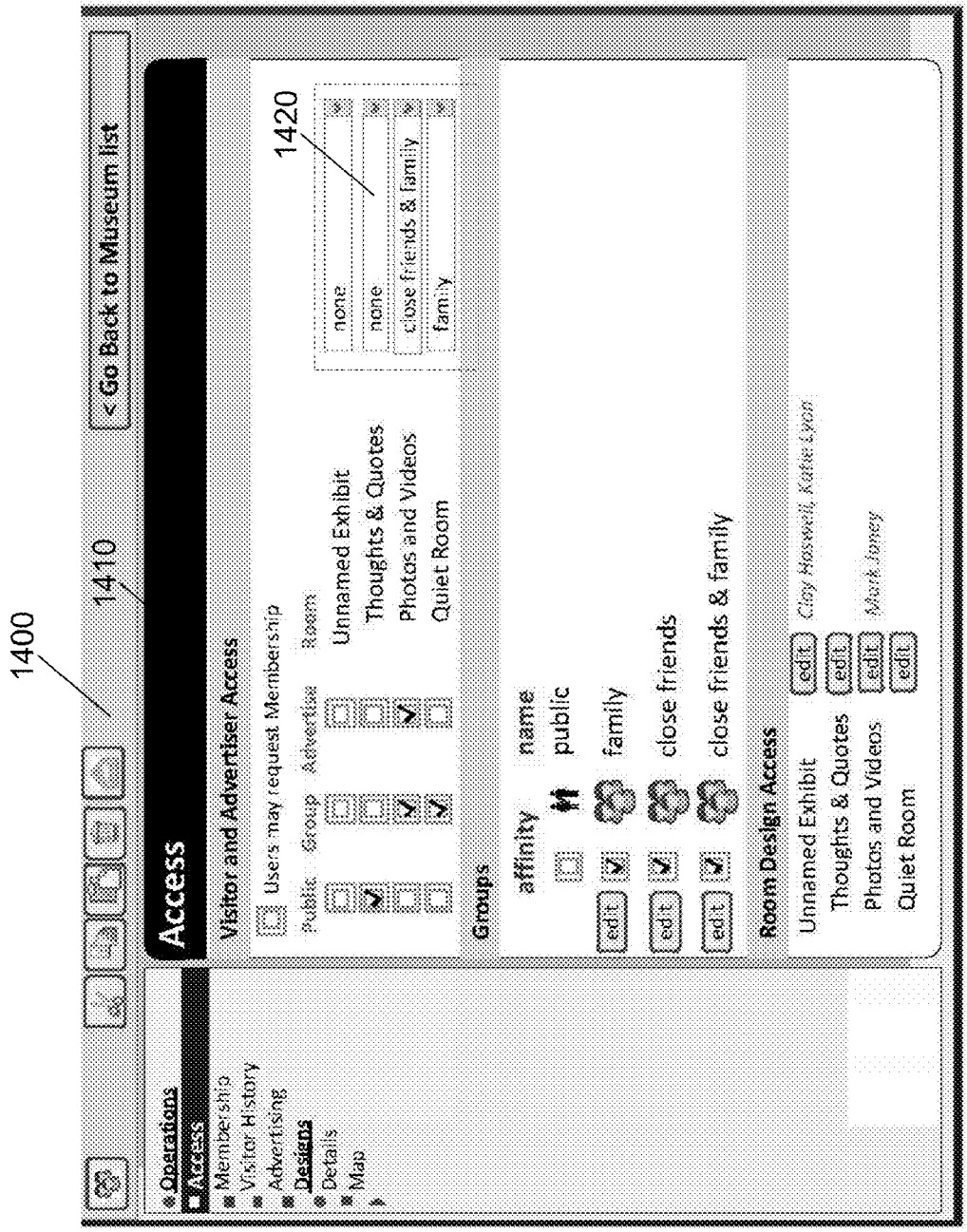
FIG. 14 illustrates an example user interface of a virtual venue application displaying an access screen, according to an embodiment of the invention.

FIG. 14 illustrates an example user interface 1400 of a virtual venue application displaying an access screen, with access frame 1410, according to an embodiment of the invention. Access frame 1410 provides a declaration on which exhibits and rooms are public or private. The "Visitor and Advertiser Access" section of access frame 1410 provides a checkbox to denote whether or not a user can self-request membership in the virtual venue. If unchecked, then membership is only by invitation of a user associated with the operator role. The "Visitor and Advertiser Access" section also presents a hierarchy of exhibits and rooms with three columns of checkboxes to the left of each. The checkboxes denote whether access is completely public, or by a specific group, and whether the room will allow advertising. A user associated with the operator role can modify any of these settings. Dropdown controls 2420 are enabled only when the "Group" checkbox is checked. Each dropdown control of dropdown controls 240 contains a list of all groups defined in the virtual venue in the "Group" section further described below. In certain embodiments, dropdown controls 240 are replaced with dialog boxes that provide the ability for multiple group selections.

The "Groups" section of access frame 1410 allows a user associated with the operator role to add and delete members of the virtual venue by clicking on an edit button next to a group. Additionally, a checkbox is present next to each group denoting whether or not the members of the group are each allowed to add an "affinity room" or not. An affinity room is a private room added and designed by a user for themselves, but which they can share with others if they want to invite them. In effect, the affinity room is either private to a single individual or privately shared with a few individuals.

The "Room Design Access" section of access frame 1410 allows a user associated with the operator role to control which users that are associated with the room designer role have privileges to edit a design of a room. According to the embodiment, when a person is assigned to an exhibit, they also have access to the individual rooms belonging to that exhibit.

Figure 15:
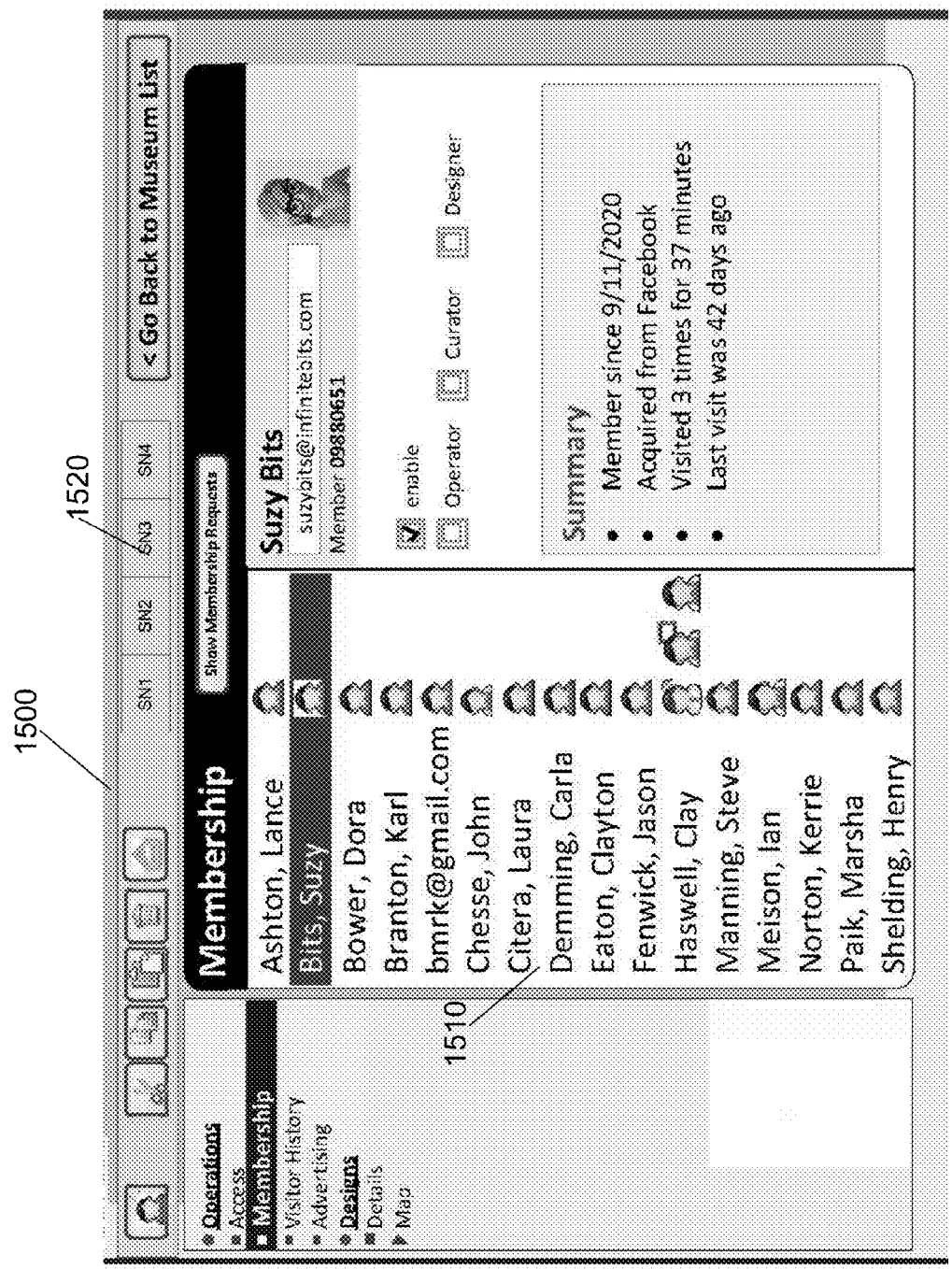
FIG. 15 illustrates an example user interface of a virtual venue application displaying a membership management screen, according to an embodiment of the invention.

FIG. 15 illustrates an example user interface 1500 of a virtual venue application displaying a membership management screen with membership management frame 1510, according to an embodiment of the invention. Membership management frame 1510 allows a user associated with the operator role to browse any and all members of a virtual venue, and also add new members, or delete existing members. When a new member button (not shown) is clicked, a new member account is created with the name "First1, Last1." When the new member button is clicked a second time, a new member account is created with the name "First2, Last2." A user then fills in an email address and or a mobile number for each newly created member. Once the member creates an account within the virtual venue application, the names and member identity of the member identity are automatically populated. Members of a virtual venue are invited to the virtual venue application via the email address (or via the mobile number through a text message), and a receiver of the invitation may or may not accept the invitation. The member information displayed within membership management frame 1510 will denote whether or note there is an invitation pending, and if so, will allow the user to resend the invitation. In certain embodiments, adding a new member does not automatically create a new member account. In these embodiments, a member must already have an account with the virtual venue application, and then be added a member of the virtual venue. Thus, the member must already be a member of the virtual venue application and have a virtual venue application account, and then become a member of a virtual venue (or in other words, be associated with the virtual venue). In cases where an invited user does not have a virtual venue application account, an email or social networking site can be used to identify the invitee. The invitee can accept the venue membership invite, but because they do not have a virtual venue application account, the invitation will be intercepted by the virtual venue application, and a signup will be required to complete the acceptance. In this case, there is a creation of a membership account, but not a venue membership account.

Membership management frame 1510 can also display one or more roles that can be associated with each member. Also, membership management frame 1510 can allow a user to enable or disable a member. In certain embodiments, a "show only membership requests checkbox (not shown) is only displayed if the user has turned on the ability for the virtual venue to accept requests. If this checkbox is selected, then an "accept all" button (not shown) appears. When the list of membership requests is displayed, there are two buttons to the left of each request: an accept button and a reject button (not shown). Once, the accept button is clicked, the request becomes a membership. Whichever is selected, a response with the acceptance or rejection is sent as a notification via an email message to the original requester.

In certain embodiments, the virtual venue application provides integration with one or more social network or email providers, such as Facebook®, Gmail®, Google Plus®, and Yahoo®. By clicking on one of social network buttons 1520, a user can enter credentials for accessing a social network or email provider. The virtual venue application can then display a list (not shown) of the user's contacts for the social network or email provider, and a checkbox next to each contact. At the bottom of the list is an "invite all" button (also not shown). By clicking the button, the virtual venue application can automatically import the selected contacts into the virtual venue application.

FIG. 16 illustrates an example user interface 1600 of a virtual venue application displaying a user invitation status section, according to an embodiment of the invention. The user invitation status section illustrated in FIG. 16 is an example of a user invitation status section for a member who has not accepted an invitation from the virtual venue application. The user invitation status section illustrated in FIG. 16 is an example display of the selected member information that can also appear to the right of user interface 1500 of FIG. 15 for a member who has not accepted or rejected a previously sent invitation.

Figure 17:
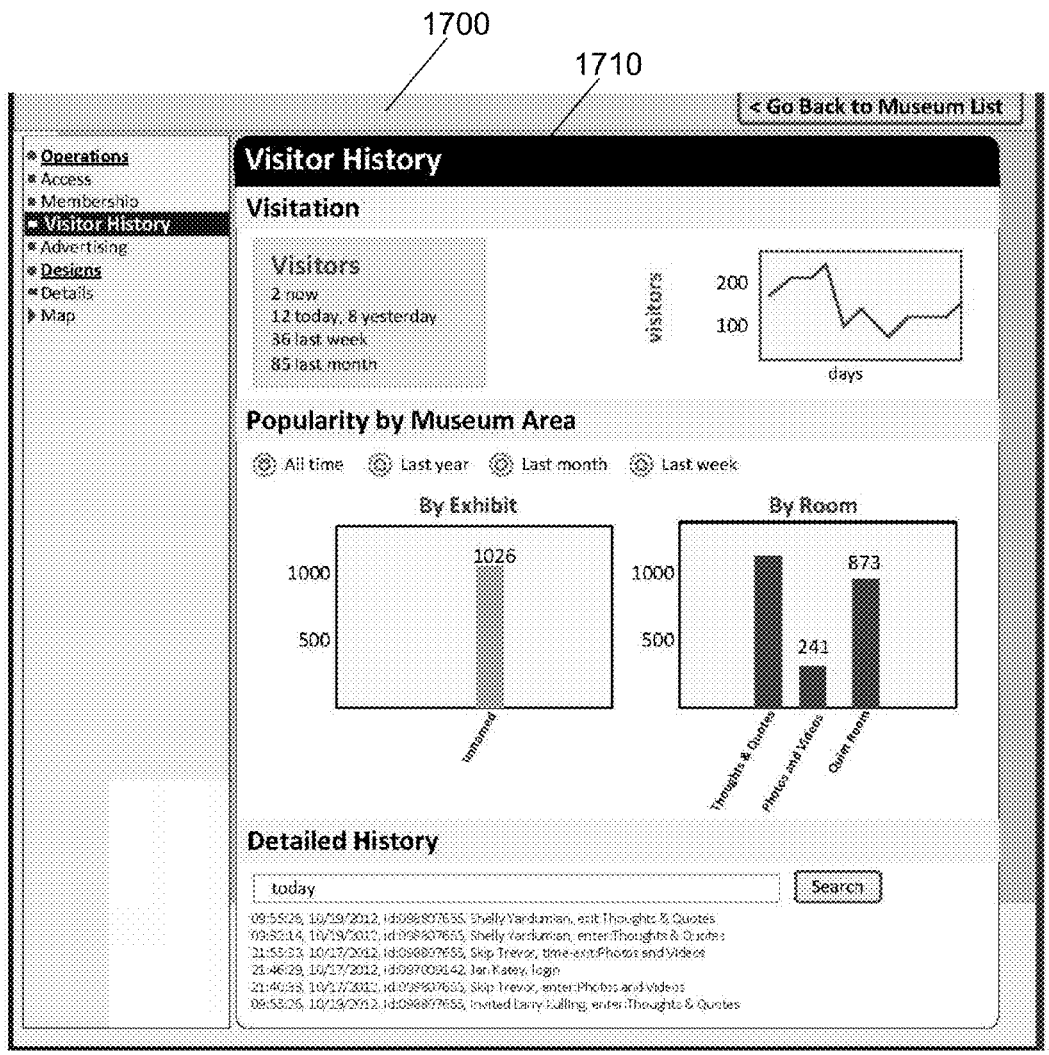
FIG. 17 illustrates an example user interface of a virtual venue application displaying a visitor history screen, according to an embodiment of the invention.

FIG. 17 illustrates an example user interface 1700 of a virtual venue application displaying a visitor history screen, such as visitor history screen 1710, according to an embodiment of the invention. In one embodiment, since this screen is part of operations, only a user associated with the operator role for the specific venue can view this screen. Visitor history screen 1710 can display visitation statistics of a virtual venue. The visitation statistics can include summary information, such as number of visitors per day, week, or month, and virtual venue area popularity by week, month, year, or all-time, or by exhibit or room. The visitation statistics can also include detailed information, such as full audit information of all visitor occurrences. In certain embodiments, visitor history screen can filter the detailed information based on information of interest.

Figure 18:
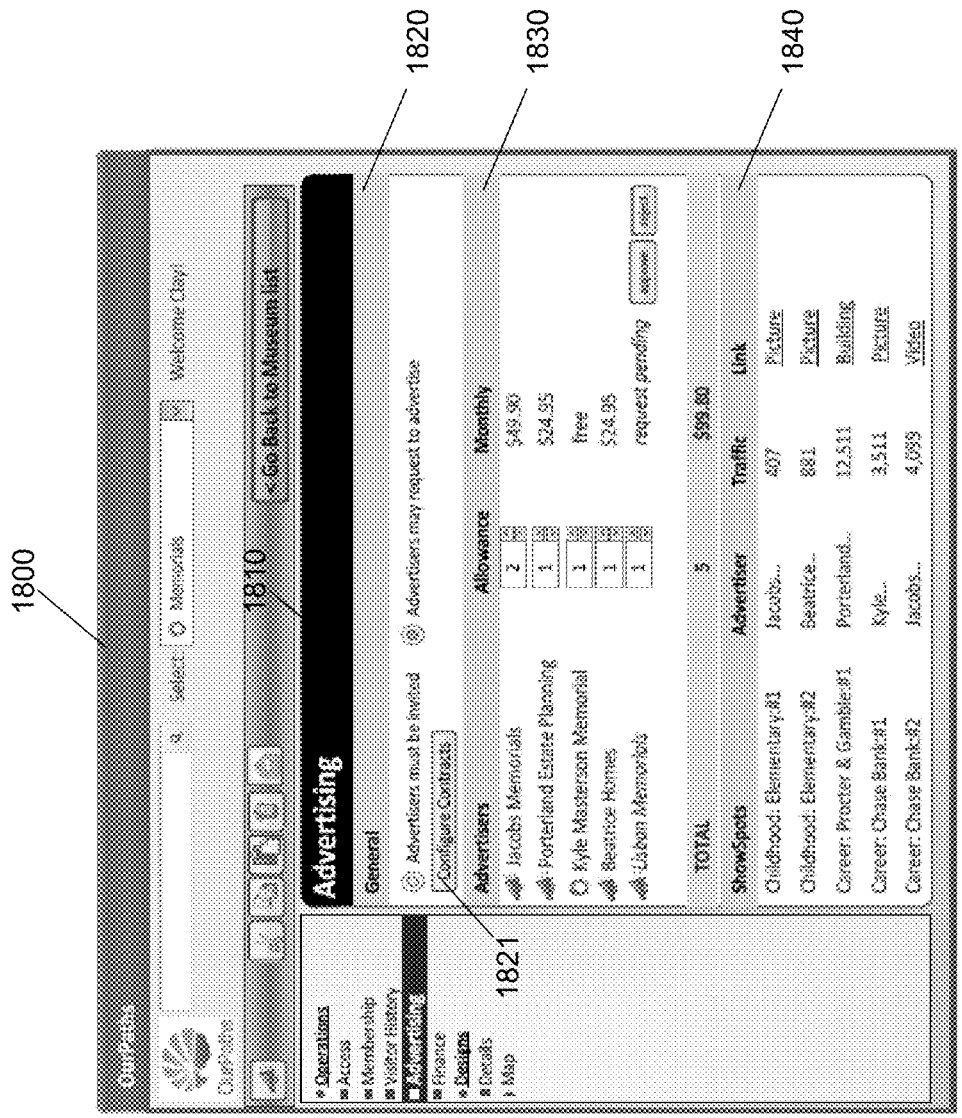
FIG. 18 illustrates an example user interface of a virtual venue application displaying an advertising screen, according to an embodiment of the invention.

FIG. 18 illustrates an example user interface 1800 of a virtual venue application displaying an advertising screen, including advertising frame 1810, according to an embodiment of the invention. Advertising frame 1810 manages advertising information in a virtual venue. More specifically, advertising frame 1810 includes general section 1820, advertisers section 1830, and ShowSpots section 1840. General section 1820 allows a user with the operator role to control whether or not advertisers may request to advertise. General section 1820 also includes "Configure Contracts" button 1821, which navigates to a dialog where different payment options (i.e., contracts) can be configured. An example contract is a monthly cost based on a number of ShowSpot allowances an advertiser is allowed to occupy. Each advertiser may select a contract from the one or more contracts. Advertisers section 1830 displays the current advertisers as well as their ShowSpot allowances and total monthly bill. If an advertiser requests permission to advertise, and is still waiting for approval, advertisers section 1830 can display a "request pending" indication and allow a user with the operator role to approve or reject the request. ShowSpots section 1840 displays all of the ShowSpots where advertising is taking place along with who is advertising there, the traffic, and a link to the ShowObject. In certain embodiments, one or more ShowSpots can be auctioned.

Figure 19:
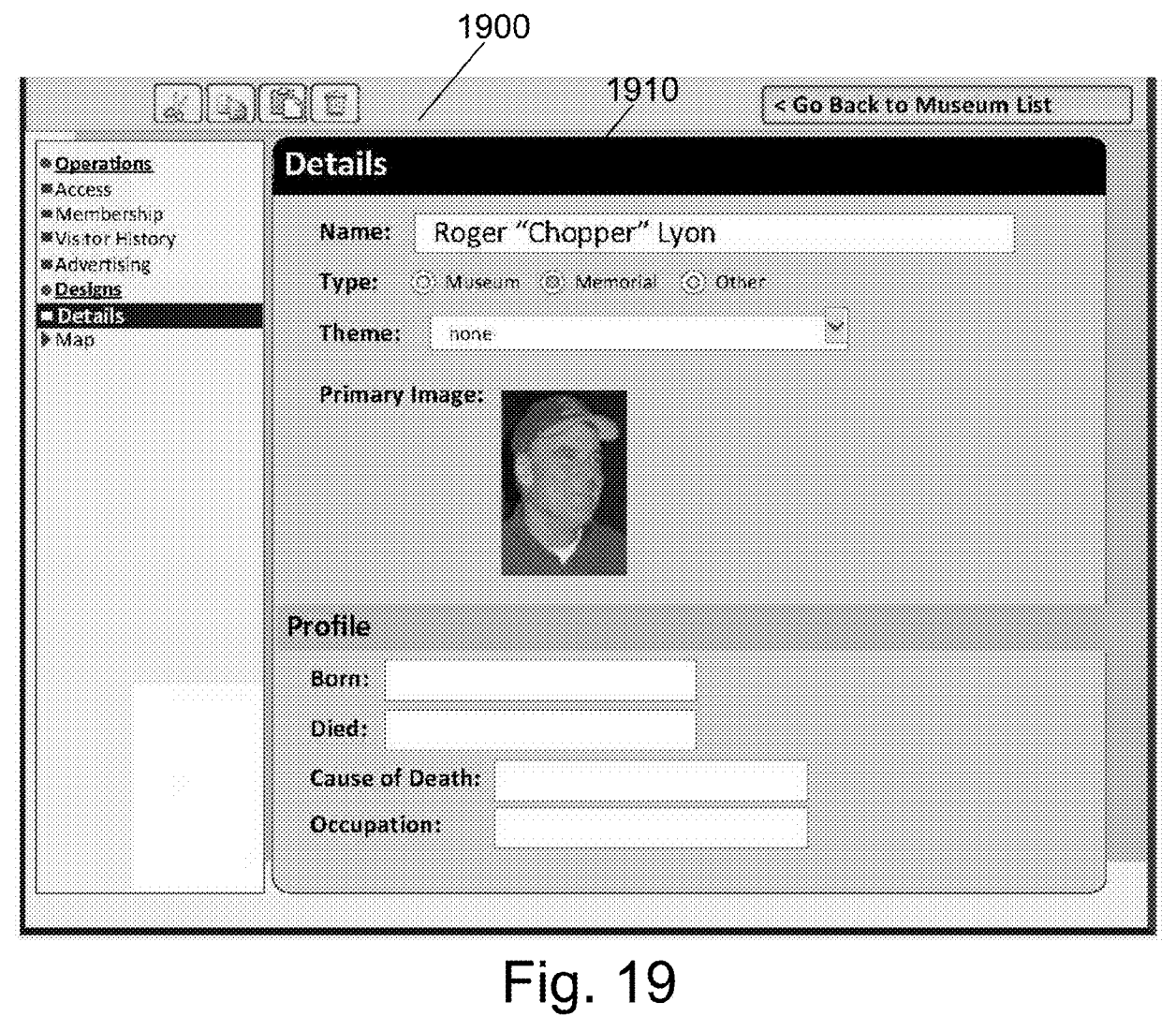

FIG. 19 illustrates an example user interface 1900 of a virtual venue application displaying a detail screen, such as detail screen 1910 according to an embodiment of the invention. Detail screen 1910 can allow a user to design a virtual venue that can be displayed by the virtual venue application. As an example, a user can use detail screen 1910 to select a type for the virtual venue (i.e., indicate whether it is a museum, a memorial, or some other type of virtual venue).

In one embodiment, selection of the venue type determines the content of the rest of the details screen to fill out and is different for each venue type. Furthermore, in the example, a user can use detail screen 1910 to create a name for the virtual venue, and select a theme and primary image for the virtual venue. Additionally, a user can use detail screen 1910 to create additional details for the virtual venue. For example, in the example of a memorial, the user can create a date of birth of the individual being memorialized, a date of death, a cause of death, and an occupation. In alternate embodiments, whether the virtual venue is a memorial or another virtual venue type, detail screen can include additional details that can be created by a user, where the user can access the additional details by tabbing within detail screen 1910, or by clicking on a scroll bar within detail screen 1910 (not shown).

Figure 20:
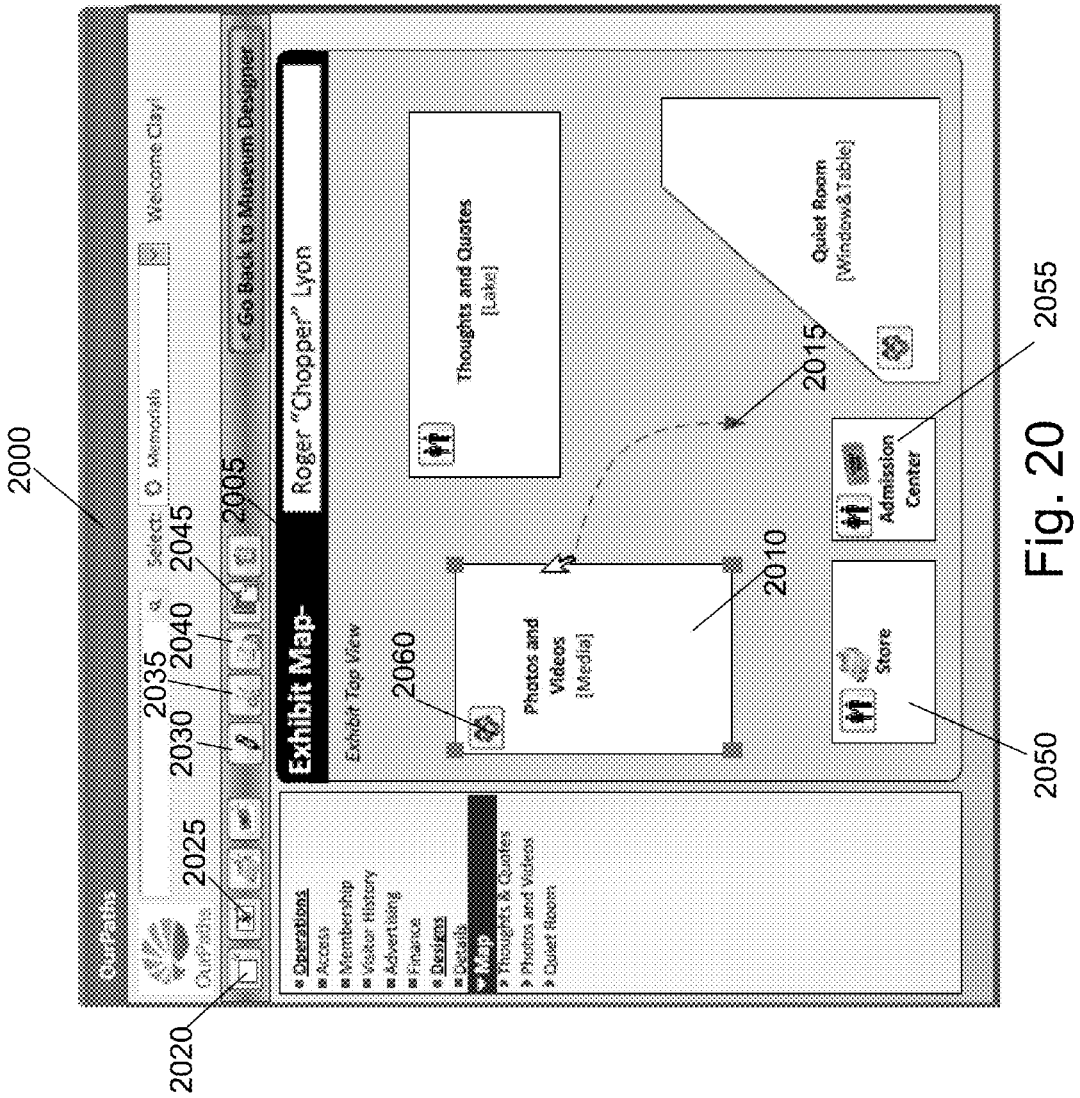
FIG. 20 illustrates an example user interface of a virtual venue application displaying an exhibit map layout designer screen, according to an embodiment of the invention.

FIG. 20 illustrates an example user interface 2000 of a virtual venue application displaying an exhibit map layout designer screen, such as exhibit map layout designer screen 2005, according to an embodiment of the invention. Exhibit map layout designer screen 2005 allows a user associated with a curator role for a specific venue being constructed to create, modify, or delete one or more rooms of an exhibit. According to the embodiment, exhibit map layout designer screen 2005 displays an exhibit map that is being edited. At any time, a room, such as room 2010, can be selected at its approximate centroid, and moved (depicted by arrow 2015). The completed map is what is displayed by the virtual venue application to visitors of the exhibit.

According to the embodiment, a user associated with a curator role can click on new button 2020 to add a new room to exhibit map layout designer screen 2005. New rooms can begin as rectangles. Also according to the embodiment, a user associated with a curator role can click on new button 2025 which creates a tunneled room. A tunneled room is similar to a normal room, but the tunneled room can also present a browser of all other virtual venues that a user is associated with a curator role for, and which allows users to share the tunneled room with other virtual venues. Thus, a tunneled room can be conveniently shared between multiple virtual venues. To add more walls to the room, a user can click on pencil button 2030 and the cursor will change to a pencil. The user can then click the pencil on any wall to split the wall in the middle forming a new vertex. Furthermore, left clicking can add a new vertex, while right clicking can remove a nearest vertex. While exhibit map layout designer screen 2005 allows for two-dimensional room floors with vertical walls, in alternate embodiments, exhibit map layout designer screen 2005 can also import three-dimensional shaped rooms. For example, exhibit map layout designer screen 2005 can use a tool such as Google Sketchup™ to import three-dimensional shaped rooms. A user can also edit rooms between exhibits using cut button 2035, copy button 2040, and paste button 2045. More specifically, a user can cut or copy a room from another exhibit and paste the room into exhibit map layout designer screen 2005 using cut button 2035, copy button 2040, and paste button 2045. The selection markers on room vertices may also individually be positioned to change a wall shape and size of a room. This determines the final room dimensions using a flat floor face and a flat ceiling face of the same shape; and all vertical walls. Additionally, exhibit map layout designer screen 2005 can include a public button for each room (such as public button 2060) that toggles between setting the room of the virtual venue as public and not public.

According to the embodiment, an exhibit map displayed within exhibit map layout designer screen 2005 can optionally include two special exhibit types: store 2050 and admission center 2055. While store 2050 and admission center 2055 are not technically exhibits, they can be played on a same level as one or more exhibits. According to certain embodiments, one or more buttons can be used to place a store or an admission center within an exhibit map, and said buttons can be displayed once a store or an admission center is placed within the exhibit map. Store 2050 can include one or more rooms, where each room can allow one or more ShowObjects to have price tag buttons, which allow the ShowObjects to be purchased. Admission center 2055 is an area where users can first arrive at, sign in, and/or pick up a short guide. Depending on the virtual venue, admission center 2055 can set admission prices. For groups of users wishing to go into the virtual venue together, a "join" operation can be provided to wait for all users in the group to arrive and "join." This can also enable a group admission price if a user associated with a finance manager role has provided group pricing.

Figure 21:
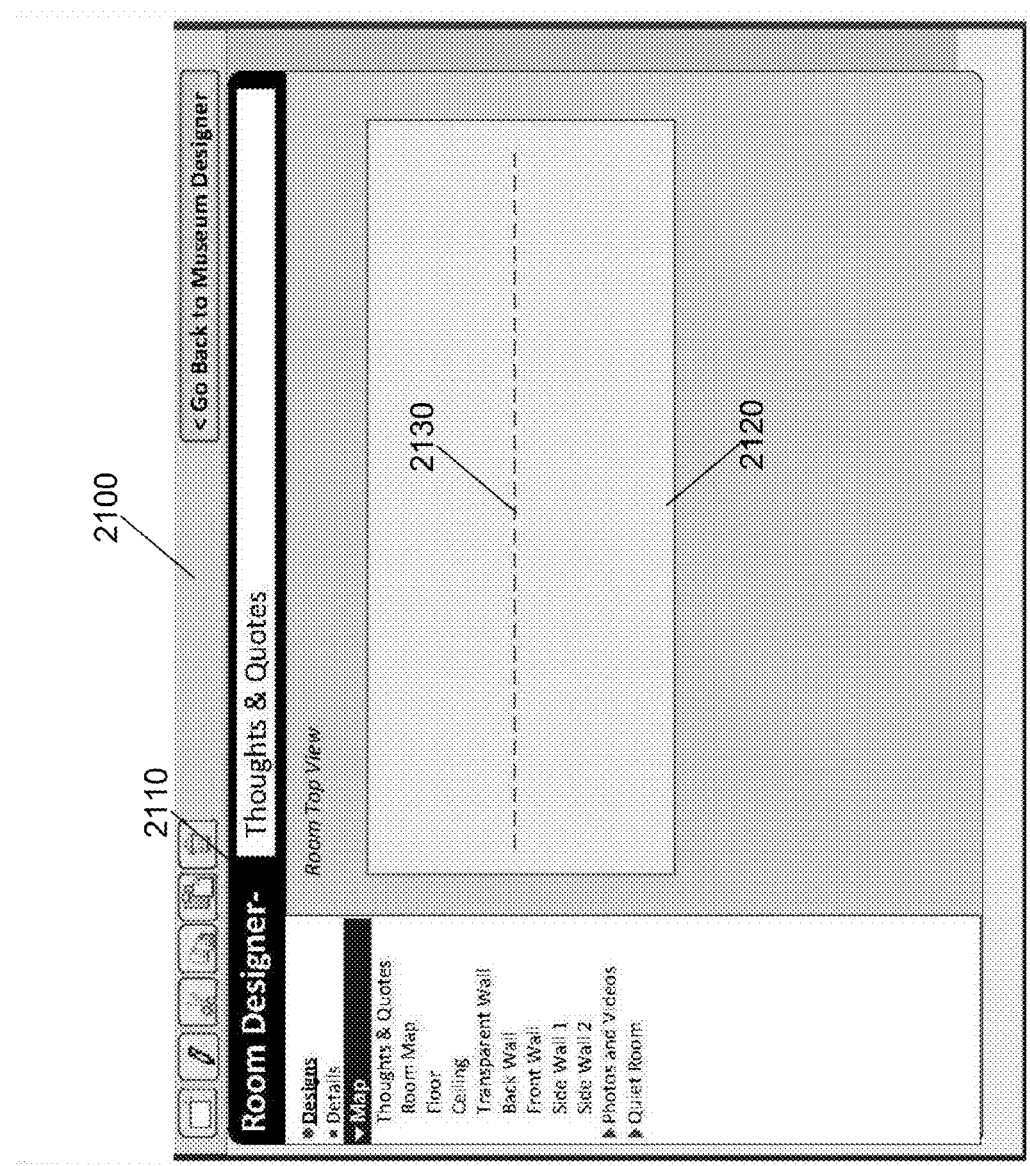
FIG. 21 illustrates an example user interface of a virtual venue application displaying a room designer screen, according to an embodiment of the invention.

FIG. 21 illustrates an example user interface 2100 of a virtual venue application displaying a room designer screen, such as room designer screen 2110, according to an embodiment of the invention. Room design screen displays a top view of a room, such as room 2120. Room designer screen 2010 allows a user associated with a room designer role to create, modify, or delete one or more ceilings, walls, or floors of a room. In the top view, opaque walls are shown as solid lines, totally transparent walls 2130 are shown as dashed lines, and partially transparent walls are shown as dotted lines (not shown).

Figure 22:
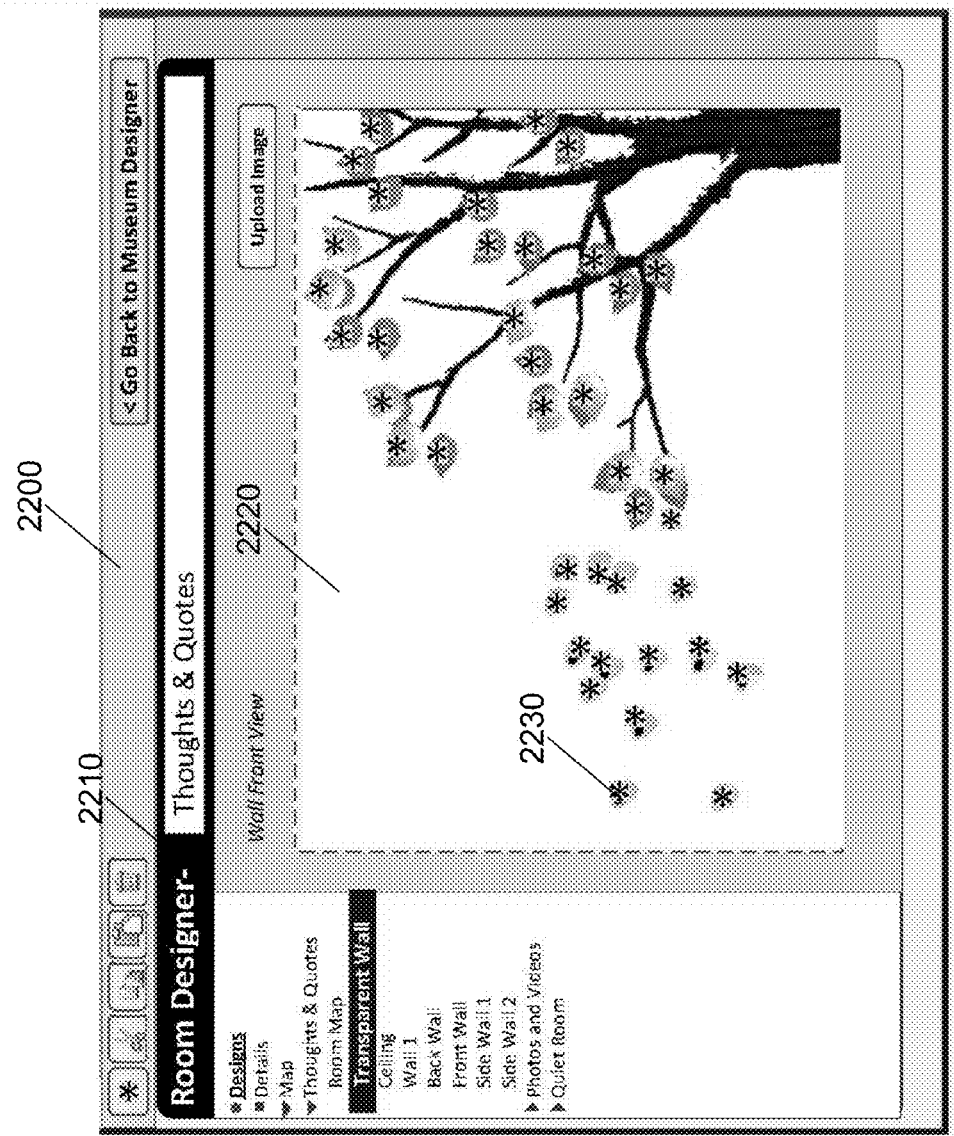
FIG. 22 illustrates an example user interface of a virtual venue application displaying a wall designer screen, according to an embodiment of the invention.

FIG. 22 illustrates an example user interface 2200 of a virtual venue application displaying a wall designer screen, such as wall designer screen 2210, according to an embodiment of the invention. According to the illustrated embodiment, wall designer screen 2210 displays an image of a tree with multiple branches displayed on a wall 2220 of a virtual room, where wall 2220 is a transparent wall. The rest of the scene (i.e., lake, clouds, and sky) is not displayed on wall 2220, but instead, is displayed on a back wall (not shown) of the virtual room. This produces a three-dimensional virtual environment as a user navigates around the virtual room. In certain embodiments, a user can select color palettes and textures for walls, such as wall 2220, from available themes or of their own design.

According to the embodiment, wall design screen 2210 also displays asterisks 2230, where asterisks 2230 are the visuals for ShowSpots. As previously described, ShowSpots are object mounts that can host a display object to be displayed within the virtual room. Wall design screen displays a front view of a room, such as room 2220. Asterisks 2230 are typically only displayed within wall design screen 2210, and are typically not displayed to users as they navigate the virtual room. In the illustrated embodiment of FIG. 22, the room designer has assigned the ShowSpots on the left with Firefly ShowObjects, and the branched areas with Leaf ShowObjects. A leaf can represent a memory that a user enters into the virtual venue application, and a firefly can represents a wish, prayer, or other emotive content that a user enters into the virtual venue application. In certain embodiments, a user can select the emotive content from a list of text or a larger body of text rather than enter the emotive content. These are two examples of ShowObjects that can be provided in a ShowObject library, according to the embodiment. However, in alternate embodiments, a scriptable framework can be provided to users for building custom ShowObjects. A ShowObject can be selected with a variety of shapes, animations and sounds used to render feelings, emotions, or other subjective impulses in multiple dimensions.

Figure 23:
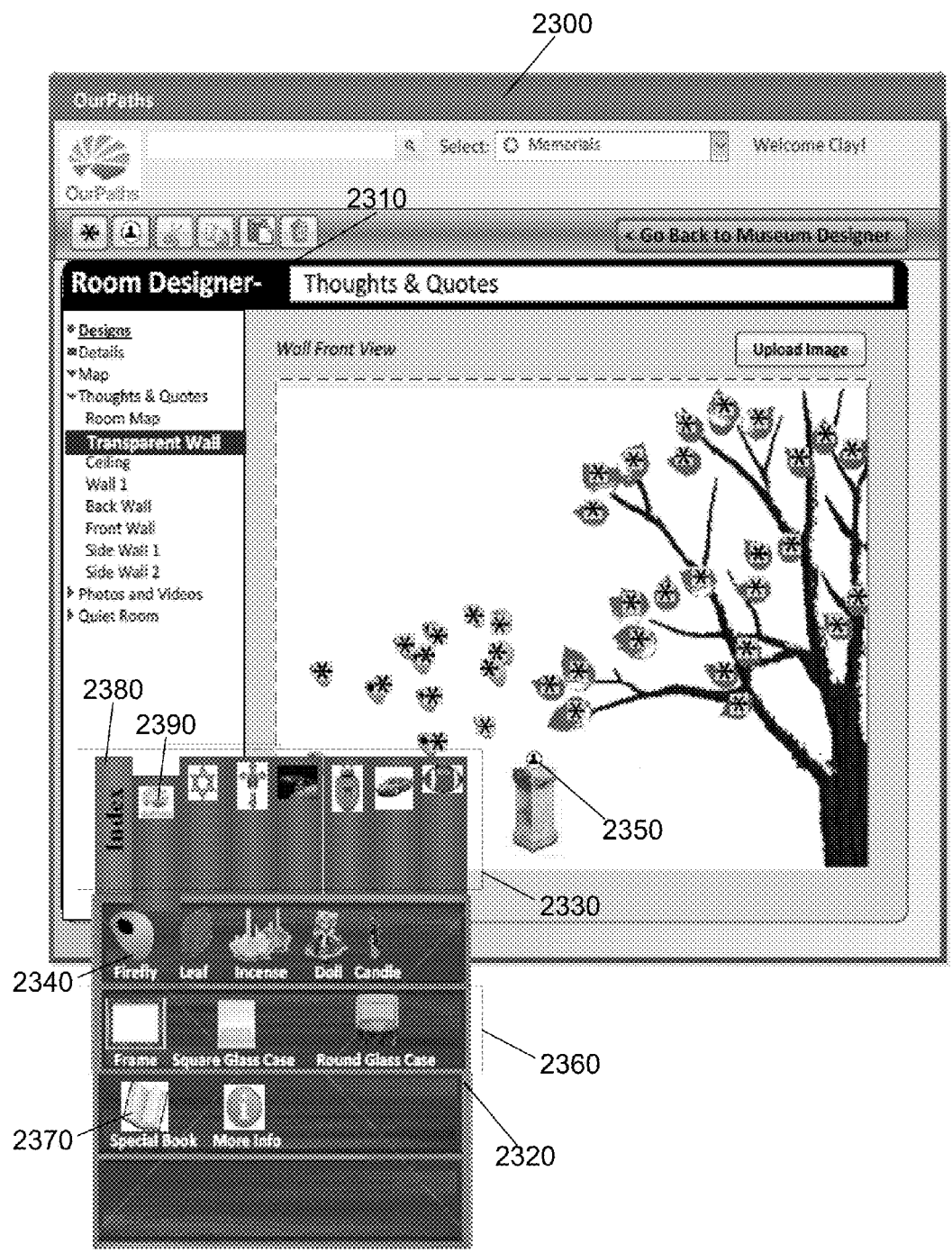
FIG. 23 illustrates an example user interface of a virtual venue application displaying a wall designer screen with a ShowObjects case, according to an embodiment of the invention.

FIG. 23 illustrates an example user interface 2300 of a virtual venue application displaying a wall designer screen, such as wall designer screen 2310 with a ShowObjects case, such as ShowObjects case 2320, according to an embodiment of the invention. At the top of ShowObjects case 2320 is libraries 2330 for different themes. According to the embodiments, the virtual venue application provides a default library of general objects as well as special default libraries. Furthermore, in certain embodiments, a user associated with a room designer role can add new sets of ShowObjects and create new custom libraries. When a library 2390 is selected, library 2390 "drops", and ShowObjects case 2320 displays corresponding one or more ShowObjects. Clicking on an index library 2390 opens a whole page with libraries, an miniature visualization of its contained objects and a description. A small subset of these libraries can be selected to go on the top shelf of ShowObject case 2320 for convenient access to these libraries. In certain embodiments, when there are more ShowObjects than ShowObjects case 2320 can display, wall designer screen 2310 can also display a vertical scroll bar (not shown). When mousing over a library of libraries 2330, a full title and brief description can be displayed, according to certain embodiments. Also, in certain embodiments, where user interface 2300 is displayed on a touchscreen, touching the display of the book within user interface 2300 shows the title, but a quick swipe down along the display of the book within user interface 2300 can be required to select the book. ShowObjects case 2320 includes one or more ShowObjects (such as ShowObject 2340), that can be dragged and dropped onto wall designer screen 2310. According to the embodiment, dropping a ShowObject onto a previous ShowObject displayed within wall designer screen 2310 replaces the previous ShowObject. In certain embodiments, wall designer screen 2310 can also display personal ShowSpot 2350. According to certain embodiments, personal ShowSpot 2350 is a special type of ShowSpot that can be placed via a personal ShowSpot toolbar button (not shown) in order to denote that each user entering the room and looking at the wall will see their own private ShowObject that they place there and only they will see it.

According to certain embodiments, ShowObject case 2320 can also include special ShowObjects. For example, in the illustrated embodiment, ShowObject case includes containers 2360. A container can be placed anywhere in a room, and its picture/model can be changed. In certain embodiments, the container can direct the user to a well-known import or revered book stored in the virtual venue (i.e., special book 2370). To identify the book in a room, the presentation and title can change. For example, special book 2370 can be a Torah, a Bible, a Koran, or other special type of book.

Figure 24:
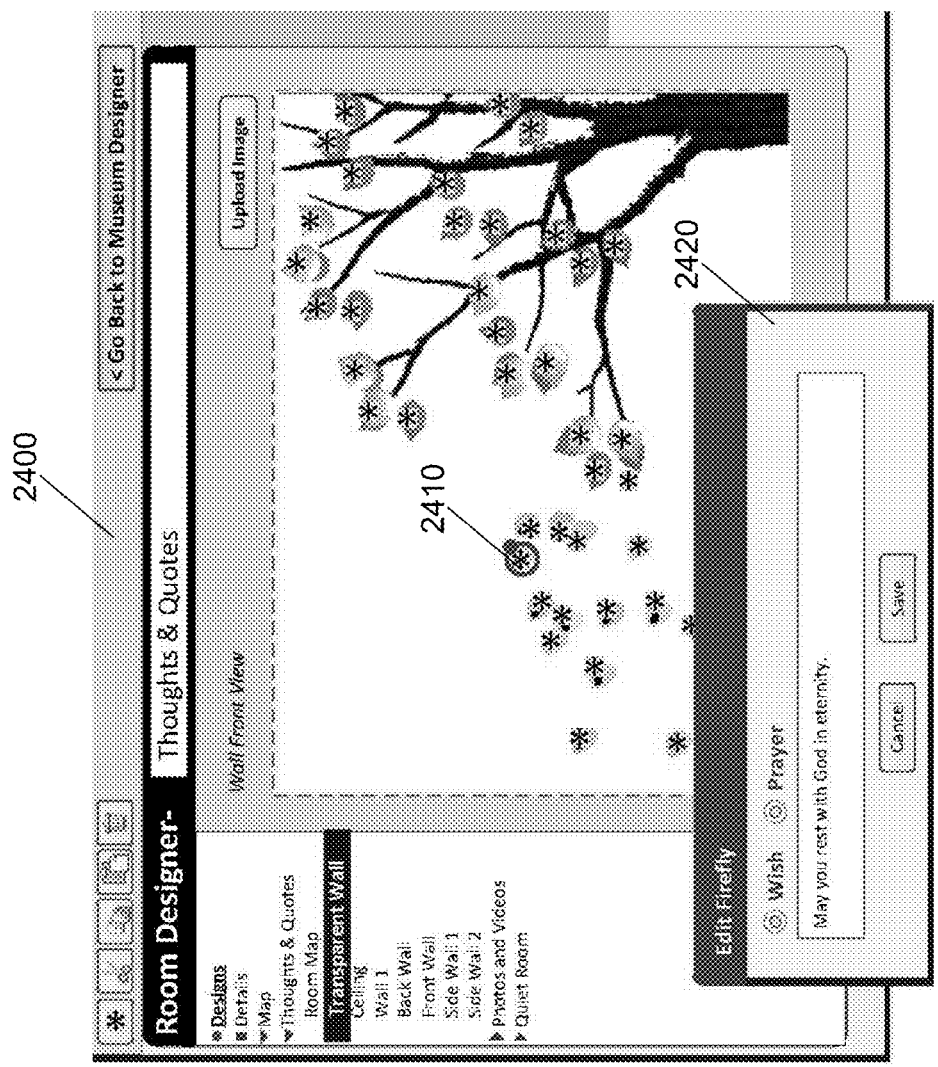
FIG. 24 illustrates an example user interface of a virtual venue application displaying a wall designer screen with a ShowObject selected for editing, according to an embodiment of the invention.

FIG. 24 illustrates an example user interface 2400 of a virtual venue application displaying a wall designer screen with a ShowObject selected for editing, such as ShowObject 2410 according to an embodiment of the invention. According to the embodiment, a user that is associated with a room designer role may select one or more ShowObjects, such as ShowObject 2410, and edits its specific properties. When a user selects one or more ShowObjects, such as ShowObject 2410, an edit screen, such as edit screen 2420 is displayed. The user can then edit the ShowObject's specific properties. In the illustrated embodiment of FIG. 24, ShowObject 2410 is a Firefly object, and has "Wish" and Prayer" properties that can be edited within edit screen 2420. However, other ShowObjects can have a different number of properties, and different types of properties. For example, ShowObjects such as Candles and Incense can have color properties, width properties, height properties, and shape properties. Some ShowObjects may not have any properties and are simply displayed with a fixed or predetermined representation. ShowObjects, such as Frames, can potentially provide one or more images, one or more drawings, or one or more videos. In certain embodiments, a user can use the selection circle surrounding a selected ShowObject, such as ShowObject 2410, to increase or decrease the size of the selected ShowObject. More than one ShowObject may be selected at one and then resized at once.

Figure 25:
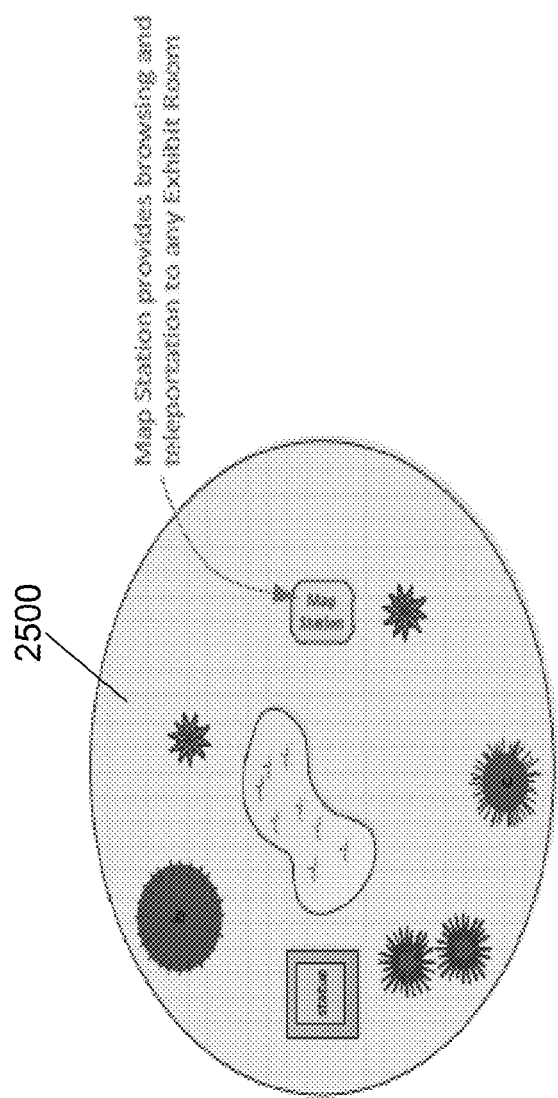
FIG. 25 illustrates an object model of a virtual venue atrium that can be displayed within a user interface of a virtual venue application, according to an embodiment of the invention.

FIG. 25 illustrates an object model of a virtual venue atrium 2500 atrium that can be displayed within a user interface of a virtual venue application, according to an embodiment of the invention. According to the embodiment, virtual venue atrium 2500 is a circular area that includes virtual plants, virtual trees, a virtual pond, a virtual statute, and a map station. However, in alternate embodiments, a virtual venue atrium can be of any shape, can include any number of faces, and can include any number of virtual objects, where a floor of a virtual venue atrium can be any three-dimensional surface.

Figure 26:
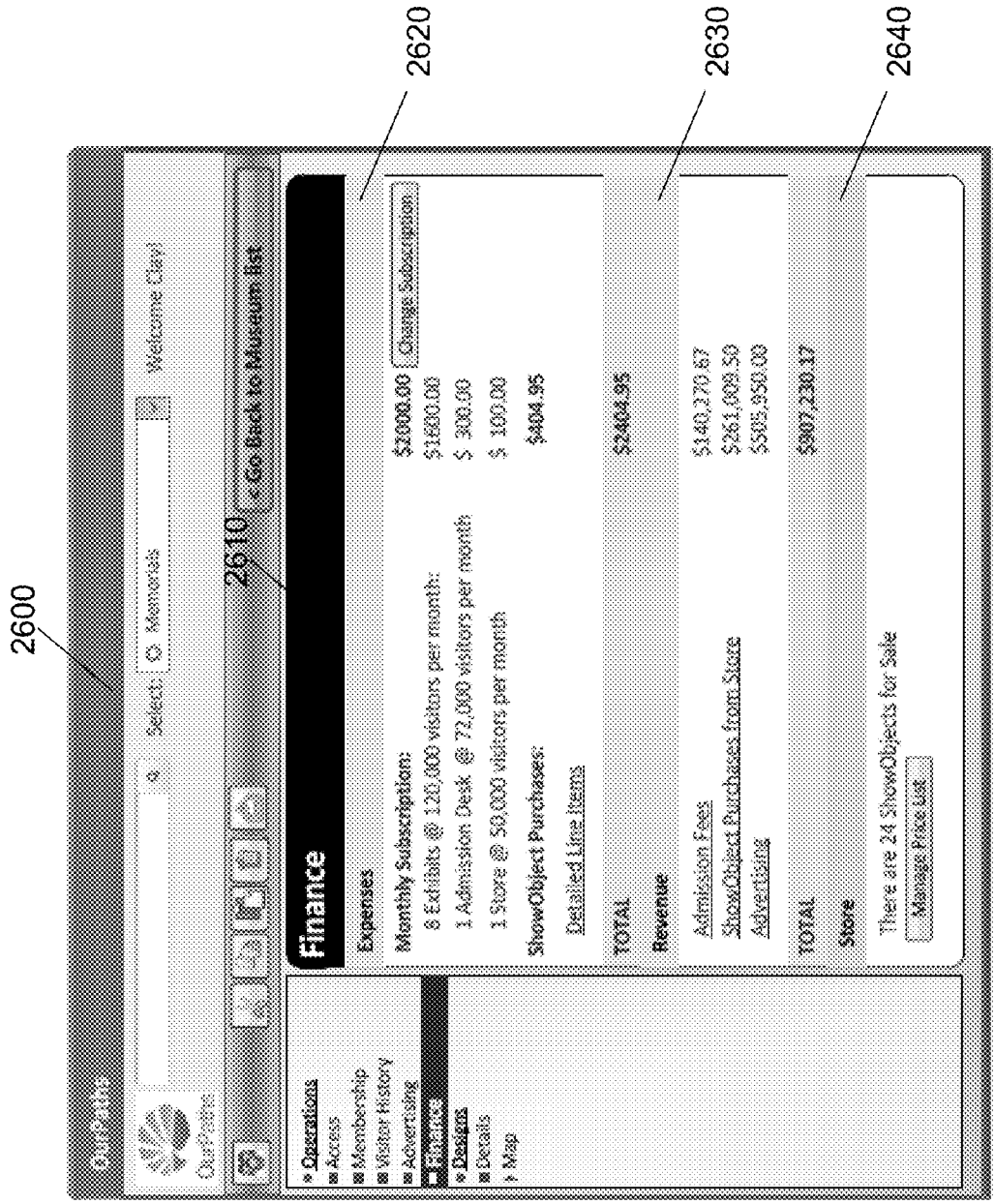
FIG. 26 illustrates an example user interface of a virtual venue application displaying a finance management screen, according to an embodiment of the invention.

FIG. 26 illustrates an example user interface 2600 of a virtual venue application displaying a finance management screen 2610, according to an embodiment of the invention. In certain embodiments, only a user associated with a finance manager role can access finance management screen 2610. Finance management screen 2610 can provide an overview of expenses and revenue associated with a virtual venue. According to the illustrated embodiment, finance management screen 2610 can include expenses section 2620, revenue section 2630, and store section 2640. Expenses section 2620 displays expenses associated with the virtual venue. Expenses section 2620 also allows a user associated with a finance manager role to select a new subscription contract. Revenue section 2630 displays revenue associated with the virtual venue. Revenue section 2630 also allows a user to access further details on each revenue source. Store selection 2640 displays an overview of a number of items for sale in the virtual venue, and can provide a button that allows a user to access a price list for all items for sale that are associated with the virtual venue. The price list can include an item name, a current price, a number of sales per item in a previous month, and a total revenue from the item. The price list can also allow a user to change a current price for one or more items.

According to certain embodiments, ShowObjects are the primary objects in a user's world of objects. ShowObjects are objects that present or "show" something of interest in an exhibit room. ShowObjects can be placed on ShowSpots which are only positioned on containers, such as frames, cases, and tables. ShowObjects and containers can be Google Sketchup™ three-dimensional models. However, the virtual venue application provides the ability to add buttons to ShowObjects in order to provide associated actions. Buttons may perform an action which is totally independent of the ShowObject model, or dependent where it causes manipulation of the ShowObject model.

Figure 27:
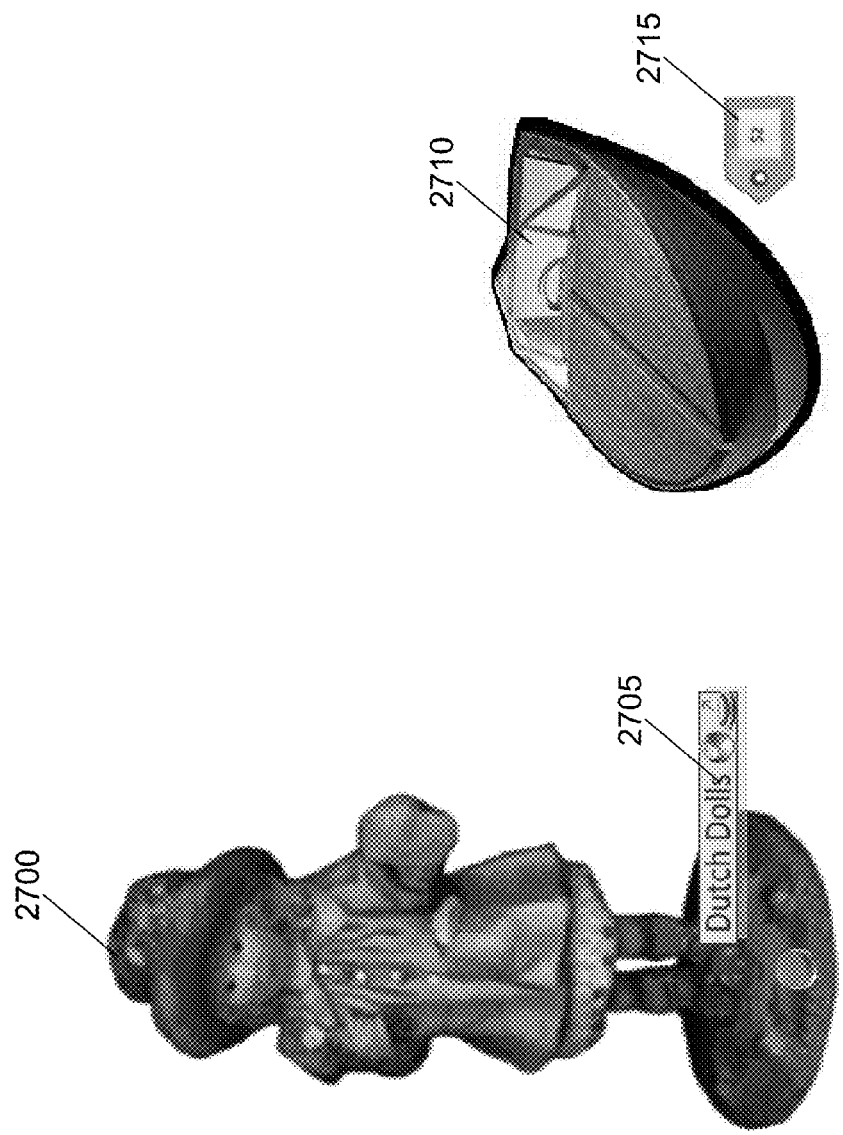
FIG. 27 illustrates two examples of ShowObjects, according to an embodiment of the invention.

FIG. 27 illustrates two examples of ShowObjects (i.e., ShowObject 2700 and ShowObject 2710), according to an embodiment of the invention. According to the illustrated embodiment, ShowObject 2700 is a doll ShowObject, and ShowObject 2710 is a boat ShowObject. Furthermore, according to the illustrated embodiment, ShowObject 2700 includes buttons 2705 that can be added to ShowObject 2700 (specifically, a green push button, and a dual-web-link). The green push button of buttons 2705 can optionally show a mouseover with the name of the action it will perform. All buttons can also show their text titles when the right-mouse-down action is clicked on a ShowObject. For touchscreens, touching the ShowObject in a non-button area can display all button titles. As an example, the green push button can cause ShowObject 2700 to move and even say something, such as teaching information in a museum, or something sentimental in a memorial. The green push button can also bring up a dialog to collection selections which could then change the state and presentation of ShowObject 2700 (for example, selections could change the clothing or color or anything based on scripts associated with the button. Furthermore, the link button of buttons 2705 can include a web icon, a transport icon, or both. Users may click or touch either. The web icon can bring up a web page. The transporter icon can cause an avatar associated with a user to "transport" to the exhibit room denoted by the icon. For example, in the illustrated embodiment, the transporter icon can take the avatar to a totally different exhibit room focused entirely on Dutch dolls. Any number of buttons can be placed on a ShowObject.

According to the illustrated embodiment, ShowObject 2710 can include a price tag button 2715. Clicking or touching price tag button 2715 can bring up a dialog allowing the user to confirm a purchase of ShowObject 2710, and to place ShowObject 2710 into a shopping cart. In certain embodiments, price tag buttons, such as price tag button 2715, can only be associated with ShowObjects that are in a room that is declared a "store." In certain embodiments, users may place ShowObjects on ShowSpots provided by a user associated with a room designer role, but users cannot add buttons. Buttons can be added to a ShowObject by users associated with a curator role or a room designer role, but only if independent. Dependent buttons can require scripts to perform manipulations. In certain embodiments, the scripting language for the scripts is JavaScript.

According to certain embodiments, ShowObjects can be created to be unique or limited. When a ShowObject author creates a ShowObject, the ShowObject author can set a maximum quantity for its copies. In certain embodiments, the ShowObject author sets the maximum quantity for its copies, by assigning a unique identifier to the ShowObject, where the unique identifier defines the maximum quantity for its copies. In certain embodiments, the Show Object author can assign the copies to specific users. According to certain embodiments, ShowObjects can be electronically signed to authenticate the ShowObject Author. In certain embodiments, there can be tiers of authenticity. For example, a first tier can require a mechanism to provide that the author is a specific real person using, for example, a driver's license or other real word identification. In this example, a second tier can simply authenticate that a specific user electronically signed the ShowObject. According to certain embodiments, a user can electronically engrave one or more ShowObjects. In these embodiments, a person's signature can be uploaded and then electronically engraved into a specific position in the ShowObject selected. Electronic signing, limited counts, and electronically engraving can introduce the concept of rarity and desire in a virtual venue which can create value. Furthermore, in examples of virtual art exhibits, art, such as pictures and sculptures, can be authenticated.

In certain embodiments, virtual venues can be expected to be so popular that containers may comprise sophisticated declarations to automatically scale the number of ShowObjects that are displayed within a virtual venue for a high cardinality of venue visitors (i.e., for when a large number of venue visitors wish to display ShowObjects within the virtual venue). Thus, the automatic scaling can be based on a number of ShowObjects that are displayed within a container. For example, multiple ShowObjects may reside in the same location, and a number can be present in a middle of an asterisk, such as asterisk 2230 of FIG. 22, to denote the number of ShowObjects (not shown in FIG. 22). At venue runtime, the distinct ShowObjects can cycle through being displayed every T seconds, where T is a value that can be configured by the virtual venue application. Where N is a number of ShowObjects being displayed within the container, if the value of N becomes a maximum number of ShowObjects that can be displayed within the container, the maximum number can be increased, and the value of N can be automatically scaled up. In an alternate scaling ShowObject embodiment, a container can be automatically replicated in a certain direction, when the container instance is full of ShowObjects. For example, a virtual tree with ShowObjects, such as the virtual tree illustrated in FIG. 22, could replicate, and create a plurality of trees, such as an orchard (not shown in FIG. 22). Other scaling embodiments can provide for an increased density of displayed ShowObjects up to a specific maximum based on one or more rules stored within the virtual venue application.

Figure 28:
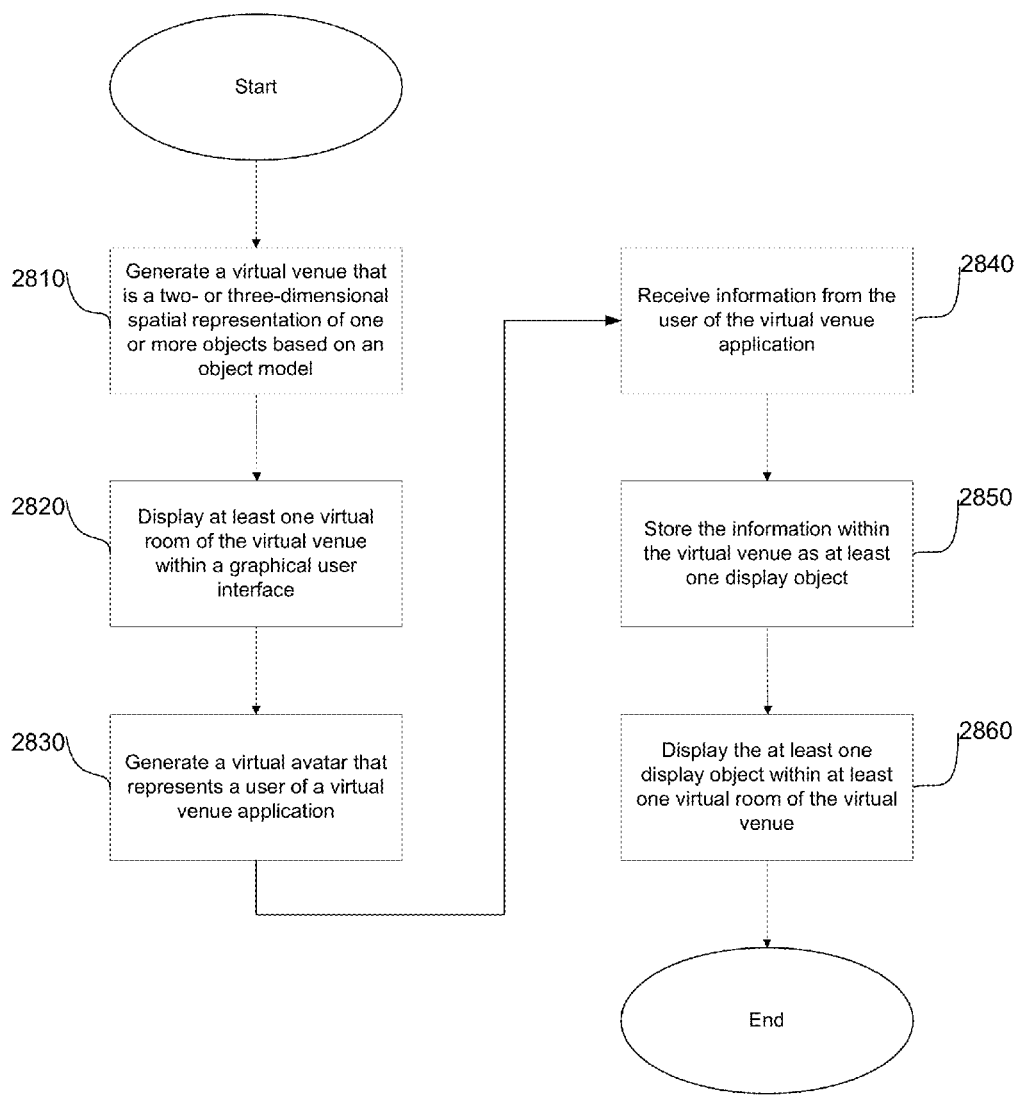
FIG. 28 illustrates a flow diagram of a method, according to an embodiment of the invention.

FIG. 28 illustrates a method according to an embodiment of the invention. The steps of a method or algorithm described in connection with the embodiments disclosed herein may be embodied directly in hardware, in a computer program executed by a processor, or in a combination of the two. A computer program may be embodied on a computer-readable medium, such as a storage medium. For example, a computer program may reside in RAM, flash memory, ROM, EPROM, EEPROM, registers, hard disk, a removable disk, a CD-ROM, or any other form of storage medium known in the art. An exemplary storage medium may be coupled to the processor such that the processor can read information from, and write information to, the storage medium. In the alternative, the storage medium may be integral to the processor. The processor and the storage medium may reside in an application specific integrated circuit (ASIC). In the alternative, the processor and the storage medium may reside as discrete components. Furthermore, a computer-readable medium may be any type of tangible medium.

At 2810, a virtual venue is generated that includes a two- or three-dimensional spatial representation of one or more objects based on an object model. The object model can include one or more virtual exhibits. Each virtual exhibit can include one or more virtual rooms. Each virtual room can include one or more faces. Each face can include zero or more display containers. Each display container can include zero or more object mounts. Each object mount can host a display object that is a two- or three-dimensional virtual representation of an object. In certain embodiments, the virtual venue includes an affinity room, where the affinity room is privately added to the virtual venue, and where the affinity room is accessible only to a member that created the affinity room and a list of other members the member has invited. In certain embodiments, access to the one or more virtual rooms is restricted based on one or more per specific exhibit or per specific room permissions. In certain embodiments, the display object represents or stores emotive text that a user enters or selects from a list of text or a larger body of text.

In certain embodiments, each face of the one or more faces is of a face type that defines how the one or more display containers are displayed. Examples of face types include a wall, a floor, and a ceiling. According to these embodiments, each face includes one or more graphical properties. Examples of graphical properties include a texture property, a color property, and a transparency property.

According to certain embodiments, each display container of the one or more display containers is a display type that defines how the one or more object mounts are deployed. Examples of display types include: a frame, a table, a case, and a hook. In certain embodiments, each object mount includes a position declaration. Examples of position declarations include: an absolute position declaration, a rule-based position declaration, and a dynamic position declaration. Also, according to the certain embodiments, at least one display object of the virtual venue includes an animator object, where the animator object manipulates one or more graphical properties of the at least one display object.

In certain embodiments, the virtual venue is generated based on a virtual venue template. The virtual venue template includes a virtual venue that is partially created. The virtual venue also includes one or more variables, where each variable controls a specific attribute of the virtual venue.

At 2820, at least one virtual room of the virtual venue is displayed within a graphical user interface. The display of the at least one virtual room produces a two- or three-dimensional virtual environment. Each display object of each object mount of each container is also displayed within the graphical user interface. In certain embodiments, at least one display object displays an advertisement.

At 2830, a virtual avatar that represents a user of a virtual venue application is generated. At least one virtual room of the virtual venue is displayed based on a position of the virtual avatar within the virtual venue. Furthermore, the display of the at least one virtual room of the virtual room is updated based on movement of the virtual avatar. In certain embodiments, the virtual avatar is visible with selectable attributes. In alternate embodiments, the virtual avatar is invisible to all except the user employing the virtual avatar.

At 2840, information is received from the user of the virtual venue application. At 2850, the information is stored within the virtual venue as, in, or on at least one display object. At 2860, the at least one display object is displayed within at least one virtual room of the virtual venue.

In certain embodiments, the virtual venue is a first virtual venue, and a second virtual venue is also generated based on the object model. In these embodiments, the first virtual venue and the second virtual venue share at least one exhibit or room, and the shared at least one exhibit or room is shared in space and time between the first virtual venue and the second virtual venue. Thus, a tunnel is displayed within the first virtual venue. When the virtual avatar moves towards the tunnel, and the user indicates that the user desires to move to the second virtual venue, the display of the first virtual venue is replaced with the display of the second virtual venue.

In certain embodiments, a portal can also be displayed within the graphical user interface. The portal displays one or more selectable virtual venues. Each virtual venue of the one or more selectable virtual venues represents a virtual venue to enter. In certain embodiments, the aforementioned virtual venue is one of the one or more selectable virtual venues. In other embodiments, a virtual venue map is also displayed, where the virtual venue map is integrated with a hierarchical navigation tree of the virtual venue, the one or more virtual exhibits, and the one or more virtual rooms, where the virtual venue map provides an ability to transport to a selected location. In yet other embodiments, an operations view of the virtual venue is displayed. The operations view can include operation information of the virtual venue. Examples of operation information include access information, membership information, visitor history information, and advertising information. In certain embodiments, a user associated with a virtual avatar can transport from one location of a virtual venue to another location of the virtual venue, or from one virtual venue to another virtual venue, based on touching content associated with one or more displays within the virtual venue.

In certain embodiments, one or more roles can be assigned to a user of the virtual venue application who is a member of the virtual venue. The one or more roles can be selected from a list of roles comprising a member role, an operator role, a finance manager role, a curator role, or a designer role.

In certain embodiments, one or more object mounts can be auctioned. In other embodiments, an advertisement can be displayed based on an amount of traffic associated with the virtual venue. In other embodiments, an email message can be sent to a user of the virtual venue application, where the email message includes a virtual ticket associated with the virtual venue. The virtual ticket can be electronically signed, and the virtual ticket can be authenticated to provide access to the virtual venue to the user, where the virtual ticket includes an expiration date. In certain embodiments, the virtual avatar can store at least one of a number of virtual venues visited, a number of items purchased, or credit card information associated with the user.

In certain embodiments, the virtual venue further includes a timeline that is placed in within a virtual room or made accessible from a map navigator, and that allows members of the virtual venue to upload and share content on the timeline. In some of these embodiments, content can be automatically added to the timeline based on one or more dates and times associated with one or more display objects located with the one or more virtual rooms. In other embodiments, content can be automatically deployed and organized in the virtual venue from an external web account source that includes at least one of, one or more pictures, one or more videos, one or more documents, and one or more two-dimensional or three-dimensional models. In certain embodiments, a number of display objects that are placed on a displayer container can be automatically scaled up when a number of object mounts associated with the display container include a maximum number of display objects. In other embodiments, a display container with empty object mounts can be automatically duplicated when a number of object mounts associated with another display container include a maximum number of display objects.

Figure 29:
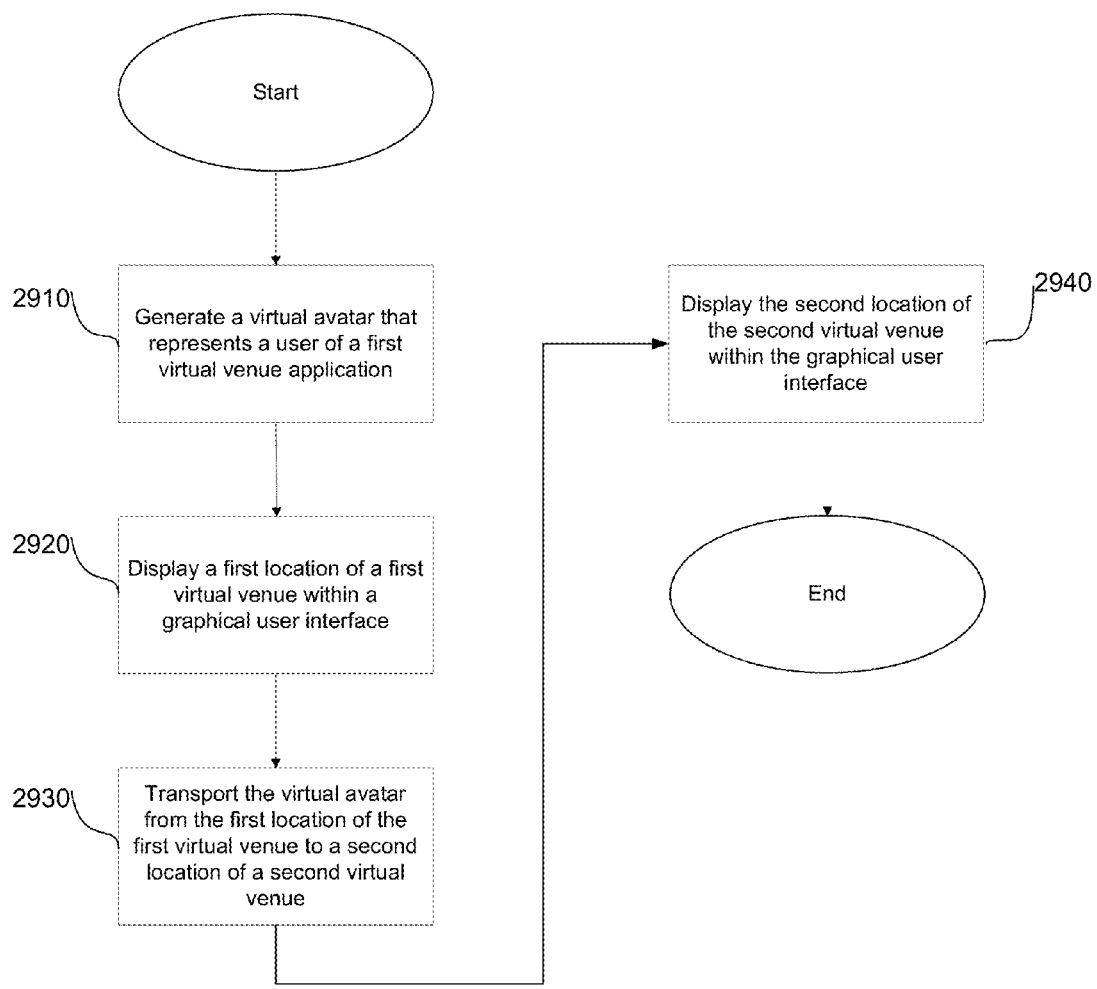
FIG. 29 illustrates a flow diagram of another method, according to another embodiment of the invention.

FIG. 29 illustrates another method according to another embodiment of the invention. At 2910, a virtual avatar is generated that represents a user of a first virtual venue application. In certain embodiments, the virtual avatar can be stored within a server, and downloaded onto a user's computer using an encrypted file. At 2920, a first location of a first virtual venue of the first virtual venue application is displayed within a user interface. In certain embodiments, the first location is displayed based on a position of the virtual avatar, where the position is relative to the first virtual venue. At 2930, the virtual avatar is transported from the first location of the first virtual venue within the first virtual venue application to a second location of a second virtual venue of a second virtual venue application. At 2940, the second location of the second virtual venue of the second virtual venue application is displayed within the user interface. In certain embodiments, the second location is displayed based on a position of the virtual avatar, where the position is relative to the second virtual venue. Furthermore, in certain embodiments, the first virtual venue includes at least one display object, where the display object is a two- or three-dimensional virtual representation of an object. In these embodiments, the display object can include at least one button, where the button performs a specifically defined functionality. In certain embodiments, the button can be added after the display object is created. In some of these embodiments, the addition of the button is unknown to a creator of the display object.

In certain embodiments, one or more objects that are associated with the virtual avatar can also be transported along with the virtual avatar from the first location to the second location. In these embodiments, examples of the type of objects that can be associated with the virtual avatar, and transported along with the virtual avatar, can include virtual pictures, virtual videos, virtual two-dimensional or three-dimensional sculptures, virtual documents, virtual albums (where each virtual album can contain one or more virtual pictures, virtual videos, or virtual two-dimensional or three-dimensional sculptures), virtual notebooks (where each virtual notebook can be a virtual album that includes one or more virtual documents), or virtual carriers (where each virtual carrier contains one or more objects, albums, or notebooks). In certain embodiments, there can be one or more rules associated with transportation of the virtual avatar, and these rules can be checked before transportation of the virtual avatar occurs. In some embodiments, the checking can be performed by the first virtual venue application. In other embodiments, the checking can be performed by the second virtual venue application. In these embodiments, the second virtual venue application can prevent the transportation of the virtual avatar when the transportation does not satisfy any of the one or more rules. In some embodiments, the checking can be performed by the first virtual venue. In other embodiments, the checking can be performed by the second virtual venue. In these embodiments, the second virtual venue can prevent the transportation of the virtual avatar when the transportation does not satisfy any of the one or more rules. In certain embodiments, at least one object of the one or more objects can include executable code, an executable script, or a combination therein. In these embodiments, one or more object events associated with the at least one object can be transported as well. Also, in these embodiments, one or more buttons associated with the at least one object can be transported as well. Furthermore, the executable code or the executable script can be executed by the second virtual venue application. In other embodiments, virtual avatar history that is associated with the virtual avatar can also be transported along with the virtual avatar from the first location to the second location. In these embodiments, examples of virtual avatar history can include one or more visited locations, one or more interactions with other virtual avatars, or one or more financial transactions. In certain embodiments, one or more preferences that are associated with the virtual avatar can also be transported along with the virtual avatar.

Figure 30:
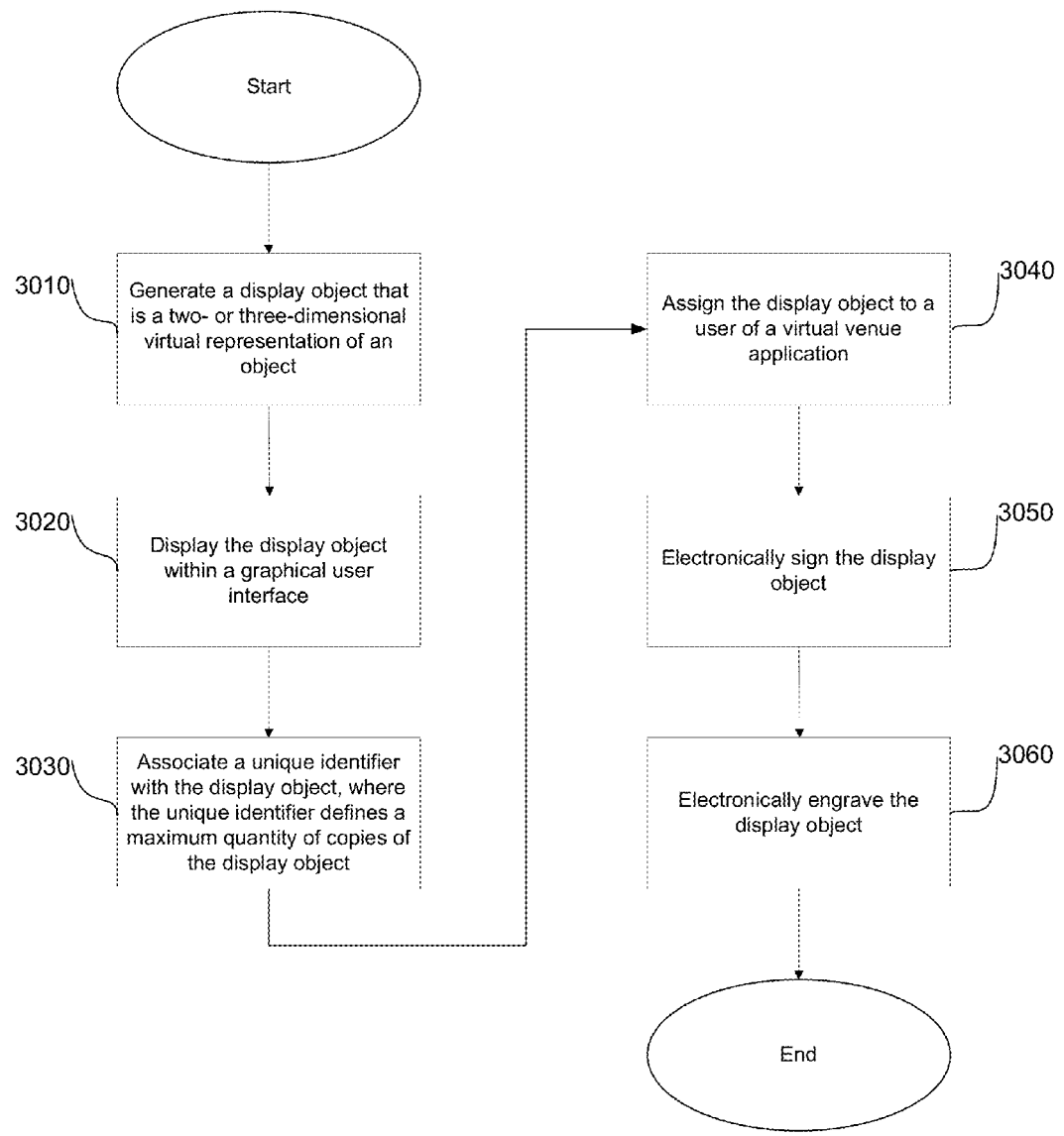
FIG. 30 illustrates a flow diagram of another method, according to another embodiment of the invention.

FIG. 30 illustrates another method according to another embodiment of the invention. At 3010, a display object is generated that is a two- or three-dimensional virtual representation of an object. At 3020, the display object is displayed within a graphical user interface, where the display object is displayed within a virtual venue. At 3030, a unique identifier is associated with the display object, where the unique identifier defines a maximum quantity of copies of the display object that are allowed within the virtual venue. At 3040, the display object is assigned to a user of a virtual venue application. At 3050, the display object is electronically signed. At 3060, the display object is electronically engraved. In certain embodiments, the display object is electronically geometrically engraved. In certain embodiments, the display object includes at least one button, where the button performs a specifically-defined functionality. In certain embodiments, the button can be added after the display object is created. In some of these embodiments, the button can be added unbeknownst to a creator of the display object.

Figure 31:
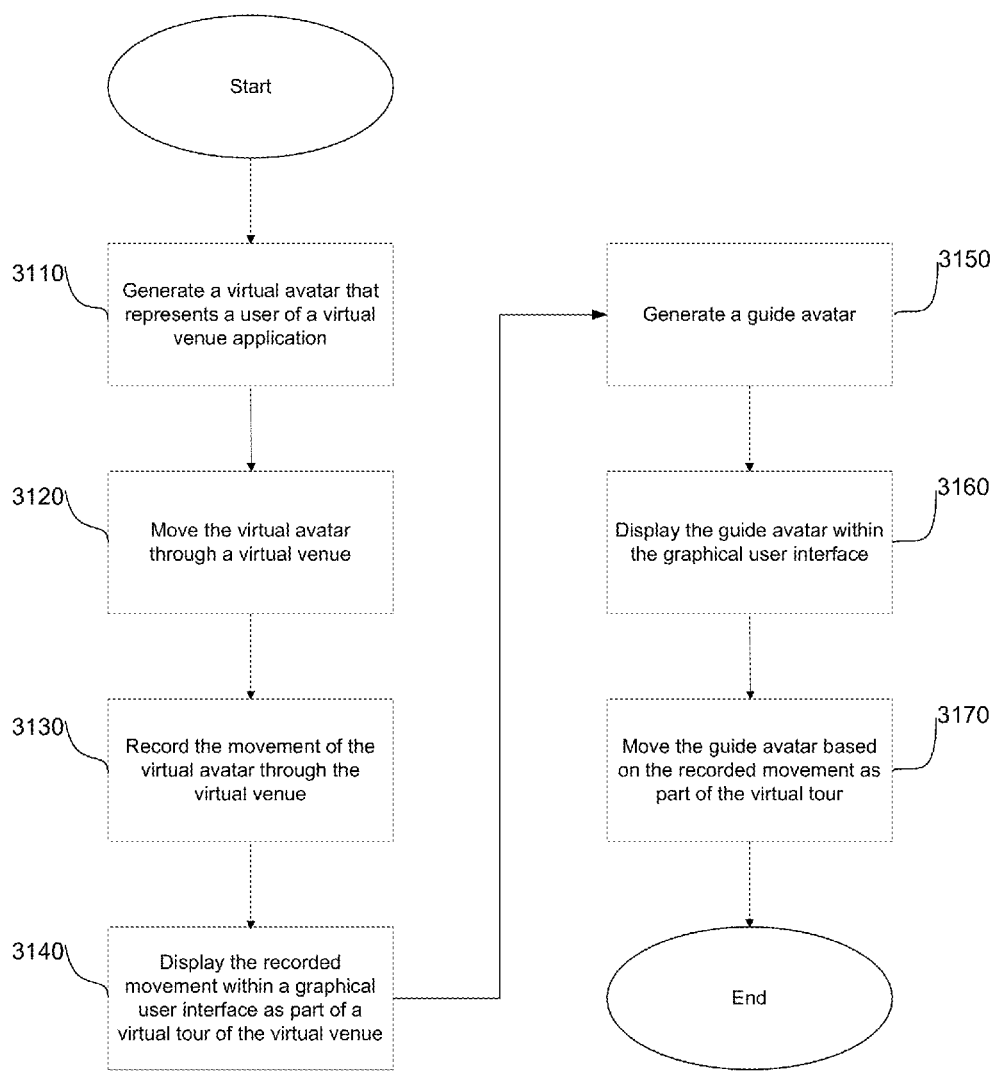
FIG. 31 illustrates a flow diagram of another method, according to another embodiment of the invention.

FIG. 31 illustrates another method according to another embodiment of the invention. At 3110, a virtual avatar is generated that represents a user of a virtual venue application. At 3120, the virtual avatar is moved through a virtual venue. At 3130, the movement of the virtual avatar through the virtual venue is recorded. At 3140, the recorded movement is displayed within a graphical user interface as part of a virtual tour of the virtual venue. In certain embodiments, the virtual tour includes one or more locations in a room of the virtual venue that includes a position and a gaze direction unit vector, wherein one or more virtual tour guests can be positioned at the position during the virtual tour. In certain embodiments, each location can include one or more additional locations to gaze at from each location. In certain embodiments, each location includes a shaped area. At 3150, a guide avatar is generated. At 3160, the guide avatar is displayed within the graphical user interface. At 3170, the guide avatar is moved based on the recorded movement as part of the virtual tour. In certain embodiments, one or more hand motions can be inserted into the virtual tour from a hand motion library, where the guide avatar performs the one or more hand motions. In these embodiments, one or more leg and foot motions can be inserted into the virtual tour from a leg and foot motion library, where the guide avatar performs the one or more leg and foot motions. Also in these embodiments, one or more facial expressions can be inserted into the virtual tour from a facial expression library, where the guide avatar performs the facial expressions. In certain embodiments, the virtual tour can be paused, fast-forwarded, reversed, or a combination therein. In embodiments where the virtual tour is paused, a guide avatar can answer one or more pre-defined questions. In certain embodiments, the guide avatar can automatically make movements with at least one of its body, its face, its hands, or its fingers. In certain embodiments, the virtual tour can include one or more locations where the guide avatar can stop to talk or point out an object. Once the guide avatar has talked, or pointed out the object, the virtual tour can resume. In some of these embodiments, a user of the virtual venue application can search for at least one location of these one or more locations. In these certain embodiments, the user can skip at least a portion of the virtual tour, where the virtual tour either starts or resumes at the searched location. In certain embodiments, a set of one or more questions, and a set of one or more answers can be created, where each question is associated with an answer. The set of questions can be displayed, where a user of the virtual venue application can ask at least one of the set of questions. In these embodiments, at least one question can be associated with audio. Also, in these embodiments, a question can be received from a user that is not within the set of one or more questions. According to these embodiments, an indication can be displayed that an answer to the question will be emailed to the user. Subsequently, the received question can be added to the set of one or more questions, and an answer can be added to the set of one or more answers that is associated with the received question. In certain embodiments, a number of times that each question of the set of questions is asked by a user can be stored. In these embodiments, a number of times that each question of the set of questions is asked by a user per room of the virtual venue can also be stored. Also, in these embodiments, each question of the set of questions can be ranked based on the number of times that each question of the set of questions is asked. In certain embodiments, each question of the set of questions can be associated with a room of the virtual venue. In these embodiments, when a question is received from a user, an indication can be displayed that the question will be answered later within the virtual tour. In certain embodiments, one or more virtual avatars participating in the virtual tour can be automatically teleported to a room of the virtual venue when the one or more virtual avatars do not follow the guide avatar into the room within a time threshold.

Figure 32:
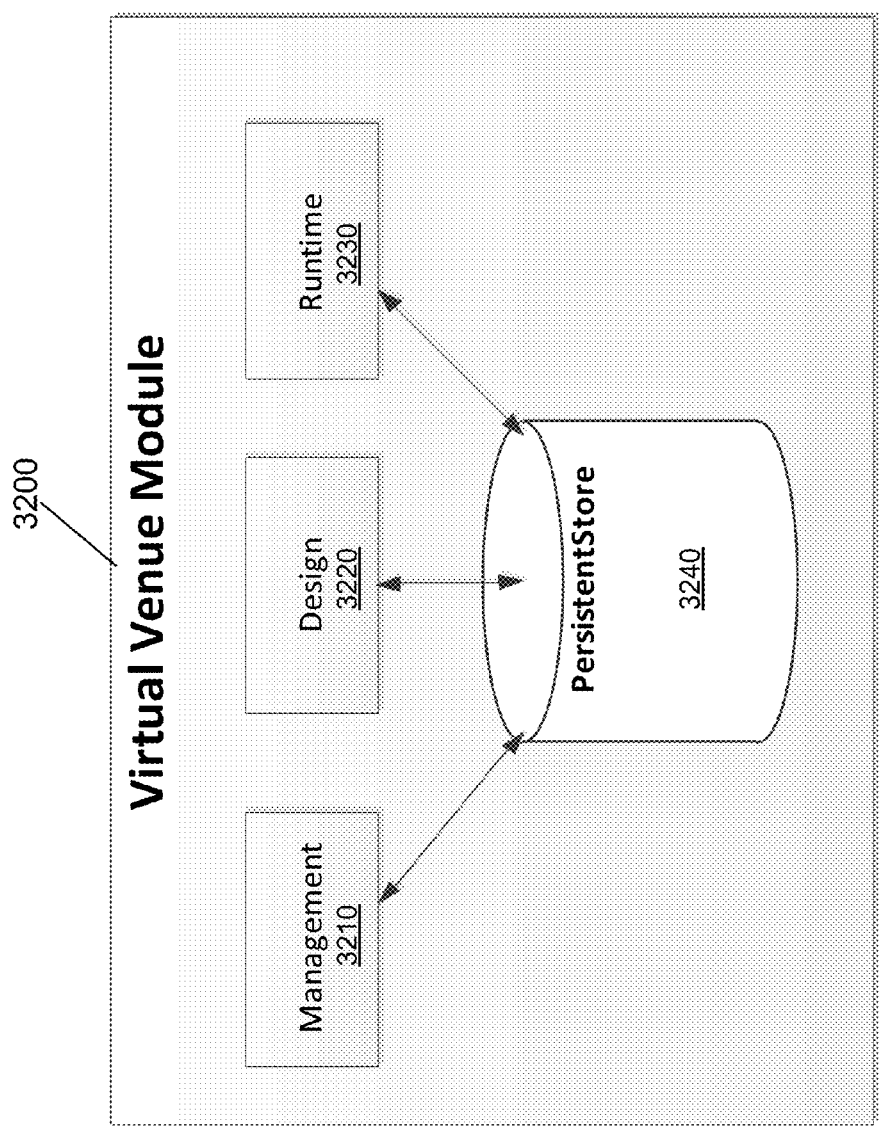
FIG. 32 illustrates a virtual venue module of a virtual venue application, according to an embodiment of the invention.

FIG. 32 illustrates a virtual venue module 3200 of a virtual venue application, according to an embodiment of the invention. According to the embodiment, virtual venue module 3200 can include a plurality of subsystems, where the subsystems can be of one of three categories of subsystems: management subsystems 3210, design subsystems 3220, or runtime subsystems 3330. Management subsystems 3210 and design subsystems 3220 can read and update one or more definition and configuration objects in a persistent storage (identified as "PersistentStore 3240" in FIG. 32), that can be subsequently executed by runtime subsystems 3330. Runtime subsystems 3330 may update one or more objects as well, where object updates can be specific to runtime virtual venue utilization, such as information sharing and room object updates by visitors. All subsystems can update an audit trail within PersistentStore 3240 to record what has occurred, when the audit trail can subsequently be retrieved.

Figure 33:
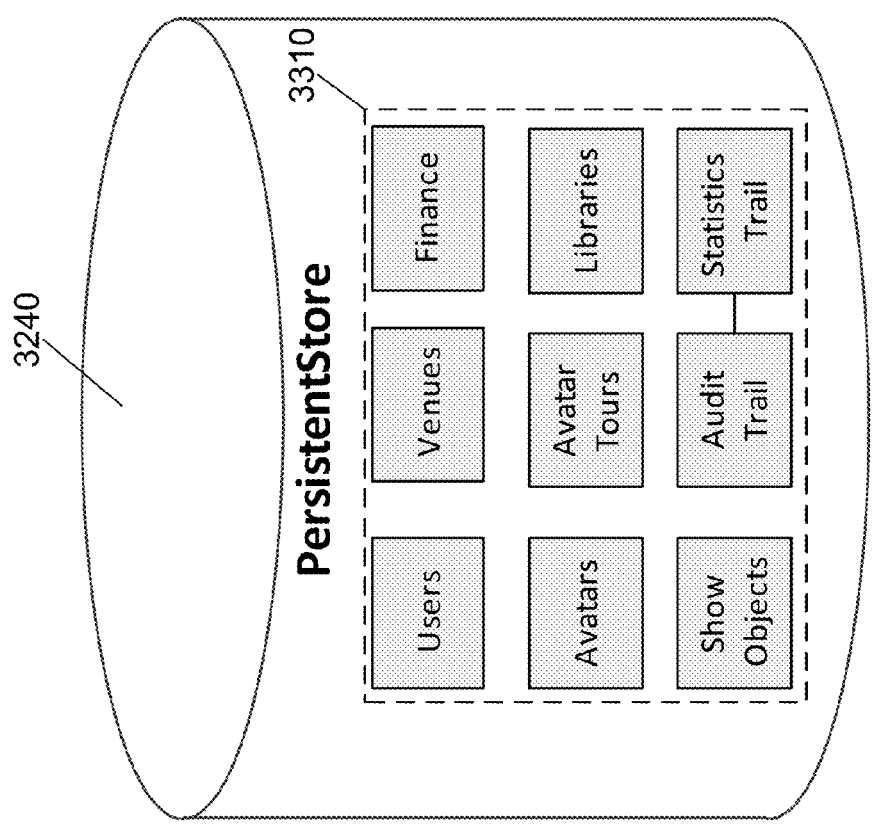
FIG. 33 illustrates a persistent storage of a virtual venue application, according to an embodiment of the invention.

FIG. 33 illustrates a persistent storage (i.e., PersistentStore 3240) of a virtual venue application, according to an embodiment of the invention. PersistentStore 3240 can store objects of one or more object types which are illustrated in FIG. 33 as object types 3310. In the illustrated embodiment, object types 3310 include user object types, venue object types, finance object types, avatar object types, avatar tour object types, library object types, ShowObject object types, audit trail object types, and statistics trail object types. However, this is only an example embodiment, and in alternate embodiments, object types 3310 can include any number of different object types.

Object types 3310 can be implemented based on a database architecture of PersistentStore 3240. For example, in one embodiment, PersistentStore 3240 can be a relational database, where each object, and its supporting stored objects, can be composed of one or more relational tables. In another embodiment, PersistentStore 3240 can be a NoSQL database, where PersistentStore 3240 can store the object in alternate storage structures, such as key-value structures or similar highly scalable but simple storage structures. One skilled in the art of persistent storage, in particular highly scalable and elastic persistent storage, would readily appreciate how to implement storing objects and their supporting objects using the storage subsystems described above, and other similar storage subsystems.

As previously described, PersistentStore 3240 can represent a persistent storage of the virtual venue application which stores objects of one or more object types. These stored objects can provide the structural objects that are used to implement the functionality of the virtual venue application previously described. Subsystems that employ these objects are now described in greater detail.

Figure 34:
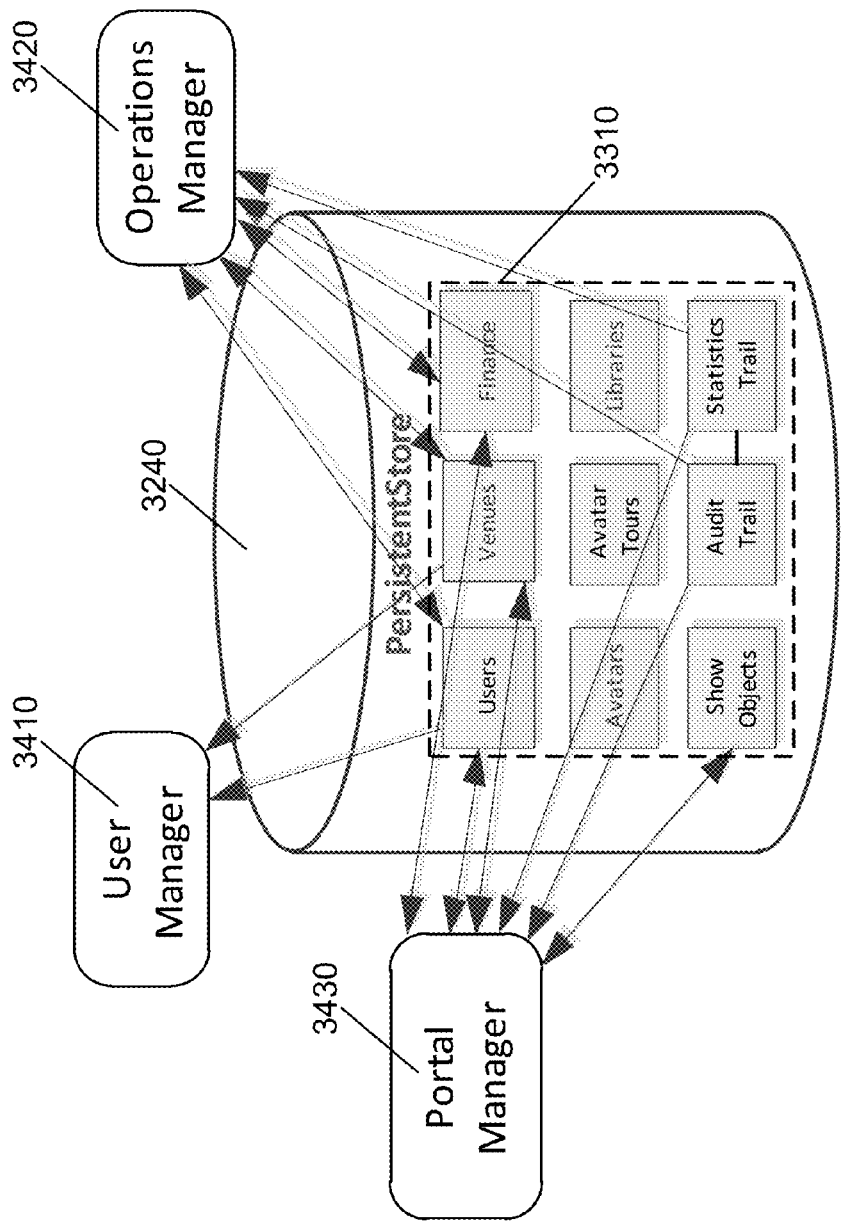
FIG. 34 illustrates a plurality of graphical user interface subsystems that interact with a persistent storage of a virtual venue application, according to an embodiment of the invention.

FIG. 34 illustrates a plurality of graphical user interface subsystems that interact with a persistent storage (i.e., PersistentStore 3240) of a virtual venue application, according to an embodiment of the invention. In the illustrated embodiment, the plurality of graphical user interface subsystems includes user manager 3410, operations manager 3420, and portal manager 3430. However, this is only an example embodiment, and in alternate embodiments, there can be any number of graphical user interface subsystems.

Each graphical user interface subsystem can provide one or more screens to support the functionality provided by the graphical user interface subsystem. For example, in one embodiment, user manager 3410 can provide a guest screen as well as a user home screen once a user successfully logs into the virtual venue application. The screens of user manager 3410 can primarily interact with user objects and venue objects of PersistentStore 3240.

In one embodiment, operations manager 3420 can provide one or more screens for managing a specific virtual venue. The one or more screens can include screens for public access to the virtual venue's exhibits and rooms, private access to the virtual venue's exhibits and rooms, user groups within the virtual venue, costs and revenue, virtual venue statistics, and advertising within the virtual venue. Access to these screens can be granted to users associated with an operating role. In certain embodiments, access to the finance screen is only granted to a user associated with the finance manager role. The one or more screens of operations manager 3420 can interact with venue objects and user objects of PersistentStore 3240, and can also present a history or audit of what has occurred in the virtual venue using audit trail objects of PersistentStore 3240. Operations manager 3420 can also view statistics computed based on a virtual venue's history, which can be computed from an audit trail subsystem (not shown) and stored in or more statistics trail objects of PersistentStore 3240. A finance screen of operations manager 3420 can provide functionality for changing one's subscription, limiting expenditures by other users of the virtual venue application, and can also display one or more reports of expenses and revenues.

In one embodiment, portal manager 3430 can display one or more screens that are only available to a user associated with a portal administrator role, where the user can be, for example, an employee of a corporation that owns the virtual venue application. The one or more screens can include overview of all virtual venues, overviews of all users, site and virtual venue statistics, as well as billing management. As illustrated in FIG. 34, portal manager 3430 can interact with many objects of PersistentStore 3240, such as user objects, venue objects, finance objects, ShowObject objects, audit trail objects, and statistics trail objects. Portal manager 3430 can also provide functionality for importing new pre-made venue objects such as exhibits, rooms, faces, and containers. Portal manager 3430 can also import new ShowObject objects. Furthermore, portal manager 3430 can define new billing models and can import them as one or more finance objects.

Figure 35:
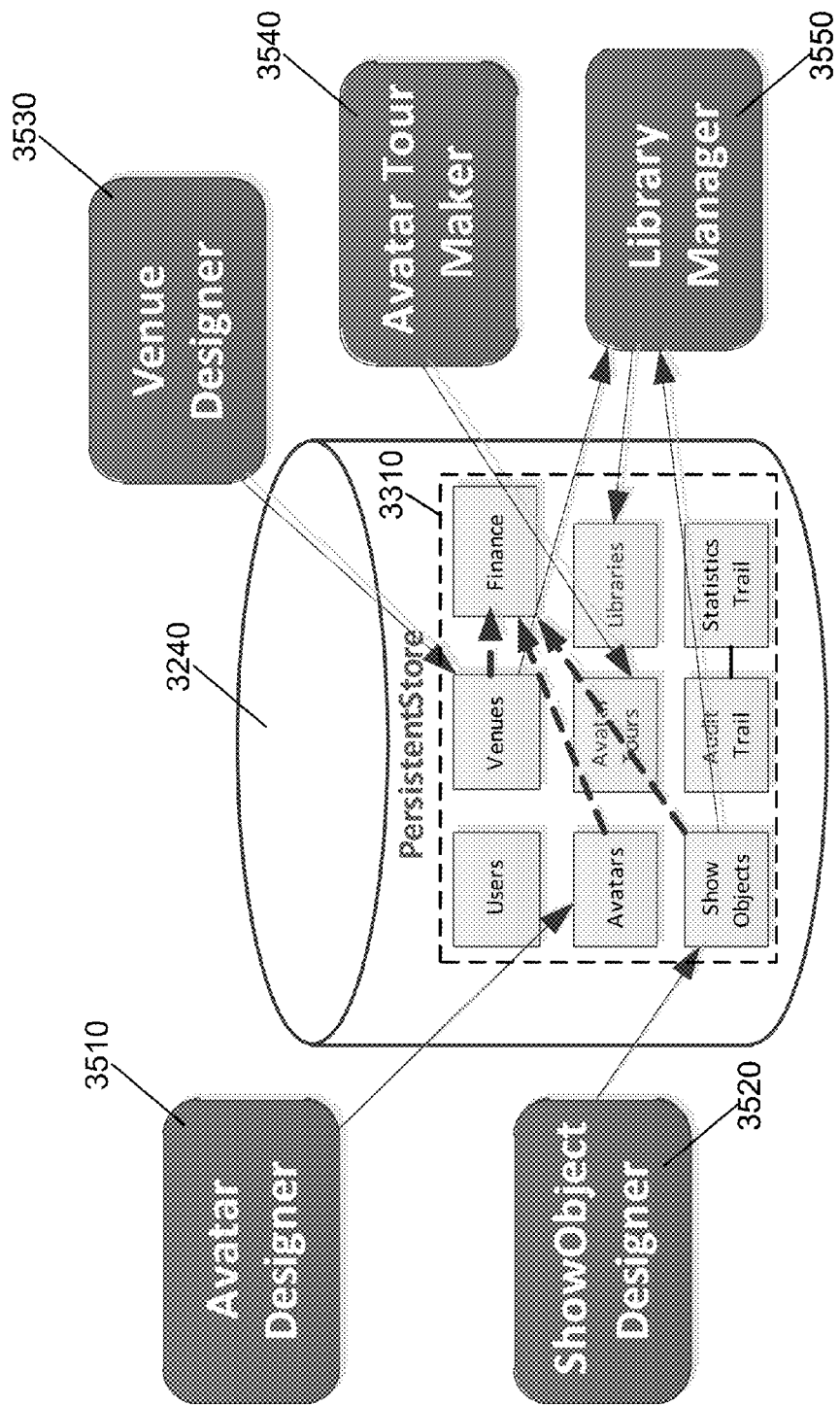
FIG. 35 illustrates a plurality of design tools of a virtual venue application, according to an embodiment of the invention.

FIG. 35 illustrates a plurality of design tools of a virtual venue application, according to an embodiment of the invention. In the illustrated embodiment, the plurality of design tools includes avatar designer 3510, ShowObject designer 3520, venue designer 3530, avatar tour maker 3540, and library manager 3550. However, this is only an example embodiment, and in alternate embodiments, there can be any number of design tools.

Each design tool can have a corresponding persistent storage of the object type it provides a design for. Some of these design tools can include screens for browsing pre-made objects that can be publicly shared and/or for sale. In the "for sale" scenario, the design tool can receive credit card information and record the transaction. As discussed below in greater detail, this can cause a transaction to be executed by a payment engine, where the payment engine also interacts with stored information in one or more finance objects.

Figure 36:
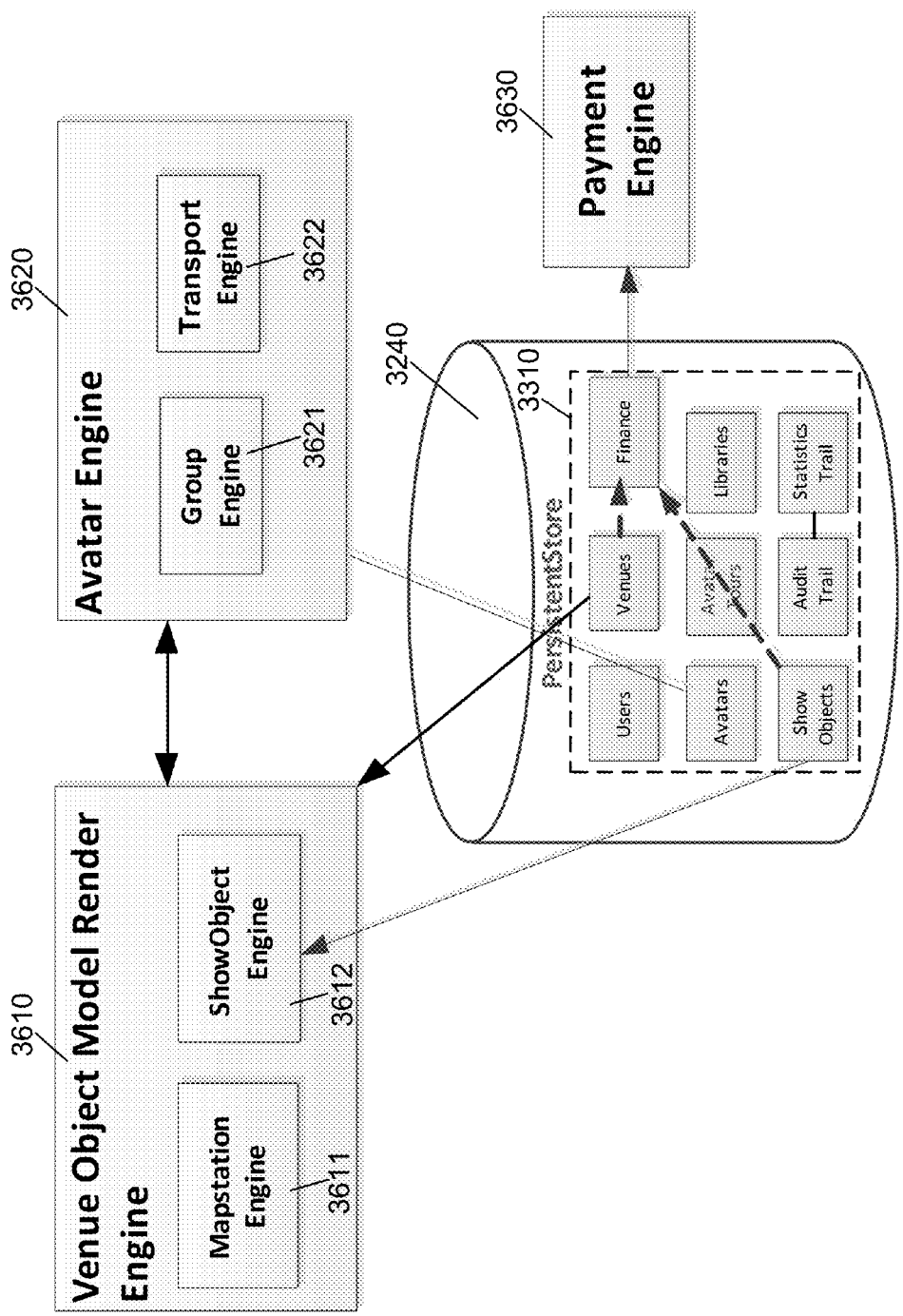
FIG. 36 illustrates a plurality of runtime subsystems of a virtual venue application, according to an embodiment of the invention.

FIG. 36 illustrates a plurality of runtime subsystems of a virtual venue application, according to an embodiment of the invention. According to the embodiment, a venue object model render engine 3610 can provide functionality for rendering exhibits, rooms, faces, and containers of a virtual venue in two or three dimensions. According to the embodiment, venue object model render engine 3610 can include a mapstation engine 3611 that can provide easy navigation of all exhibits of a virtual venue, so that a "click" or "touch" of an exhibit brings up the exhibit's room layout within a room layout map. The room layout map can provide the ability to "click" or "touch" a room, so that an avatar can immediately transport to the location on the map. Furthermore, because ShowObjects can maintain additional sophistication with buttons, events, and scripts that can execute when a button or event occurs on the ShowObject, venue object model render engine 3610 can include a ShowObject engine 3612 that can process button "clicks"/"touches" and events on ShowObjects.

In certain embodiments, an avatar engine 3620 can process an avatar's movement within a virtual environment as well as a separate head movement capability to allow an avatar to "look" in a direction while the avatar moves. Avatar engine 3620 can work in tandem with venue object model render engine 3610 so that avatar engine 3620 can render the avatar properly within a virtual venue environment. For example, avatar engine 3620 can work with venue object model render engine 3610 so that avatar engine 3620 can manage room entry and exit, as well as avatar face, container, and ShowObject collision. Avatar engine 3620 can include group engine 3621 that can provide additional avatar grouping operations. These avatar grouping operations can help manage multiple avatars travelling together. In certain embodiments, avatar engine 3620 can also include transport engine 3622 that can provide functionality for advancing an avatar for to a specific position in a virtual venue with a specific look or gaze angle (or gaze vector). Transport engine 3622 can also provide a link between two or more virtual venues. For example, a transport button may be available on a particular ShowObject in one venue that denotes to avatars that are passing by that further exploration on a particular theme represented by the ShowObject is available by transporting to the represented location. One embodiment beneficially provides the functionality to transport to completely different sites that host a virtual venue application, and that support an avatar transporting protocol. The protocol requires that the site support a venue object model that is implemented by venue object model render engine 3610, and performs a similar avatar engine as avatar engine 3620. The actual protocol interaction with the other site can involve an invocation of a transport application programming interface ("API") that packages a presentation of an avatar and transmits it to the other site along with a uniform resource indicator ("URI") that includes a unique venue-exhibit-room-location-gaze angle (vector) address. At that point, the target virtual venue becomes the new server managing the user's avatar. This can be similar to a "clicking" on a link on one website to give control to a second website that the link links to, and navigating to a specific webpage on the second website. In certain embodiments where the target virtual venue is public, the transfer can occur normally. In certain embodiments where the target virtual venue requires membership, the transfer can be blocked, and instead, an offer to request membership can be provided. This invitation process can require joining another site.

A payment engine 3630 can handle ongoing subscription payments provided by users of the virtual venue application. Payment engine 3630 can also be utilized when a user purchased one or more ShowObjects in a virtual venue that is a store.

As previously described, in certain embodiments, a virtual tour can be provided, where the virtual tour is a virtual tour that is guided by an automated virtual tour guide, such as a virtual avatar, but where the virtual avatar can interact with avatars that are operated by real persons. In these embodiments, such automated tours can easily be created while also maintaining several sophisticated interactive and real-time features expected of a real tour guide.

Figure 37:
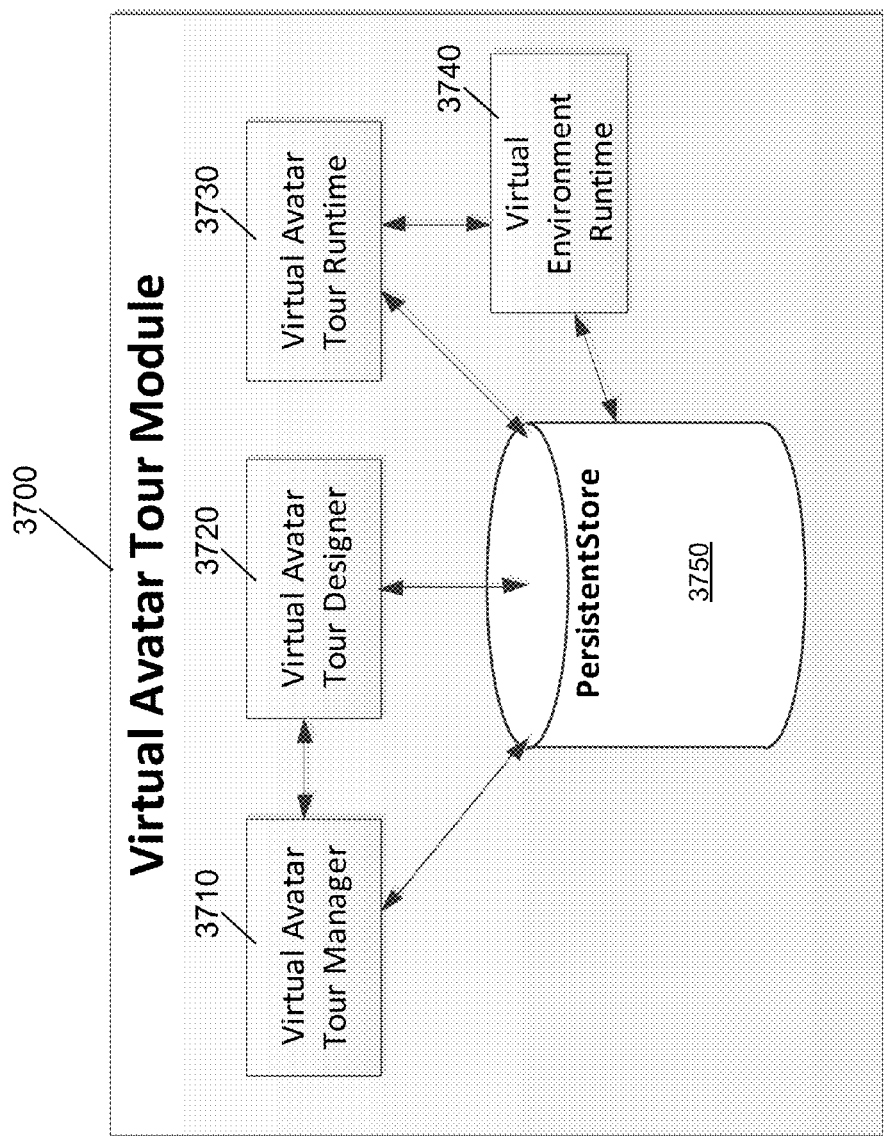
FIG. 37 illustrates a virtual avatar tour module of a virtual venue application, according to an embodiment of the invention.

FIG. 37 illustrates a virtual avatar tour module 3700 of a virtual venue application, according to an embodiment of the invention. According to the embodiment, virtual avatar tour module 3700 can be deployed on a server which maintains four primary subsystems: virtual avatar tour manager 3710, virtual avatar tour designer 3720, virtual avatar tour runtime 3730, and virtual environment runtime 3740. Each of virtual avatar tour manager 3710, virtual avatar tour designer 3720, virtual avatar tour runtime 3730, and virtual environment runtime 3740 can interact with a persistent storage, illustrated in FIG. 37 as PersistentStore 3750. In certain embodiments, virtual avatar tour manager 3710 and virtual avatar tour designer 3720 have associated client user interface that interact with these server subsystems.

Virtual avatar tour manager 3710 can provide functionality for browsing existing virtual tours, creating new virtual tours, and editing or deleting existing virtual tours. When creating or editing a virtual tour, virtual avatar tour manager 3710 can employ virtual avatar tour designer 3720, where virtual avatar tour designer 3720 is a subsystem that provides functionality for constructing tours and editing tours. Once complete, a virtual tour can be performed by virtual avatar tour runtime 3730 which executes the virtual tour within the context of a virtual environment. In one embodiment, the virtual tour is performed within a context of a three-dimensional virtual environment, while, in another embodiment, the virtual tour is performed within the context of a two-dimensional virtual environment. One skilled in the art of computer graphics and modeling is familiar with the techniques for representing objects in a two-dimensional or three-dimensional environment, and rendering them visually, while also providing functionality for rending a user's avatar, and letting the user move the avatar around the virtual environment, as well as angle the virtual avatar's head to gaze at an angle (vector) that is arbitrary to the avatar's movements. Any of these techniques can be used for representing the objects in a two-dimensional or three-dimensional environment as previously described.

One embodiment provides a creation of a virtual tour that beneficially makes it very easy to construct the virtual tour. Virtual avatar tour designer 3720 can create and edit virtual tours, where a user can be required to be associated with a curator role, and also be required to be associated with a virtual venue, before a user is allowed to create or edit a virtual tour. In certain embodiments, when beginning the creation of the virtual tour, a set of buttons for facilitating tour creation and editing can be displayed to a user. The buttons can include a record button, a play button, a pause button, a reverse button, a fast-forward button, and a TalkSpot button. The user can "click" or "touch" the record button to create a virtual tour. Then the user moves their avatar to where they wish to direct the tour, understanding that their avatar's movements will generate the exact same movements for the avatar tour guide that will perform he tour. The user, as the avatar, then "clicks" or "touches" ShowObjects in the rooms that they visit. This records a sequence of ShowObjects that comprise the virtual tour.

TalkSpots are a facility for increasing a sophistication of a virtual tour, but maintaining easy creation of the whole virtual tour. A TalkSpot is a location where the avatar tour guide can pause and talk. Such spots may only be used to pause, and the avatar tour guide will not talk, but may merely indicate that the virtual tour is stopping, and may express a suggestion that other uses walk around while the virtual tour is paused. In certain embodiments, the virtual tour can be created with one or more pause locations where the virtual avatar guide can pause and talk to the other avatars following within the virtual tour. These pause locations are TalkSpots. One embodiment provides the functionality to "click" or "touch" locations in a virtual environment to be TalkSpots prior to a virtual tour creation, as part of the virtual tour creation preparation. In this embodiment, the TalkSpots can be highlighted as a glowing bright green light, and it can be expected that the virtual avatar will be recorded as walking through most, if not all, TalkSpots. In one embodiment, a TalkSpot is simply created when a TalkSpot button is "clicked" or "touched."

The ability to ask questions and have them answered is generally a very important and common feature of a real tour, and thus, in certain embodiments, a virtual tour can provide this functionality. According to these embodiments, virtual avatar tour designer 3720 can provide functionality for constructing a dictionary of questions and corresponding answers. The dictionary structure supports text questions and answers as well as audio questions and answers. In certain embodiments, a more sophisticated dictionary structure can be provided where specific questions may be associated with one or more rooms of a virtual venue. This allows the avatar tour guide to determine whether an asked question is associated with the current room, or a room that the virtual tour has been in. If so, the avatar tour guide can answer the question. If no, the avatar tour guide can indicate that the avatar tour guide will answer the question when the virtual tour reaches the associated room. In certain embodiments, the avatar tour guide can answer any question regardless of the question's room association.

In certain embodiments, some locations on a virtual tour can be optimal vantage points to look at or hear something. For example, some sophisticated virtual venues may employ an ability to construct exhibits and rooms that are missing walls so that a user can look onto a much large room presenting space, an ocean, or other scenery. Such locations can have an (x,y) position on a specific face coupled with a gaze direction unit vector denoting a direction in two-dimension space, or three-dimension space, that the avatar positioned there should gaze toward. Such locations are identified as StandSpots. Thus, in certain embodiments, a user can create StandSpots in rooms of a virtual venue. According to these embodiments, a gaze direction can be created by "clicking" or "touching" a point in a virtual venue that the avatars on the StandSpot should look at. This point is identified as a GazeSpot. StandSpots can be created, and can exist, outside of a virtual tour, but they can be referenced in a virtual tour by an avatar tour guide. In certain embodiments, an avatar tour guide can reference StandSpots when it stops at a TalkSpot and can give avatars that are on a virtual tour time to transport to the various StandSpots. Transporting to a StandSpot can cause the avatar to begin at a gaze direction, but the avatar can look at other angles or move off the StandSpot at any time. In certain embodiments, transporting of all avatars on a virtual tour to a specifically referenced StandSpot can be forced. A virtual tour creator can select this option while creating a virtual tour using virtual avatar tour designer 3720.

In certain embodiments, in contrast to a StandSpot, a StandArea may also be created, which can be rectangular, circular, or arbitrary-shaped. One or more avatars can randomly be placed within a StandArea, where the avatars can be positioned so they are all looking at a GazeSpot. A StandArea can space avatar placement within the StandArea. In one embodiment, non-collision of avatars can be enforced within a StandArea.

FIG. 38 illustrates a virtual avatar tour runtime subsystem (i.e., virtual avatar tour runtime 3810) of a virtual venue application, according to an embodiment of the invention. According to the embodiment, virtual avatar tour runtime 3810 can interact with PersistStore 3750, where PersistStore 3750 can store objects of one or more object types which are illustrated in FIG. 38 as object types 3860. In the illustrated embodiment, object types 3860 include virtual tour object types, hand gesture object types, question object types, answer object types, keyword index object types, TalkSpot object types, StandSpot object types, and GazeSpot object types. However, this is only an example embodiment, and in alternate embodiments, object types 3860 can include any number of different object types. In certain embodiments, the objects of object types 3860 can be created by virtual avatar tour designer 3720 and then interpreted during execution of virtual avatar tour runtime 3810. For example, virtual tours can store a script of all the avatar tour guide movements, and associated text. Such virtual tour scripts can also reference hand gestures, questions, answers, TalkSpots, StandSpots, and GazeSpots.

According to the embodiments, virtual avatar tour runtime 3810 includes choreography engine 3820, question-and-answer ("Q&A") engine 3830, interaction processor 3840, and StandSpot/Area engine 3850. Choreography engine 3820 is configured to interpret all items stored in a virtual tour script, causing the avatar tour guide to move, make hand gestures, reference questions and answers, as well as employ referenced StandSpots, GazeSpots, and TalkSpots. In certain embodiments, choreography engine 3820 utilizes Q&A engine 3830 and StandSpot/Area engine 3850 to do so. According to an embodiment, in addition to virtual venues being searchable, StandSpots, GazeSpots, and TalkSpots within a virtual venue, as well as across all virtual venues, can be searched. Interaction processor 3840 can be configured to allow avatars to control and interact with an avatar tour guide in various ways, as described below.

According to an embodiment, to perform a virtual tour, a user employs an avatar to select a virtual tour available from a list of virtual tours presented on a virtual tour station ShowObject. The list is retrieved from the virtual tours objects stored and filtered by a current venue. Such a virtual tour station ShowObject may be deployed, typically, in an admission room or atrium area, but could be placed on any ShowSpot. An initiator of such a virtual tour (identified as a virtual tour coordinator) can select whether the tour is private or public, and then can enter a virtual tour waiting area. If the virtual tour is public, the virtual tour can be advertised in a list on a virtual tours screen. If private, the waiting area can require the virtual tour coordinator to invite individuals to the virtual tour. When ready, the virtual tour coordinate "clicks" or "touches" a "Start Tour" pushbutton. All avatars on the virtual tour will have an "Ask Question" pushbutton, a "Pause" pushbutton, a "Resume" pushbutton, and a "Leave" pushbutton. The virtual tour coordinator will have these pushbuttons, as well as a "Restart" pushbutton, an "End" pushbutton, a "Fast-Forward" pushbutton, and a "Reverse" pushbutton. In certain embodiments, the virtual tour coordinate can also have a "Go back ten seconds" pushbutton, and a "Go forward ten seconds" pushbutton. If a virtual tour coordinator leaves a virtual tour, one or more algorithms can be provided for selecting a new virtual tour coordinate. In one embodiment, the algorithm selects a new virtual tour coordinator randomly. In one embodiment, a user is selected that has the most logged time in virtual tours as the new virtual tour coordinator. Many other selection algorithms are also possible.

According to an embodiment, virtual avatar tour runtime 3810 can provide a virtual avatar tour guide that, while completely automated, behaves very naturally, similar to a real person. This can provide a superior experience relative to a simple video or three-dimensional model animation that is unable to interact. For example, the avatar tour guide can make eye contact with avatars in a tour (knowing geometrically and in real-time exactly where the eyes on avatars are located), and can make natural pointing movements to ShowObjects in rooms corresponding to the same sequence and timing of ShowObjects pointed to during creation of the virtual tour within virtual avatar tour designer 3720. In one embodiment, virtual avatar tour designer 3720 can insert hand gestures to the make the avatar tour guide seem even more natural than it would otherwise. A library of hand gesture movements can be provided where one or more hand gesture sequences can be incorporated into a virtual tour script. For example, one open hand while talking, two open hands while talking, hand waves, pointing to avatars in the room, etc. In one embodiment, new hand gesture sequences can be imported for reuse later. In another embodiment, text dialog can be transformed into sign language for deaf users.

In certain embodiments, users can ask a question. One embodiment, allows users to "click" or touch" a pushbutton at any time during a performance of a virtual tour. In one embodiment, at all times during a virtual tour, an "Ask Question" pushbutton that users can "click" or "touch" to ask a question can be provided. A tour creator, while using virtual avatar tour designer 3720, can designate portions of the virtual tour where no questions may be asked, according to one embodiment. During such portions, the "Ask Question" pushbutton can be disabled. One embodiment provides the ability for a TalkSpot to be designated available for questions and answers. In other words, an avatar tour guide can automatically say it is available for questions when the avatar tour guide is located at the TalkSpot. In one embodiment, available questions can be displayed within a screen, and a user can ask the question by "clicking" or "touching" the displayed questions. N questions can be displayed from the N most popular questions asked, in one embodiment. In another embodiment, questions can be asked by typing in the questions. In one embodiment, keywords from the question can be employed to look up possible answers. This embodiment can employ a keyword index maintained by a commercial text indexing system, such as Apache Lucene®. According to the embodiment, one or more stored question objects are searched to locate content that the keywords most likely match. Once the question objects identified from the index search are determined the associated answer objects can then be returned. One skilled in the art will readily appreciate that there are various techniques for realizing answers to stored questions, and that one of these techniques can be used in order to provide the most accurate and natural answers possible. One embodiment can let an avatar on a virtual tour know that the virtual avatar tour guide cannot answer a specific questions, but will email an answer later.

In certain embodiments, during a virtual tour, some users may get distributed or not pay attention, and start lagging behind the avatar tour guide's general vicinity. In these embodiments, the avatar tour guide can speak to the lagging users, such as calling out their names, or requesting that everyone rejoin the group. In alternate embodiments, lagging users can be transported to the same room that the avatar tour guide is in after a predefined number of seconds.

Thus, according to certain embodiments of the invention, the virtual venue application, when implemented as part of an apparatus of system, enables users to overcome disadvantages of physical location and lack of proximity. Furthermore, the virtual venue application can provide collaborative information storage, computer program products, and data processing systems as previously described. In addition, the virtual venue application provides users with an easy, streamlined way to create a rich three-dimensional virtual environment. Thus, the virtual venue application can make creation of a three-dimensional virtual environment simple and easy, but still allows the created three-dimensional virtual environment to provide easy and intuitive interaction, sharing, collaboration, and organization of a rich comprehensive collection of objexions and information. The new and succinct object model assists organization of a complex collection of objects while dragging-and-dropping makes it easy to create each room in the virtual environment.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method for providing a virtual tour, presented by a virtual avatar, of a virtual venue within a virtual environment, the method comprising:
   generating, by a virtual venue application implemented on a server, a virtual avatar that represents a user of the virtual venue application;
   moving the virtual avatar, through one or more exhibits of the virtual venue, including advancing the virtual avatar to a specific position in the virtual venue based on a gaze direction vector, each exhibit including one or more rooms, each room including one or more locations, each location including a position and an initial gaze direction vector;
   recording the movements of the virtual avatar through the one or more exhibits of the virtual venue;
   generating the virtual tour comprising a pre-defined presentation of the one or more exhibits of the virtual venue that is based on the recorded movements;
   displaying the virtual tour within a graphical user interface;
   generating a guide avatar, to serve as a tour guide of the virtual tour;
   displaying the guide avatar within the virtual venue using the graphical user interface;
   moving the guide avatar, based on the recorded movements as part of the virtual tour, including:
      moving within a first room of the virtual tour,
      pointing out an object within the first room using hand motions from a hand motion library, and
      advancing from the first room of the virtual venue to a second room of the virtual venue;
   updating the display of the virtual tour based on the movements of the guide avatar, including pausing and resuming the virtual tour;
   determining that one or more virtual avatars participating in the virtual tour have not followed the guide avatar into the second room within a time threshold; and
   automatically teleporting the one or more virtual avatars participating in the virtual tour to the second room of the virtual venue in response to the determining that the one or more virtual avatars have not followed the guide avatar within the time threshold.

2. The method of claim 1, further comprising:
   inserting leg and foot motions from a leg and foot motion library into the virtual tour, wherein the guide avatar performs the leg and foot motions; and
   inserting facial expressions from a facial expression library into the virtual tour, wherein the guide avatar performs the facial expressions.

3. The method of claim 2, wherein the guide avatar automatically makes movements with at least one of its body, its face, its hands, or its fingers.

4. The method of claim 1, wherein one or more visitors are positioned at a plurality of locations during the virtual tour.

5. The method of claim 4, wherein each location comprises one or more additional locations, each associated with a unique gaze direction vector, to gaze at from each location.

6. The method of claim 4, wherein each room comprises a shaped area.

7. The method of claim 1, wherein the virtual tour can be fast forwarded or reversed.

8. The method of claim 1, wherein, when the virtual tour is paused, the guide avatar answers one or more pre-defined questions.

9. The method of claim 1, wherein moving the guide avatar comprises talking.

10. The method of claim 9, further comprising:
    searching for at least one location of the one or more locations;
    skipping at least a portion of the virtual tour, wherein the virtual tour either starts or resumes at the searched location.

11. The method of claim 1, further comprising
    creating a set of one or more questions and a set of one or more answers, where each question is associated with an answer; and
    displaying the set of questions within the graphical user interface, wherein a user can ask at least one question of the set of questions.

12. The method of claim 11, further comprising:
    associating at least one question and one answer with audio.

13. The method of claim 11, further comprising:
    receiving a question from a user that is not within the set of one or more questions;
    displaying an indication within the graphical user interface that an answer to the received question will be emailed to the user;
    adding the received question to the set of one or more questions; and
    adding an answer that is associated with the received question to the set of one or more answers.

14. The method of claim 11, further comprising:
    storing a number of times that each question of the set of questions is asked by a user;
    storing a number of times that each question of the set of questions is asked by a user per room; and
    ranking each question of the set of questions based on the number of times that each question of the set of questions is asked.

15. The method of claim 11, further comprising:
    associating each question of the set of questions with a room of the virtual venue;
    receiving a question from a user;
    displaying an indication within the graphical user interface that the question will be answered later within the virtual tour.

16. The method of claim 1, further comprising:
    creating a set of one or more questions and a set of one or more answers, where each question is associated with an answer; and
    displaying the set of questions within the graphical user interface, wherein a user can answer at least one question of the set of questions.

17. An apparatus, comprising:
    a memory configured to store a virtual venue module; and a processor configured to execute the virtual venue module stored on the memory, wherein the processor is further configured, when executing the virtual venue module stored on the memory, to, generate a virtual avatar that represents a user of a virtual venue application;

move the virtual avatar through one or more exhibits of a virtual venue including advancing the virtual avatar to a specific position in the virtual venue based on a gaze direction vector, each exhibit including one or more rooms, each room including one or more locations, each location including a position and an initial gaze direction vector;

record the movements of the virtual avatar through the one or more exhibits of the virtual venue;

generate a virtual tour comprising a pre-defined presentation of the one or more exhibits of the virtual venue that is based on the recorded movements;

display the virtual tour within a graphical user interface generate a guide avatar to serve as a tour guide of the virtual tour;

display the guide avatar within the virtual venue using the graphical user interface;

move the guide avatar, based on the recorded movements as part of the virtual tour, including:
moving within a first room of the virtual tour,
pointing out an object within the first room using hand motions from a hand motion library, and
advancing from the first room of the virtual venue to a second room of the virtual venue;

update the display of the virtual tour based on the movements of the guide avatar, including pausing and resuming the virtual tour;

determine that one or more virtual avatars participating in the virtual tour have not followed the guide avatar into the second room within a time threshold; and automatically teleport the one or more virtual avatars participating in the virtual tour to the second room of the virtual venue in response to determining that the one or more virtual avatars have not followed the guide avatar within the time threshold.

18. The apparatus of claim 17, wherein the processor is further configured to:
insert leg and foot motions from a leg and foot motion library into the virtual tour, wherein the guide avatar performs the leg and foot motions; and
insert facial expressions from a facial expression library into the virtual tour, wherein the guide avatar performs the facial expressions.

19. The apparatus of claim 18, wherein the guide avatar automatically makes movements with at least one of its body, its face, its hands, or its fingers.

20. The apparatus of claim 17, wherein one or more visitors are positioned at a plurality of locations during the virtual tour.

21. The apparatus of claim 20, wherein each location comprises one or more additional locations, each associated with a unique gaze direction, to gaze at from each location.

22. The apparatus of claim 20, wherein each room comprises a shaped area.

23. The apparatus of claim 18, wherein the virtual tour can be fast forwarded or reversed.

24. The apparatus of claim 17, wherein, when the virtual tour is paused, the guide avatar answers one or more pre-defined questions.

25. The apparatus of claim 17, wherein the moving the guide avatar stops comprises talking.

26. The apparatus of claim 25, wherein the processor is further configured, when executing the virtual venue module stored on the memory, to,
search for at least one location of the one or more locations;
skip at least a portion of the virtual tour, wherein the virtual tour either starts or resumes at the searched location.

27. The apparatus of claim 17, wherein the processor is further configured, when executing the virtual venue module stored on the memory, to,
create a set of one or more questions and a set of one or more answers, where each question is associated with an answer; and
display the set of questions within the graphical user interface, wherein a user can ask at least one question of the set of questions.

28. The apparatus of claim 27, wherein the processor is further configured, when executing the virtual venue module stored on the memory, to, associate at least one question and one answer with audio.

29. The apparatus of claim 27, wherein the processor is further configured, when executing the virtual venue module stored on the memory, to,
receive a question from a user that is not within the set of one or more questions;
display an indication within the graphical user interface that an answer to the received question will be emailed to the user;
add the received question to the set of one or more questions; and
add an answer that is associated with the received question to the set of one or more answers.

30. The apparatus of claim 27, wherein the processor is further configured, when executing the virtual venue module stored on the memory, to,
store a number of times that each question of the set of questions is asked by a user;
store a number of times that each question of the set of questions is asked by a user per room; and
rank each question of the set of questions based on the number of times that each question of the set of questions is asked.

31. The apparatus of claim 27, wherein the processor is further configured, when executing the virtual venue module stored on the memory, to,
associate each question of the set of questions with a room of the virtual venue;
receive a question from a user;
display an indication within the graphical user interface that the question will be answered later within the virtual tour.

32. The apparatus of claim 17, wherein the processor is further configured, when executing the virtual venue module stored on the memory, to,
create a set of one or more questions and a set of one or more answers, where each question is associated with an answer; and
display the set of questions within the graphical user interface, wherein a user can answer at least one question of the set of questions.

33. A non-transitory computer-readable medium having a computer program stored thereon that, when executed by a processor, causes the processor to implement a method, the method comprising:
generating a virtual avatar that represents a user of the virtual venue application;
moving the virtual avatar, through one or more exhibits of a virtual venue, including advancing the virtual avatar to a specific position in the virtual venue based on a gaze direction vector, each exhibit including one or more rooms, each room including one or more locations, each location including a position and an initial gaze direction vector;

recording the movements of the virtual avatar through the one or more exhibits of the virtual venue;

generating the virtual tour comprising a pre-defined presentation of the one or more exhibits of the virtual venue that is based on the recorded movements;

displaying the virtual tour within a graphical user interface generating a guide avatar to serve as a tour guide of the virtual tour;

displaying the guide avatar within the virtual venue using the graphical user interface;

moving the guide avatar, based on the recorded movements as part of the virtual tour, including:
  moving within a first room of the virtual tour,
  pointing out an object within the first room using hand motions from a hand motion library, and
  advancing from the first room of the virtual venue to a second room of the virtual venue;

updating the display of the virtual tour based on the movements of the guide avatar, including pausing and resuming the virtual tour;

determining that one or more virtual avatars participating in the virtual tour have not followed the guide avatar into the second room within a time threshold; and automatically teleporting the one or more virtual avatars participating in the virtual tour to the second room of the virtual venue in response to the determining that the one or more virtual avatars have not followed the guide avatar within the time threshold.

34. The non-transitory computer-readable medium of claim 33, further comprising:
  inserting leg and foot motions from a leg and foot motion library into the virtual tour, wherein the guide avatar performs the leg and foot motions; and
  inserting facial expressions from a facial expression library into the virtual tour, wherein the guide avatar performs the facial expressions.

35. The non-transitory computer-readable medium of claim 34, wherein each location comprises one or more additional locations, each associated with a unique gaze vector, to gaze at from each location.

36. The non-transitory computer-readable medium of claim 33, wherein one or more visitors are positioned at a plurality of locations during the virtual tour.

37. The non-transitory computer-readable medium of claim 36, wherein each room comprises a shaped area.

38. The non-transitory computer-readable medium of claim 33, wherein the virtual tour can be fast-forwarded or reversed.

39. The non-transitory computer-readable medium of claim 33, wherein, when the virtual tour is paused, the guide avatar answers one or more pre-defined questions.

40. The non-transitory computer-readable medium of claim 33, wherein the guide avatar automatically makes movements with at least one of its body, its face, its hands, or its fingers.

41. The non-transitory computer-readable medium of claim 33, wherein moving the guide avatar comprises talking.

42. The non-transitory computer readable medium of claim 41, the method further comprising:
  searching for at least one location of the one or more locations;
  skipping at least a portion of the virtual tour, wherein the virtual tour either starts or resumes at the searched location.

43. The non-transitory computer-readable medium of claim 33, the method further comprising:
  creating a set of one or more questions and a set of one or more answers, where each question is associated with an answer; and
  displaying the set of questions within the graphical user interface, wherein a user can ask at least one question of the set of questions.

44. The non-transitory computer-readable medium of claim 43, the method further comprising:
  associating at least one question and one answer with audio.

45. The non-transitory computer-readable medium of claim 43, the method further comprising:
  receiving a question from a user that is not within the set of one or more questions;
  displaying an indication within the graphical user interface that an answer to the received question will be emailed to the user;
  adding the received question to the set of one or more questions; and
  adding an answer that is associated with the received question to the set of one or more answers.

46. The non-transitory computer-readable medium of claim 43, the method further comprising:
  storing a number of times that each question of the set of questions is asked by a user;
  storing a number of times that each question of the set of questions is asked by a user per room; and
  ranking each question of the set of questions based on the number of times that each question of the set of questions is asked.

47. The non-transitory computer-readable medium of claim 43, the method further comprising:
  associating each question of the set of questions with a room of the virtual venue;
  receiving a question from a user;
  displaying an indication within the graphical user interface that the question will be answered later within the virtual tour.

48. The non-transitory computer-readable medium of claim 33, the method further comprising:
  creating a set of one or more questions and a set of one or more answers, where each question is associated with an answer; and
  displaying the set of questions within the graphical user interface, wherein a user can answer at least one question of the set of questions.

* * * * *